US011425690B2

United States Patent
Manolakos et al.

(10) Patent No.: US 11,425,690 B2
(45) Date of Patent: Aug. 23, 2022

(54) SPATIAL RESOURCE POOL TECHNIQUES FOR MULTIPLE CONCURRENT TRANSMISSIONS IN SIDELINK WIRELESS COMMUNICATIONS

(71) Applicant: QUALCOMM Incorporated, San Diego, CA (US)

(72) Inventors: Alexandros Manolakos, Escondido, CA (US); Seyedkianoush Hosseini, San Diego, CA (US)

(73) Assignee: QUALCOMM Incorporated, San Diego, CA (US)

(*) Notice: Subject to any disclaimer, the term of this patent is extended or adjusted under 35 U.S.C. 154(b) by 34 days.

(21) Appl. No.: 16/937,502

(22) Filed: Jul. 23, 2020

(65) Prior Publication Data

US 2021/0051629 A1 Feb. 18, 2021

(30) Foreign Application Priority Data

Aug. 14, 2019 (GR) ............................... 20190100356

(51) Int. Cl.
*H04W 72/02* (2009.01)
*H04W 72/04* (2009.01)
(Continued)

(52) U.S. Cl.
CPC .......... *H04W 72/02* (2013.01); *H04L 5/0051* (2013.01); *H04L 5/10* (2013.01); *H04W 72/046* (2013.01);
(Continued)

(58) Field of Classification Search
CPC ... H04W 72/00; H04W 72/005; H04W 72/02; H04W 72/046; H04W 72/048;
(Continued)

(56) References Cited

U.S. PATENT DOCUMENTS

2018/0041605 A1* 2/2018 Zhang ................... H04W 76/14
2018/0212728 A1 7/2018 Wang et al.
(Continued)

FOREIGN PATENT DOCUMENTS

WO WO2020069207 * 4/2020 ............... H04L 5/00

OTHER PUBLICATIONS

International Search Report and Written Opinion—PCT/US2020/043566—ISA/EPO—Oct. 26, 2020.
(Continued)

*Primary Examiner* — Warner Wong
(74) *Attorney, Agent, or Firm* — Danai Nelisile Mhembere; Holland & Hart LLP

(57) ABSTRACT

Methods, systems, and devices for sidelink wireless communications are described in which multiple resource pools are available for sidelink communications. Each resource pool may include a set of frequency domain resources, a set of time domain resources, and one or more subsets of available spatial resources. A transmitting user equipment (UE) may select a first spatial resource of a first resource pool for the sidelink communication, and determine a demodulation reference signal (DMRS) pattern for the sidelink communications based on the selected first spatial resource of the first resource pool. The transmitting UE may then transmit the sidelink communication and DMRS to a receiving UE using the first spatial resource of the first resource pool. The receiving UE may identify the DMRS and use the DMRS to demodulate the sidelink communication of the transmitting UE.

28 Claims, 24 Drawing Sheets

(51) Int. Cl.

| | | |
|---|---|---|
| *H04L 5/10* | (2006.01) | |
| *H04L 5/00* | (2006.01) | |
| *H04W 92/18* | (2009.01) | |
| *H04L 12/18* | (2006.01) | |
| *H04W 28/08* | (2009.01) | |
| *H04W 76/14* | (2018.01) | |
| *H04L 67/104* | (2022.01) | |

(52) U.S. Cl.
CPC ... *H04W 72/0446* (2013.01); *H04W 72/0453* (2013.01); *H04L 12/1818* (2013.01); *H04L 29/08306* (2013.01); *H04W 28/0875* (2020.05); *H04W 76/14* (2018.02); *H04W 92/18* (2013.01)

(58) Field of Classification Search
CPC . H04W 72/04; H04W 72/0453; H04W 92/16; H04W 92/18; H04W 28/0875; H04W 76/00; H04W 76/10; H04W 76/14; H04L 47/78; H04L 65/1069; H04L 12/1818; H04L 29/08306

See application file for complete search history.

(56) References Cited

U.S. PATENT DOCUMENTS

| | | | | |
|---|---|---|---|---|
| 2019/0044679 | A1 | 2/2019 | Manolakos et al. | |
| 2019/0297600 | A1* | 9/2019 | Kim | H04W 4/00 |
| 2019/0342910 | A1* | 11/2019 | Cao | H04W 72/1289 |
| 2019/0364588 | A1* | 11/2019 | Lu | H04W 88/08 |
| 2020/0229173 | A1* | 7/2020 | Cao | H04W 72/048 |
| 2020/0236656 | A1* | 7/2020 | Cao | H04W 76/11 |
| 2020/0288433 | A1* | 9/2020 | Yu | H04W 72/0453 |
| 2020/0296731 | A1* | 9/2020 | Chae | H04W 72/0486 |
| 2020/0396717 | A1* | 12/2020 | Luo | H04L 5/0053 |
| 2021/0160821 | A1* | 5/2021 | Lin | H04W 74/08 |
| 2021/0212086 | A1* | 7/2021 | Li | H04L 1/1812 |
| 2021/0235421 | A1* | 7/2021 | Xing | H04W 72/0446 |
| 2021/0329606 | A1* | 10/2021 | Zhao | H04W 72/04 |
| 2022/0007378 | A1* | 1/2022 | Basu Mallick | H04L 5/001 |

OTHER PUBLICATIONS

Nokia., et al., "Discussions on DMRS for NR Sidelink", 3GPP Draft, 3GPP TSG RAN WG1 Meeting AH-1901, R1-1902577-Nokia-FS_NR_V2X-Discussions on DMRS for NR Sidelink, 3rd Generation Partnership Project (3GPP), Mobile Competence Centre, 650, Route Des Lucioles, F-06921 Sophia-Antipolis Ced, vol. RAN WG1, No. Athens, Greece, Feb. 25, 2019-Mar. 1, 2019, Feb. 16, 2019 (Feb. 16, 2019), XP051600270, 9 Pages, Retrieved from the Internet:URL:http://www.3gpp.org/ftp/tsg%5Fran/WG1%5FRL1/TSGR1%5F96/Docs/R1%2D1902577%2Ezip [retrieved on Feb. 16, 2019] the Whole Document.NOKIA_Discussions_DMRS_2019_9_Pgs_EFS.

Samsung: "On Uu-Based Resource Allocation and Configuration", 3GPP Draft, R1-1901060, 3GPP TSG RAN WG1 Ad-Hoc Meeting 1901, 3rd Generation Partnership Project (3GPP), Mobile Competence Centre, 650, Route Des Lucioles, F-96921 Sophia-Antipolis Cedex, France, vol. RAN WG1, No. Taipei, Taiwan, Jan. 21, 2019-Jan. 25, 2019, Jan. 20, 2019 (Jan. 20, 2019), XP051593905, 7 Pages, Retrieved from the Internet:URL:http://www.3gpp.org/ftp/Meetings%5F3GPP%5FSYNC/RAN1/Docs/R1%2D1901060%2Ezip [retrieved on Jan. 20, 2019] the Whole Document.

* cited by examiner

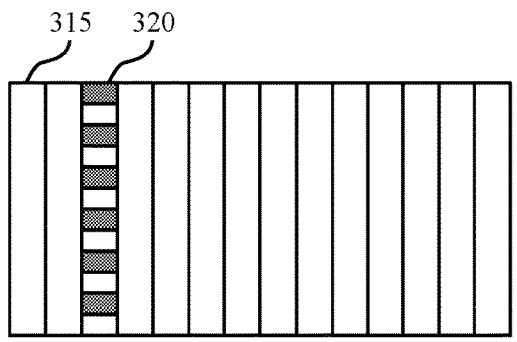
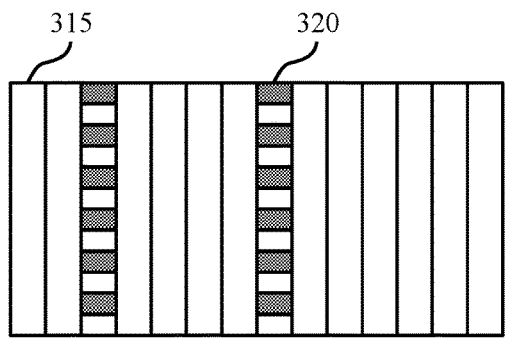
FIG. 3A  FIG. 3B
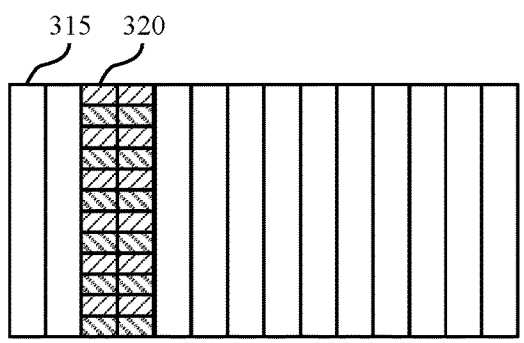
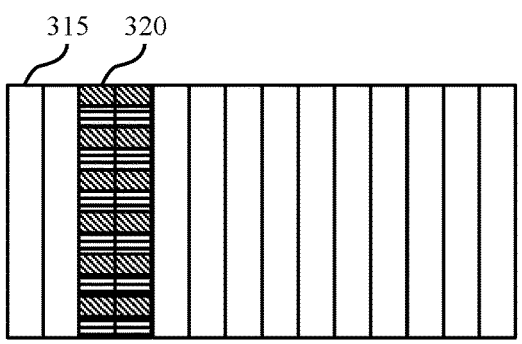
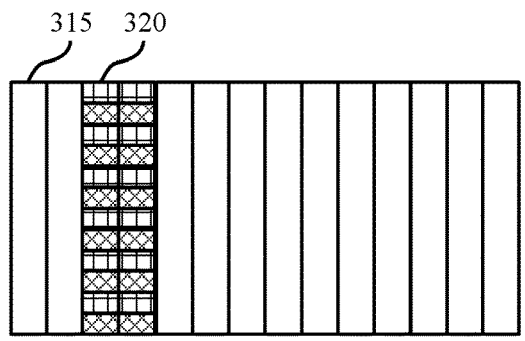
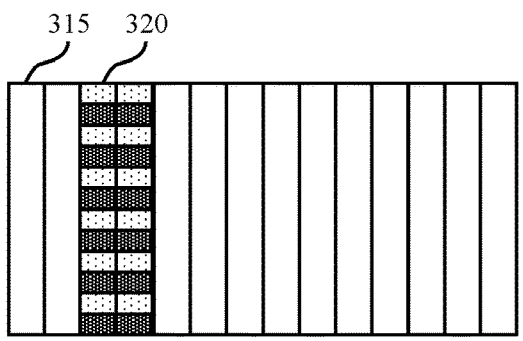
FIG. 3C
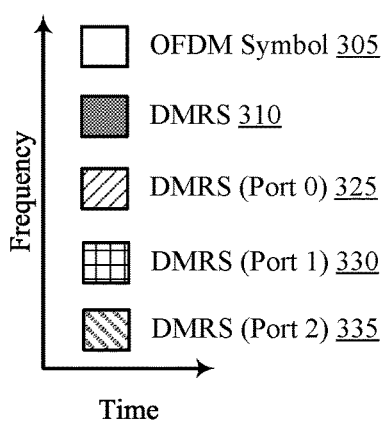
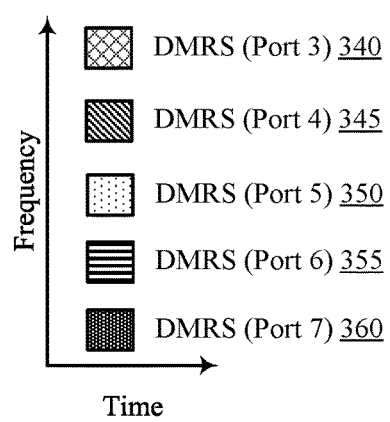

SPATIAL RESOURCE POOL TECHNIQUES FOR MULTIPLE CONCURRENT TRANSMISSIONS IN SIDELINK WIRELESS COMMUNICATIONS

CROSS REFERENCE

The present application for patent claims the benefit of Greek Provisional Patent Application No. 20190100356 by Manolakos et al., entitled "SPATIAL RESOURCE POOL TECHNIQUES FOR MULTIPLE CONCURRENT TRANSMISSIONS IN SIDELINK WIRELESS COMMUNICATIONS," filed Aug. 14, 2019, assigned to the assignee hereof, and expressly incorporated by reference in its entirety herein.

INTRODUCTION

The following relates to wireless communication, and more specifically to resource pool management techniques for transmissions in wireless communication.

Wireless communication systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal frequency division multiple access (OFDMA), or discrete Fourier transform spread orthogonal frequency division multiplexing (DFT-S-OFDM). A wireless multiple-access communication system may include a number of base stations or network access nodes, each simultaneously supporting communication for multiple communication devices, which may be otherwise known as user equipment (UE).

SUMMARY

A method of wireless communication at a first UE is described. The method may include receiving, at the first UE from a base station, two or more resource pools that provide wireless resources available for sidelink communication between the first UE and a second UE. In some examples, each resource pool of the two or more resource pools may include a set of frequency domain resources, a set of time domain resources, and a first subset of available spatial resources that are available for the sidelink communication The method may also include selecting, at the first UE, a first resource pool including a first spatial resource of the first subset of available spatial resources for the sidelink communication, determining a demodulation reference signal pattern for the sidelink communication based on the selected first spatial resource of the first resource pool, and transmitting the sidelink communication and demodulation reference signal to the second UE using the first spatial resource of the first resource pool.

An apparatus for wireless communication at a first UE is described. The apparatus may include a processor, memory coupled with the processor. The processor and memory may be configured to receive, at the first UE from a base station, two or more resource pools that provide wireless resources available for sidelink communication between the first UE and a second UE. In some examples, each resource pool of the two or more resource pools may include a set of frequency domain resources, a set of time domain resources, and a first subset of available spatial resources that are available for the sidelink communication. The processor and memory may be configured to select, at the first UE, a first resource pool including a first spatial resource of the first subset of available spatial resources for the sidelink communication, determine a demodulation reference signal pattern for the sidelink communication based on the selected first spatial resource of the first resource pool, and transmit the sidelink communication and demodulation reference signal to the second UE using the first spatial resource of the first resource pool.

Another apparatus for wireless communication at a first UE is described. The apparatus may include means for receiving, at the first UE from a base station, two or more resource pools that provide wireless resources available for sidelink communication between the first UE and a second UE. In some examples, each resource pool of the two or more resource pools includes a set of frequency domain resources, a set of time domain resources, and a first subset of available spatial resources that are available for the sidelink communication. The apparatus may also include means for selecting, at the first UE, a first resource pool including a first spatial resource of the first subset of available spatial resources for the sidelink communication, determining a demodulation reference signal pattern for the sidelink communication based on the selected first spatial resource of the first resource pool, and transmitting the sidelink communication and a demodulation reference signal to the second UE using the first spatial resource of the first resource pool.

A non-transitory computer-readable medium storing code for wireless communication at a first UE is described. The code may include instructions executable by a processor to receive, at the first UE from a base station, two or more resource pools that provide wireless resources available for sidelink communication between the first UE and a second UE. In some examples, each resource pool of the two or more resource pools may include a set of frequency domain resources, a set of time domain resources, and a first subset of available spatial resources that are available for the sidelink communication. The code may further include instructions executable by a processor to select, at the first UE, a first resource pool including a first spatial resource of the first subset of available spatial resources for the sidelink communication, determine a demodulation reference signal pattern for the sidelink communication based on the selected first spatial resource of the first resource pool, and transmit the sidelink communication and demodulation reference signal to the second UE using the first spatial resource of the first resource pool.

In some examples of the method, apparatuses, and non-transitory computer-readable medium described herein, the first subset of available spatial resources include two or more orthogonal antenna ports, two or more different scrambling identifications of a same orthogonal antenna port, or any combinations thereof.

In some examples of the method, apparatuses, and non-transitory computer-readable medium described herein, the two or more resource pools further include a second resource pool having a same set of frequency domain resources and a same set of time domain resources as the first resource pool, and a different subset of available spatial resources that may be non-overlapping with the first subset of available spatial resources.

In some examples of the method, apparatuses, and non-transitory computer-readable medium described herein, the first subset of available spatial resources includes two or more antenna ports. In some examples of the method, apparatuses, and non-transitory computer-readable medium described herein, the first UE autonomously selects one or more of a number of antenna ports or a subset of the two or more antenna ports, for the sidelink communication.

In some examples of the method, apparatuses, and non-transitory computer-readable medium described herein, the first UE autonomously selecting a transmission rank of the sidelink communication.

In some examples of the method, apparatuses, and non-transitory computer-readable medium described herein, the second UE identifies which spatial resources may be used for the sidelink communication based on the demodulation reference signal pattern used for the sidelink communication.

In some examples of the method, apparatuses, and non-transitory computer-readable medium described herein, the spatial resources include two or more antenna ports used for the sidelink communication.

Some examples of the method, apparatuses, and non-transitory computer-readable medium described herein may further include operations, features, means, or instructions for receiving, at the first UE from the base station, for each of the two or more resource pools, an indication of a second subset of available spatial resources that may be available to one or more other UEs for sidelink communication using the resource pool. In some examples, the first subset of available spatial resources and the second subset of available spatial resources may be non-overlapping for each resource pool of the two or more resource pools.

In some examples of the method, apparatuses, and non-transitory computer-readable medium described herein, a summation of the first subset of available spatial resources and the second subset of available spatial resources may be less than a total number of concurrent spatial transmissions that can be received at the second UE.

Some examples of the method, apparatuses, and non-transitory computer-readable medium described herein may further include operations, features, means, or instructions for rate-matching the sidelink communication with the second UE around reference signal resources associated with the second subset of available spatial resources.

Some examples of the method, apparatuses, and non-transitory computer-readable medium described herein may further include operations, features, means, or instructions for determining that the sidelink communication was not successfully received at the second UE, and retransmitting the sidelink communication using the first resource pool or a second resource pool that was configured for a potential co-scheduled transmission of one or more other UEs.

Some examples of the method, apparatuses, and non-transitory computer-readable medium described herein may further include operations, features, means, or instructions for receiving feedback from the second UE that indicates whether one or more resources of the potential co-scheduled transmission were detected as being unavailable for the sidelink communication, and where a retransmission resource may be selected based on the feedback.

In some examples of the method, apparatuses, and non-transitory computer-readable medium described herein, the first UE selects the retransmission resource from the first resource pool when each of the potential co-scheduled transmissions may be indicated as containing a transmission, and where the first UE selects the retransmission resource from the first resource pool and the second resource pool when one or more of the potential co-scheduled transmissions may be indicated as being empty.

In some examples of the method, apparatuses, and non-transitory computer-readable medium described herein, the first subset of available spatial resources include a subset of antenna ports or a transmission rank that may be available for sidelink communication, a subset of demodulation reference signal scrambling identifications that may be available for sidelink communication, or any combinations thereof.

In some examples of the method, apparatuses, and non-transitory computer-readable medium described herein, the first resource pool includes a sub-pool of two or more available demodulation reference signal scrambling identifications, and where the first UE further receives an indication of at least one potential co-scheduled demodulation reference signal scrambling identification in the first resource pool.

In some examples of the method, apparatuses, and non-transitory computer-readable medium described herein, the first resource pool includes a sub-pool of two or more available combinations of demodulation reference signal scrambling identifications and antenna ports, and where the first UE further receives an indication of two or more potential co-scheduled combinations of demodulation reference signal scrambling identifications and antenna ports in the first resource pool.

A method of wireless communication at a second UE is described. The method may include identifying, at the second UE, two or more resource pools that provide wireless resources available for sidelink communication between a first UE and the second UE. In some examples, each resource pool of the two or more resource pools may include a set of frequency domain resources, a set of time domain resources, and a first subset of available spatial resources that are available for the sidelink communication. The method may also include receiving, from the first UE, an indication that a first resource pool of the two or more resource pools is to be used for the sidelink communication, monitoring the first subset of available spatial resources associated with the first resource pool, determining that a demodulation reference signal pattern for the sidelink communication is present in a first spatial resource of the first resource pool, and demodulating the sidelink communication. In some examples, demodulating the sidelink communication is based on the demodulation reference signal pattern.

An apparatus for wireless communication at a second UE is described. The apparatus may include a processor, memory coupled with the processor. The processor and memory may be configured to cause the apparatus to identify, at the second UE, two or more resource pools that provide wireless resources available for sidelink communication between a first UE and the second UE. In some examples, each resource pool of the two or more resource pools may include a set of frequency domain resources, a set of time domain resources, and a first subset of available spatial resources that are available for the sidelink communication. The processor and memory may also be configured to receive, from the first UE, an indication that a first resource pool of the two or more resource pools is to be used for the sidelink communication, monitor the first subset of available spatial resources associated with the first resource pool, determine that a demodulation reference signal pattern for the sidelink communication is present in a first spatial resource of the first resource pool, and demodulate the sidelink communication. In some examples, demodulating the sidelink communication is based on the demodulation reference signal pattern.

Another apparatus for wireless communication at a second UE is described. The apparatus may include means for identifying, at the second UE, two or more resource pools that provide wireless resources available for sidelink communication between a first UE and the second UE. In some examples, each resource pool of the two or more resource pools may include a set of frequency domain resources, a set of time domain resources, and a first subset of available spatial resources that are available for the sidelink communication. The apparatus may also include means for receiving, from the first UE, an indication that a first resource pool of the two or more resource pools is to be used for the sidelink communication, monitoring the first subset of available spatial resources associated with the first resource pool, determining that a demodulation reference signal pattern for the sidelink communication is present in a first spatial resource of the first resource pool, and demodulating the sidelink communication. In some examples, demodulating the sidelink communication is based on the demodulation reference signal pattern.

A non-transitory computer-readable medium storing code for wireless communication at a second UE is described. The code may include instructions executable by a processor to identify, at the second UE, two or more resource pools that provide wireless resources available for sidelink communication between a first UE and the second UE. In some examples, each resource pool of the two or more resource pools may include a set of frequency domain resources, a set of time domain resources, and a first subset of available spatial resources that are available for the sidelink communication. The code may include instructions executable by a processor to receive, from the first UE, an indication that a first resource pool of the two or more resource pools is to be used for the sidelink communication, monitor the first subset of available spatial resources associated with the first resource pool, determine that a demodulation reference signal pattern for the sidelink communication is present in a first spatial resource of the first resource pool, and demodulate the sidelink communication. In some examples, demodulating the sidelink communication is based on the demodulation reference signal pattern.

Some examples of the method, apparatuses, and non-transitory computer-readable medium described herein may further include operations, features, means, or instructions for receiving, from the first UE or from a base station, for each of the two or more resource pools, an indication of a second subset of one or more available spatial resources that may be available to one or more other UEs for sidelink communication using the associated resource pool, where the first subset of available spatial resources and the second subset of one or more available spatial resources may be non-overlapping for each resource pool of the two or more resource pools.

In some examples of the method, apparatuses, and non-transitory computer-readable medium described herein, a summation of the first subset of available spatial resources and the second subset of one or more available spatial resources may be less than a total number of concurrent spatial transmissions that can be received at the second UE.

Some examples of the method, apparatuses, and non-transitory computer-readable medium described herein may further include operations, features, means, or instructions for monitoring for a transmission in the second subset of one or more available spatial resources of the first resource pool, and mitigating interference in the first subset of available spatial resources based on detecting the transmission in the second subset of the one or more available spatial resources.

In some examples of the method, apparatuses, and non-transitory computer-readable medium described herein, the first subset of available spatial resources include two or more orthogonal antenna ports, two or more different scrambling identifications of a same orthogonal antenna port, or any combinations thereof.

In some examples of the method, apparatuses, and non-transitory computer-readable medium described herein, the two or more resource pools further include a second resource pool having a same set of frequency domain resources and a same set of time domain resources as the first resource pool, and a different subset of available spatial resources that may be non-overlapping with the first subset of available spatial resources.

In some examples of the method, apparatuses, and non-transitory computer-readable medium described herein, the first subset of available spatial resources includes two or more antenna ports, and the first UE autonomously selects one or more of a number of antenna ports or a subset of the two or more antenna ports, for the sidelink communication.

Some examples of the method, apparatuses, and non-transitory computer-readable medium described herein may further include operations, features, means, or instructions for identifying which of the two or more antenna ports may be used for the sidelink communication based on the demodulation reference signal pattern associated with each spatial resource of the first subset of available spatial resources.

Some examples of the method, apparatuses, and non-transitory computer-readable medium described herein may further include operations, features, means, or instructions for determining that the sidelink communication may be not successfully received at the second UE, and transmitting feedback information to the first UE that indicates the sidelink communication was not successfully received.

Some examples of the method, apparatuses, and non-transitory computer-readable medium described herein may further include operations, features, means, or instructions for determining whether one or more resources of one or more potential co-scheduled transmissions contain a transmission from one or more other UEs. In some examples, the feedback information further indicates whether the one or more resources of the one or more potential co-scheduled transmissions were detected as being unavailable for the sidelink communication.

In some examples of the method, apparatuses, and non-transitory computer-readable medium described herein, the retransmission resources may be in the first resource pool when each of the potential co-scheduled transmission resources contain the transmission. In some examples, the retransmission resources may be in one of the first resource pool or a second resource pool when at least one of the potential co-scheduled transmission resources may be available for sidelink communication.

In some examples of the method, apparatuses, and non-transitory computer-readable medium described herein, the first subset of available spatial resources include a subset of antenna ports that are available for sidelink communication, a subset of demodulation reference signal scrambling identifications that are available for sidelink communication, or any combinations thereof. In some examples of the method, apparatuses, and non-transitory computer-readable medium described herein, the first resource pool includes a sub-pool of available demodulation reference signal scrambling identifications, and where the second UE further receives an indication of potential co-scheduled demodulation reference signal scrambling identifications in the first resource pool.

In some examples of the method, apparatuses, and non-transitory computer-readable medium described herein, the first resource pool includes a sub-pool of available combinations of demodulation reference signal scrambling identifications and antenna ports. In some examples, the second UE further receives an indication of potential co-scheduled combinations of demodulation reference signal scrambling identifications and antenna ports in the first resource pool.

BRIEF DESCRIPTION OF THE DRAWINGS

FIGS. 3A, 3B, and 3C illustrate examples of reference signal patterns that support spatial resource pools for multiple concurrent transmissions in sidelink wireless communications in accordance with one or more aspects of the present disclosure.

DETAILED DESCRIPTION

Figure 1:
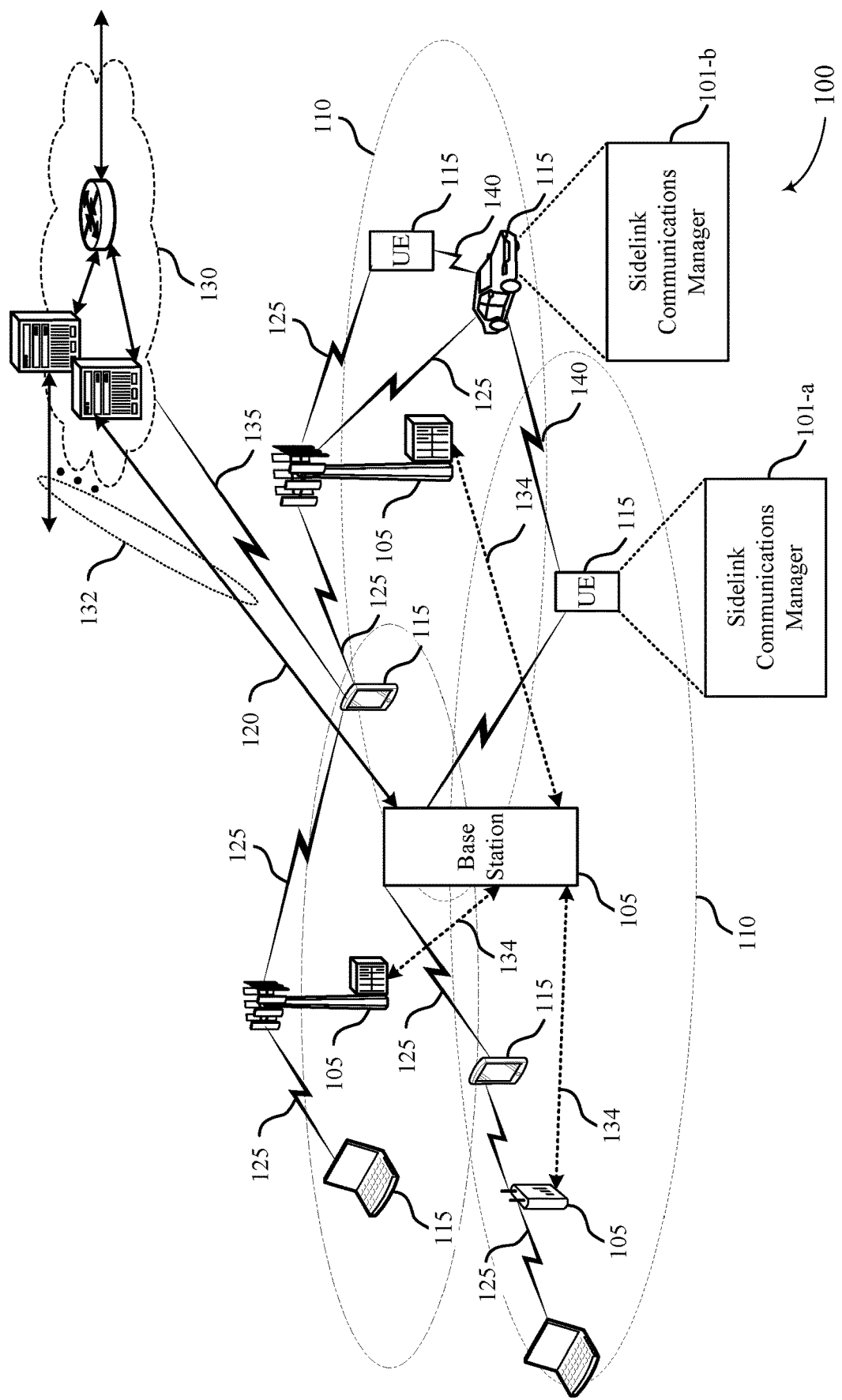
FIG. 1 illustrates an example of a wireless communication system that supports spatial resource pool techniques for multiple concurrent transmissions in sidelink wireless communications in accordance with aspects of the present disclosure.

A wireless communication system may support both access links and sidelinks for communications between wireless devices. An access link may refer to a communication link between a UE and a base station. For example, an access link may support uplink signaling, downlink signaling, connection procedures, etc. A sidelink may refer to a communication link between similar wireless devices (e.g., a communication link between UEs, or a backhaul communication link between base stations). It is noted that while various examples provided herein are discussed for UE sidelink devices, such sidelink techniques may be used for any type of wireless communications devices (e.g., UEs, base stations, etc.) that use sidelink communications. For example, a sidelink may support device-to-device (D2D) communication, vehicle-to-everything (V2X) and/or vehicle-to-vehicle (V2V) communication, message relaying, discovery signaling, beacon signaling, or any combination of these or other signals transmitted over-the-air from between devices.

Various sidelink connections between sidelink devices thus may be used to support data flows between the devices. As demand for sidelink communication increases, (e.g., due to increased V2X demand for autonomous and semi-autonomous vehicles, D2D communication between Internet-of-Things (IoT) devices, etc.), techniques to efficiently and reliably enhance throughput of sidelink channels is desirable. Techniques such as those discussed in various aspects of the present disclosure provide multi-user multiple-input multiple-output (MU-MIMO) communications that may be employed to enhance a number of data transmission streams that may be supported in sidelink communications. In some cases, a base station may configure a number of sidelink UEs for concurrent transmissions using a same time/frequency resource pool (e.g., a number of symbols, slots, or subframes and resource blocks (RBs) may be configured for sidelink communications). Within each time/frequency resource pool, in some cases, multiple spatial resource pools (e.g., subsets of available antenna ports, subsets of available demodulation reference signal (DMRS) scrambling IDs, or combinations thereof) may be configured, and one or more of which may be selected and used to transmit sidelink communications.

In some cases, a first UE and a second UE may receive configuration information from a base station that configures multiple resource pools that are available for sidelink communication between the first UE and the second UE. In some cases, each resource pool may include a set of frequency domain resources, a set of time domain resources, and a first subset of available spatial resources. The first UE may select a first resource pool and a first spatial resource for the sidelink communication, and determine a DMRS pattern for the sidelink communication based on the selected first resource pool and the selected first spatial resource. The first UE may then transmit the sidelink communication and DMRS to the second UE using the first resource pool and the first spatial resource. The second UE, in some cases, may perform blind detection for the DMRS by testing a number of different hypotheses of different DMRS patterns on different spatial resources within a resource pool. Upon detection of the DMRS pattern, the second UE may use the DMRS to demodulate the sidelink communication of the first UE.

In some cases, the first UE and the second UE may also receive configuration information, for each of the two or more resource pools, that provides a second subset of available spatial resources that are co-scheduled for one or more other UEs that may use the resource pools for sidelink communication. In such cases, the first UE may use the information for co-scheduled spatial resources to perform rate-matching around symbols that are associated with the resource pool and spatial resources such that data transmissions of the first UE are non-overlapping with reference signal symbols of co-scheduled spatial resources. Further, the second UE may use the information for co-scheduled spatial resources to detect concurrent transmissions on the co-scheduled spatial resources and use the detected signal for interference mitigation of the sidelink communication from the first UE (e.g., by subtracting the detected signal from the sidelink communication of the first UE).

Techniques such as those discussed herein thus provide for enhanced reliability and spectral efficiency for sidelink communications. For example, by enabling the use of multiple spatial resources, multiple different UEs may transmit using common time/frequency resources, which may increase the overall throughput of a system. Further, such concurrent sidelink communications may allow for additional scheduling flexibility at a transmitting UE or base station, which may help reduce latency of a system.

Aspects of the disclosure are initially described in the context of wireless communication systems. Various examples of resource pools and DMRS sequence selection are then described. Aspects of the disclosure are further illustrated by and described with reference to process flows, apparatus diagrams, system diagrams, and flowcharts that relate to spatial resource pool techniques for multiple concurrent transmissions in sidelink wireless communications.

FIG. 1 illustrates an example of a wireless communication system 100 that supports spatial resource pool techniques for multiple concurrent transmissions in sidelink wireless communications in accordance with aspects of the present disclosure. The wireless communication system 100 includes base stations 105, UEs 115, and a core network 130. In some examples, the wireless communication system 100 may be an LTE network, an LTE-A network, an LTE-A Pro network, or an NR network. In some cases, wireless communication system 100 may support enhanced broadband communications, ultra-reliable (e.g., mission critical) communications, low latency communications, or communications with low-cost and low-complexity devices.

Base stations 105 may wirelessly communicate with UEs 115 via one or more base station antennas. Base stations 105 described herein may include or may be referred to by those skilled in the art as a base transceiver station, a radio base station, an access point, a radio transceiver, a NodeB, an eNodeB (eNB), a next-generation NodeB or giga-NodeB (either of which may be referred to as a gNB), a Home NodeB, a Home eNodeB, or some other suitable terminology. Wireless communication system 100 may include base stations 105 of different types (e.g., macro or small cell base stations). The UEs 115 described herein may be able to communicate with various types of base stations 105 and network equipment including macro eNBs, small cell eNBs, gNBs, relay base stations, and the like.

Each base station 105 may be associated with a particular geographic coverage area 110 in which communications with various UEs 115 is supported. Each base station 105 may provide communication coverage for a respective geographic coverage area 110 via communication links 125, and communication links 125 between a base station 105 and a UE 115 may utilize one or more carriers. Communication links 125 shown in wireless communication system 100 may include uplink transmissions from a UE 115 to a base station 105, or downlink transmissions from a base station 105 to a UE 115. Downlink transmissions may also be called forward link transmissions while uplink transmissions may also be called reverse link transmissions.

The geographic coverage area 110 for a base station 105 may be divided into sectors making up a portion of the geographic coverage area 110, and each sector may be associated with a cell. For example, each base station 105 may provide communication coverage for a macro cell, a small cell, a hot spot, or other types of cells, or various combinations thereof. In some examples, a base station 105 may be movable and therefore provide communication coverage for a moving geographic coverage area 110. In some examples, different geographic coverage areas 110 associated with different technologies may overlap, and overlapping geographic coverage areas 110 associated with different technologies may be supported by the same base station 105 or by different base stations 105. The wireless communication system 100 may include, for example, a heterogeneous LTE/LTE-A/LTE-A Pro or NR network in which different types of base stations 105 provide coverage for various geographic coverage areas 110.

The term "cell" refers to a logical communication entity used for communication with a base station 105 (e.g., over a carrier), and may be associated with an identifier for distinguishing neighboring cells (e.g., a physical cell identifier (PCID), a virtual cell identifier (VCID)) operating via the same or a different carrier. In some examples, a carrier may support multiple cells, and different cells may be configured according to different protocol types (e.g., machine-type communication (MTC), narrowband IoT (NB-IoT), enhanced mobile broadband (eMBB), or others) that may provide access for different types of devices. In some cases, the term "cell" may refer to a portion of a geographic coverage area 110 (e.g., a sector) over which the logical entity operates.

UEs 115 may be dispersed throughout the wireless communication system 100, and each UE 115 may be stationary or mobile. A UE 115 may also be referred to as a mobile device, a wireless device, a remote device, a handheld device, or a subscriber device, or some other suitable terminology, where the "device" may also be referred to as a unit, a station, a terminal, or a client. A UE 115 may also be a personal electronic device such as a cellular phone, a personal digital assistant (PDA), a tablet computer, a laptop computer, or a personal computer. In some examples, a UE 115 may also refer to a wireless local loop (WLL) station, an IoT device, an Internet of Everything (IoE) device, or an MTC device, or the like, which may be implemented in various articles such as appliances, vehicles, meters, or the like.

Some UEs 115, such as MTC or IoT devices, may be low cost or low complexity devices, and may provide for automated communication between machines (e.g., via Machine-to-Machine (M2M) communication). M2M communication or MTC may refer to data communication technologies that allow devices to communicate with one another or a base station 105 without human intervention. In some examples, M2M communication or MTC may include communications from devices that integrate sensors or meters to measure or capture information and relay that information to a central server or application program that can make use of the information or present the information to humans interacting with the program or application. Some UEs 115 may be designed to collect information or enable automated behavior of machines. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

Some UEs 115 may be configured to employ operating modes that reduce power consumption, such as half-duplex communications (e.g., a mode that supports one-way communication via transmission or reception, but not transmission and reception simultaneously). In some examples, half-duplex communications may be performed at a reduced peak rate. Other power conservation techniques for UEs 115 include entering a power saving "deep sleep" mode when not engaging in active communications, or operating over a limited bandwidth (e.g., according to narrowband communications). In some cases, UEs 115 may be designed to support critical functions (e.g., mission critical functions), and a wireless communication system 100 may be configured to provide ultra-reliable communications for these functions.

In some cases, a UE 115 may also be able to communicate directly with other UEs 115 (e.g., using a peer-to-peer (P2P) or D2D protocol). One or more of a group of UEs 115 utilizing D2D communications may be within the geographic coverage area 110 of a base station 105. Other UEs 115 in such a group may be outside the geographic coverage area 110 of a base station 105, or be otherwise unable to receive transmissions from a base station 105. In some cases, groups of UEs 115 communicating via D2D communications may utilize a one-to-many (1:M) system in which each UE 115 transmits to every other UE 115 in the group. In some cases, a base station 105 facilitates the scheduling of resources for D2D communications. In other cases, D2D communications are carried out between UEs 115 without the involvement of a base station 105.

Base stations 105 may communicate with the core network 130 and with one another. For example, base stations 105 may interface with the core network 130 through backhaul links 132 (e.g., via an S1, N2, N3, or other interface). Base stations 105 may communicate with one another over backhaul links 134 (e.g., via an X2, Xn, or other interface) either directly (e.g., directly between base stations 105) or indirectly (e.g., via core network 130). A UE 115 may communicate with the core network 130 through communication link 135.

The core network 130 may provide user authentication, access authorization, tracking, Internet Protocol (IP) connectivity, and other access, routing, or mobility functions. The core network 130 may be an evolved packet core (EPC), which may include at least one mobility management entity (MME), at least one serving gateway (S-GW), and at least one Packet Data Network (PDN) gateway (P-GW). The MME may manage non-access stratum (e.g., control plane) functions such as mobility, authentication, and bearer management for UEs 115 served by base stations 105 associated with the EPC. User IP packets may be transferred through the S-GW, which itself may be connected to the P-GW. The P-GW may provide IP address allocation as well as other functions. The P-GW may be connected to the network operators IP services. The operators IP services may include access to the Internet, Intranet(s), an IP Multimedia Subsystem (IMS), or a Packet-Switched (PS) Streaming Service.

At least some of the network devices, such as a base station 105, may include subcomponents such as an access network entity, which may be an example of an access node controller (ANC). Each access network entity may communicate with UEs 115 through a number of other access network transmission entities, which may be referred to as a radio head, a smart radio head, or a transmission/reception point (TRP). In some configurations, various functions of each access network entity or base station 105 may be distributed across various network devices (e.g., radio heads and access network controllers) or consolidated into a single network device (e.g., a base station 105).

Wireless communication system 100 may operate using one or more frequency bands, typically in the range of 300 megahertz (MHz) to 300 gigahertz (GHz). Generally, the region from 300 MHz to 3 GHz is known as the ultra-high frequency (UHF) region or decimeter band, since the wavelengths range from approximately one decimeter to one meter in length. UHF waves may be blocked or redirected by buildings and environmental features. However, the waves may penetrate structures sufficiently for a macro cell to provide service to UEs 115 located indoors. Transmission of UHF waves may be associated with smaller antennas and shorter range (e.g., less than 100 km) compared to transmission using the smaller frequencies and longer waves of the high frequency (HF) or very high frequency (VHF) portion of the spectrum below 300 MHz.

Wireless communication system 100 may also operate in a super high frequency (SHF) region using frequency bands from 3 GHz to 30 GHz, also known as the centimeter band. The SHF region includes bands such as the 5 GHz industrial, scientific, and medical (ISM) bands, which may be used opportunistically by devices that may be capable of tolerating interference from other users.

The electromagnetic spectrum is often subdivided, based on frequency/wavelength, into various classes, bands, channels, etc. In 5G NR, two initial operating bands have been identified as frequency range designations FR1 (410 MHz-7.125 GHz) and FR2 (24.25 GHz-52.6 GHz). The frequencies between FR1 and FR2 are often referred to as mid-band frequencies. Although a portion of FR1 is greater than 6 GHz, FR1 is often referred to (interchangeably) as a "Sub-6 GHz" band in various documents and articles. A similar nomenclature issue sometimes occurs regarding FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

With the above aspects in mind, unless specifically stated otherwise, it should be understood that the term "sub-6 GHz" or the like if used herein may broadly represent frequencies that may be less than 6 GHz, may be within FR1, or may include mid-band frequencies. Further, unless specifically stated otherwise, it should be understood that the term "millimeter wave" or the like if used herein may broadly represent frequencies that may include mid-band frequencies, may be within FR2, or may be within the EHF band.

Wireless communication system 100 may also operate in an extremely high frequency (EHF) region of the spectrum (e.g., from 30 GHz to 300 GHz), also known as the millimeter band. In some examples, wireless communication system 100 may support millimeter wave (mmW) communications between UEs 115 and base stations 105, and EHF antennas of the respective devices may be even smaller and more closely spaced than UHF antennas. In some cases, this may facilitate use of antenna arrays within a UE 115. However, the propagation of EHF transmissions may be subject to even greater atmospheric attenuation and shorter range than SHF or UHF transmissions. Techniques disclosed herein may be employed across transmissions that use one or more different frequency regions, and designated use of bands across these frequency regions may differ by country or regulating body.

In some cases, wireless communication system 100 may utilize both licensed and unlicensed radio frequency spectrum bands. For example, wireless communication system 100 may employ License Assisted Access (LAA), LTE-Unlicensed (LTE-U) radio access technology, or NR technology in an unlicensed band such as the 5 GHz ISM band. When operating in unlicensed radio frequency spectrum bands, wireless devices such as base stations 105 and UEs 115 may employ listen-before-talk (LBT) procedures to ensure a frequency channel is clear before transmitting data. In some cases, operations in unlicensed bands may be based on a carrier aggregation configuration in conjunction with component carriers operating in a licensed band (e.g., LAA). Operations in unlicensed spectrum may include downlink transmissions, uplink transmissions, peer-to-peer transmissions, or a combination of these. Duplexing in unlicensed spectrum may be based on frequency division duplexing (FDD), time division duplexing (TDD), or a combination of both.

In some examples, base station 105 or UE 115 may be equipped with multiple antennas, which may be used to employ techniques such as transmit diversity, receive diversity, multiple-input multiple-output (MIMO) communications, or beamforming. For example, wireless communication system 100 may use a transmission scheme between a transmitting device (e.g., a base station 105) and a receiving device (e.g., a UE 115), where the transmitting device is equipped with multiple antennas and the receiving device is equipped with one or more antennas. MIMO communications may employ multipath signal propagation to increase the spectral efficiency by transmitting or receiving multiple signals via different spatial layers, which may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream, and may carry bits associated with the same data stream (e.g., the same codeword) or different data streams. Different spatial layers may be associated with different antenna ports used for channel measurement and reporting. MIMO techniques include single-user MIMO (SU-MIMO) where multiple spatial layers are transmitted to the same receiving device, and MU-MIMO where multiple spatial layers are transmitted to multiple devices.

Beamforming, which may also be referred to as spatial filtering, directional transmission, or directional reception, is a signal processing technique that may be used at a transmitting device or a receiving device (e.g., a base station 105 or a UE 115) to shape or steer an antenna beam (e.g., a transmit beam or receive beam) along a spatial path between the transmitting device and the receiving device. Beamforming may be achieved by combining the signals communicated via antenna elements of an antenna array such that signals propagating at particular orientations with respect to an antenna array experience constructive interference while others experience destructive interference. The adjustment of signals communicated via the antenna elements may include a transmitting device or a receiving device applying certain amplitude and phase offsets to signals carried via each of the antenna elements associated with the device. The adjustments associated with each of the antenna elements may be defined by a beamforming weight set associated with a particular orientation (e.g., with respect to the antenna array of the transmitting device or receiving device, or with respect to some other orientation).

In some cases, the antennas of a base station 105 or UE 115 may be located within one or more antenna arrays, which may support MIMO operations, or transmit or receive beamforming. For example, one or more base station antennas or antenna arrays may be co-located at an antenna assembly, such as an antenna tower. In some cases, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations.

In some cases, wireless communication system 100 may be a packet-based network that operate according to a layered protocol stack. In the user plane, communications at the bearer or Packet Data Convergence Protocol (PDCP) layer may be IP-based. A Radio Link Control (RLC) layer may perform packet segmentation and reassembly to communicate over logical channels. A Medium Access Control (MAC) layer may perform priority handling and multiplexing of logical channels into transport channels. The MAC layer may also use hybrid automatic repeat request (HARQ) to provide retransmission at the MAC layer to improve link efficiency. In the control plane, the Radio Resource Control (RRC) protocol layer may provide establishment, configuration, and maintenance of an RRC connection between a UE 115 and a base station 105 or core network 130 supporting radio bearers for user plane data. At the Physical layer, transport channels may be mapped to physical channels.

In some cases, UEs 115 and base stations 105 may support retransmissions of data to increase the likelihood that data is received successfully. HARQ feedback is one technique of increasing the likelihood that data is received correctly over a communication link 125. HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., signal-to-noise conditions). In some cases, a wireless device may support same-slot HARQ feedback, where the device may provide HARQ feedback in a specific slot for data received in a previous symbol in the slot. In other cases, the device may provide HARQ feedback in a subsequent slot, or according to some other time interval.

Time intervals in LTE or NR may be expressed in multiples of a basic time unit, which may, for example, refer to a sampling period of $T_s=1/30,720,000$ seconds. Time intervals of a communications resource may be organized according to radio frames each having a duration of 10 milliseconds (ms), where the frame period may be expressed as $T_f=307,200\ T_s$. The radio frames may be identified by a system frame number (SFN) ranging from 0 to 1023. Each frame may include 10 subframes numbered from 0 to 9, and each subframe may have a duration of 1 ms. A subframe may be further divided into 2 slots each having a duration of 0.5 ms, and each slot may contain 6 or 7 modulation symbol periods (e.g., depending on the length of the cyclic prefix prepended to each symbol period). Excluding the cyclic prefix, each symbol period may contain 2048 sampling periods. In some cases, a subframe may be the smallest scheduling unit of the wireless communication system 100, and may be referred to as a transmission time interval (TTI). In other cases, a smallest scheduling unit of the wireless communication system 100 may be shorter than a subframe or may be dynamically selected (e.g., in bursts of shortened TTIs (sTTIs) or in selected component carriers using sTTIs).

In some wireless communication systems, a slot may further be divided into multiple mini-slots containing one or more symbols. In some instances, a symbol of a mini-slot or a mini-slot may be the smallest unit of scheduling. Each symbol may vary in duration depending on the subcarrier spacing or frequency band of operation, for example. Further, some wireless communication systems may implement slot aggregation in which multiple slots or mini-slots are aggregated together and used for communication between a UE 115 and a base station 105.

The term "carrier" refers to a set of radio frequency spectrum resources having a defined physical layer structure for supporting communications over a communication link 125. For example, a carrier of a communication link 125 may include a portion of a radio frequency spectrum band that is operated according to physical layer channels for a given radio access technology. Each physical layer channel may carry user data, control information, or other signaling. A carrier may be associated with a pre-defined frequency channel (e.g., an evolved universal mobile telecommunication system terrestrial radio access (E-UTRA) absolute radio frequency channel number (EARFCN)), and may be positioned according to a channel raster for discovery by UEs 115. Carriers may be downlink or uplink (e.g., in an FDD mode), or be configured to carry downlink and uplink communications (e.g., in a TDD mode). In some examples, signal waveforms transmitted over a carrier may be made up of multiple sub-carriers (e.g., using multi-carrier modulation (MCM) techniques such as orthogonal frequency division multiplexing (OFDM) or DFT-S-OFDM).

The organizational structure of the carriers may be different for different radio access technologies (e.g., LTE, LTE-A, LTE-A Pro, NR). For example, communications over a carrier may be organized according to TTIs or slots, each of which may include user data as well as control information or signaling to support decoding the user data. A carrier may also include dedicated acquisition signaling (e.g., synchronization signals or system information, etc.) and control signaling that coordinates operation for the carrier. In some examples (e.g., in a carrier aggregation configuration), a carrier may also have acquisition signaling or control signaling that coordinates operations for other carriers.

Physical channels may be multiplexed on a carrier according to various techniques. A physical control channel and a physical data channel may be multiplexed on a downlink carrier, for example, using time division multiplexing (TDM) techniques, frequency division multiplexing (FDM) techniques, or hybrid TDM-FDM techniques. In some examples, control information transmitted in a physical control channel may be distributed between different control regions in a cascaded manner (e.g., between a common control region or common search space and one or more UE-specific control regions or UE-specific search spaces).

A carrier may be associated with a particular bandwidth of the radio frequency spectrum, and in some examples, the carrier bandwidth may be referred to as a "system bandwidth" of the carrier or the wireless communication system 100. For example, the carrier bandwidth may be one of a number of predetermined bandwidths for carriers of a particular radio access technology (e.g., 1.4, 3, 5, 10, 15, 20, 40, or 80 MHz). In some examples, each served UE 115 may be configured for operating over portions or all of the carrier bandwidth. In other examples, some UEs 115 may be configured for operation using a narrowband protocol type that is associated with a predefined portion or range (e.g., set of subcarriers or RBs) within a carrier (e.g., "in-band" deployment of a narrowband protocol type).

In a system employing MCM techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme). Thus, the more resource elements that a UE 115 receives and the higher the order of the modulation scheme, the higher the data rate may be for the UE 115. In MIMO systems, a wireless communication resource may refer to a combination of a radio frequency spectrum resource, a time resource, and a spatial resource (e.g., spatial layers), and the use of multiple spatial layers may further increase the data rate for communications with a UE 115.

Devices of the wireless communication system 100 (e.g., base stations 105 or UEs 115) may have a hardware configuration that supports communications over a particular carrier bandwidth, or may be configurable to support communications over one of a set of carrier bandwidths. In some examples, the wireless communication system 100 may include base stations 105 and/or UEs 115 that support simultaneous communications via carriers associated with more than one different carrier bandwidth.

Wireless communication system 100 may support communication with a UE 115 on multiple cells or carriers, a feature which may be referred to as carrier aggregation or multi-carrier operation. A UE 115 may be configured with multiple downlink component carriers and one or more uplink component carriers according to a carrier aggregation configuration. Carrier aggregation may be used with both FDD and TDD component carriers.

In some cases, two or more UEs 115 may communicate using sidelink communications 140 for direct communications between two UEs 115. In some cases, a base station 105 may configure two or more sidelink UEs 115 with multiple resource pools that are available for sidelink communications 140. In some cases, each resource pool may include a set of frequency domain resources, a set of time domain resources, and two or more subsets of available spatial resources, and the sidelink UEs 115 may be configured with one or more of the subsets of spatial resources (e.g., subsets of available antenna ports, subsets of available DMRS scrambling IDs, or combinations thereof) for a particular resource pool. A transmitting UE may select a first resource pool and a first spatial resource for the sidelink communication, and determine a DMRS pattern for the sidelink communication based on the selected first resource pool and the selected first spatial resource. The transmitting UE may then transmit the sidelink communication and DMRS to a receiving UE using the first resource pool and the first spatial resource. The receiving UE, in some cases, may perform blind detection for the DMRS by testing a number of different hypotheses of different DMRS patterns on different spatial resources within a resource pool. Upon identification of the DMRS pattern, the receiving UE may use the DMRS to demodulate the sidelink communication of the transmitting UE.

In some cases, the transmitting UE and the receiving UE may also receive configuration information, for each of the two or more resource pools, that provides a second subset of available spatial resources that are co-scheduled for one or more other UEs that may use the resource pools for sidelink communication. In such cases, the transmitting UE may use the information for co-scheduled spatial resources to perform rate-matching around symbols that are associated with the resource pool and spatial resources such that data transmissions of the transmitting UE are non-overlapping with reference signal symbols of co-scheduled spatial resources. Further, the receiving UE may use the information for co-scheduled spatial resources to detect a concurrent transmission on the co-scheduled spatial resources and use the detected signal for interference mitigation of the sidelink communication from the transmitting UE (e.g., by subtracting the detected signal from the sidelink communication of the transmitting UE).

UEs 115 may include a sidelink communications manager 101 (e.g., sidelink communications manager 101-a, sidelink communications manager 101-b), which may enable a UE 115 to manage resource pools for use in MU-MIMO sidelink communications. A first UE 115 may receive, from a base station 105, two or more resource pools that provide wireless resources available for sidelink communication between the first UE 115 and a second UE 115, each resource pool of the two or more resource pools including a set of frequency domain resources, a set of time domain resources, and a first subset of available spatial resources that are available for the sidelink communication. Sidelink communications manager 101-a may select a first resource pool and a first spatial resource of the first subset of available spatial resources for the sidelink communication, and determine a DMRS pattern for the sidelink communication based on the selected first resource pool and the selected first spatial resource. The sidelink communications manager 101-a may then transmit the sidelink communication and a DMRS to the second UE 115 using the first resource pool and the first spatial resource.

Additionally or alternatively, the sidelink communications manager 101-b may also enable a second UE 115 that receives a sidelink communication to manage resource pools for use in MU-MIMO sidelink communications. In some cases, the sidelink communications manager 101-b may identify two or more resource pools that provide wireless resources available for sidelink communication between a first UE 115 and the second UE 115, each resource pool of the two or more resource pools including a set of frequency domain resources, a set of time domain resources, and a first subset of available spatial resources that are available for the sidelink communication. The sidelink communications manager 101-b may receive, from the first UE 115, an indication that a first resource pool of the two or more resource pools is to be used for the sidelink communication, and may monitor the subset of available spatial resources associated with the first resource pool. The sidelink communications manager 101-b may determine that a DMRS pattern for the sidelink communication is present in a first spatial resource of the first resource pool, and demodulate the sidelink communication and DMRS.

Figure 2:
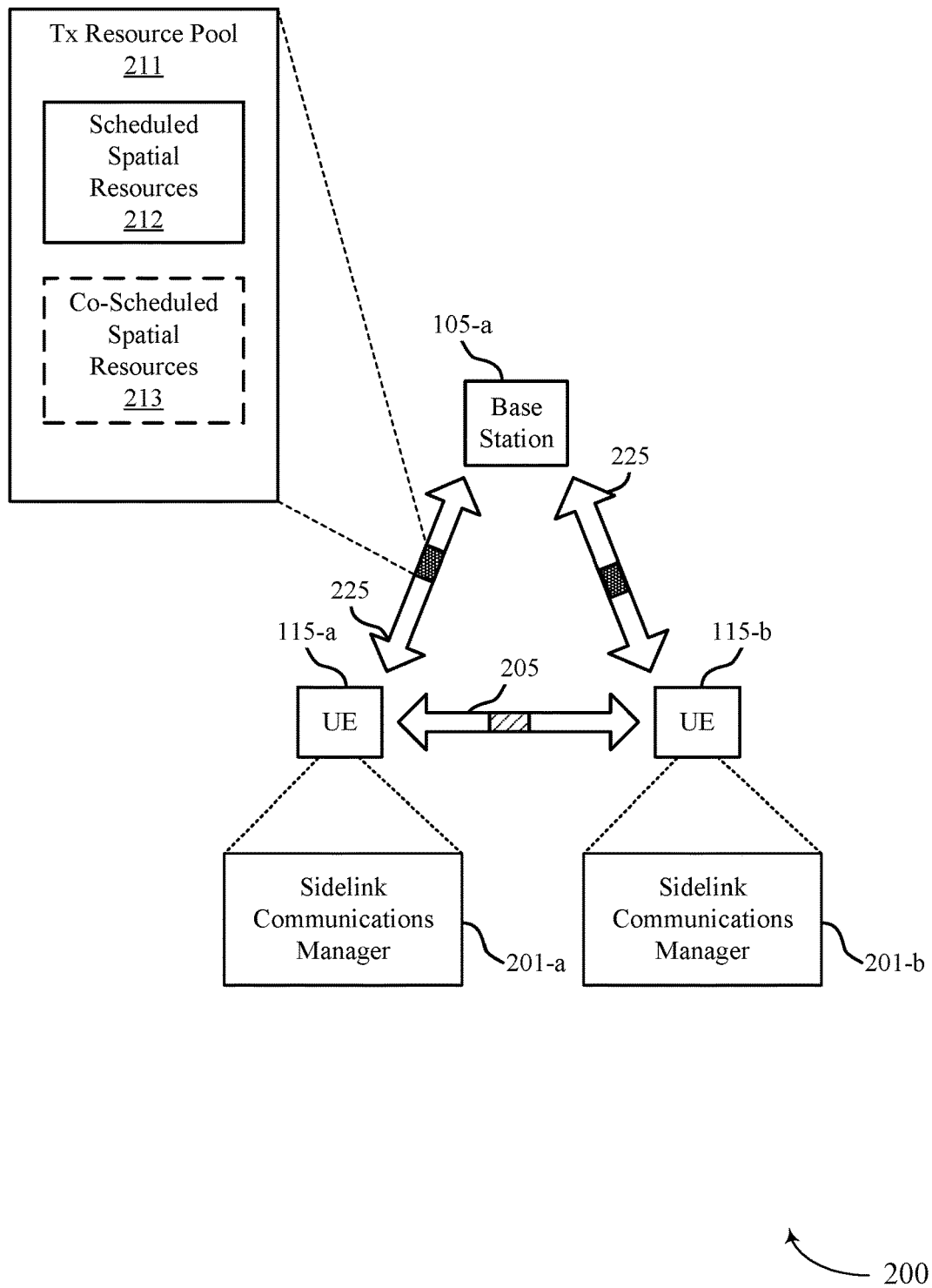
FIG. 2 illustrates an example of a wireless communication system that supports spatial resource pools for multiple concurrent transmissions in sidelink wireless communications in accordance with one or more aspects of the present disclosure.

FIG. 2 illustrates an example of a wireless communication system 200 that supports spatial resource pool techniques for multiple concurrent transmissions in sidelink wireless communications in accordance with one or more aspects of the present disclosure. In some examples, wireless communication system 200 may implement aspects of wireless communication system 100. In some examples, the wireless communication system 200 may include a first UE 115-a and a second UE 115-b, and base station 105-a which may be examples of UEs 115 and base stations 105, respectively, described with reference to FIG. 1. It is noted that communications between two UEs 115 are illustrated in wireless communication system 200 for the sake of brevity, and the techniques described herein may be applicable to multiple UEs 115 within a system. For instance, first UE 115-a may communicate with multiple UEs 115, for example, using broadcast or groupcast communications schemes. UEs 115 may include a sidelink communications manager 201 (e.g., sidelink communications manager 201-a, sidelink communications manager 201-b), which may enable a UE 115 to manage resource pools for use in MU-MIMO sidelink communications. Further, sidelink communication techniques may be used for device-to-device communication of wireless devices other than UEs, such as base station communications (e.g., wireless backhaul links between base stations or TRPs, etc.), communications between access points, and the like.

In some cases, the first UE 115-a and the second UE 115-b may communicate with each other within a V2X system (e.g., using the sidelink communications 205) that may use MU-MIMO to enhance system throughput and efficiency. In some cases, the base station 105-a may configure a number of sidelink UEs for concurrent transmissions using a same resource pool 211 with configured time resources (e.g., a set of symbols, slots or subframes in the resource pool) and frequency resources; one or more of which may be selected and used to transmit sidelink communications. The spatial resources 212, 213 may include orthogonal spatial resources, such as subsets of available orthogonal antenna ports, non-orthogonal spatial resources, such as subsets of available DMRS scrambling IDs of a same orthogonal antenna port, or combinations thereof. In some cases, base station 105-b may provide the configuration information with the resource pool information 210 to the UEs 115 via a link 225 that may be established between the base station 105-a and multiple UEs 115. The configuration information may be provided via RRC signaling, for example.

In some cases, the first UE 115-a may select a first resource pool 211 and a first spatial resource 212 for the sidelink communication, and determine a DMRS pattern 215 for the sidelink communication 205 based on the selected first resource pool 211 and the selected first spatial resource 212. The first UE 115-a may then transmit the sidelink communication 205 and DMRS 215 to the second UE 115-b using the first resource pool 211 and the first spatial resource 212. The second UE 115-b, in some cases, may identify the DMRS 215 (e.g., based on decoding a physical sidelink control channel (PSCCH) that indicates the sidelink resources, or by blind detection through testing a number of different hypotheses of different DMRS patterns on different spatial resources within a resource pool, among other examples) and, upon detection of the DMRS pattern 215, may use the DMRS 215 to demodulate the sidelink communication 205 of the first UE 115-a.

In some cases, the first UE 115-a and the second UE 115-b may also receive co-scheduling configuration information from the base station 105-a via links 225, for each of the two or more resource pools. Such co-scheduling configuration information may provide a second subset of available spatial resources 213 that are co-scheduled for one or more other UEs that may use the configured resource pools for sidelink communication. Thus, the one or more other UEs may, or may not, transmit sidelink communications using one or more of the co-scheduled resources 213. The first UE 115-a may use the resource pool information 210 for the potential co-scheduled spatial resources to perform rate-matching around co-scheduled DMRS symbols such that data transmissions of the first UE 115-a are non-overlapping with reference signal symbols of the potentially co-scheduled spatial resources. Further, the second UE 115-b may use the resource pool information 210 for co-scheduled spatial resources 213 to monitor for concurrent transmissions on the co-scheduled spatial resources 213, and may use a detected signal (if present) for interference mitigation of the sidelink communication from the first UE 115-a.

In some cases, the resource pools may be defined by a set of parameters that identify time resources, frequency resources, and spatial resources. The parameters that identify frequency resources may include, for example, an indication of DMRS Type 1 (e.g., 6 REs of DMRS are dispersed in one OFDM symbol) or DMRS Type 2 (e.g., 4 REs of DMRS are dispersed in one OFDM symbol) scheduling. The parameters that identity time resources may include, for example, an indication of a maximum number of DMRS symbols inside the scheduled resources, and an indication of whether each DMRS occasion would be single symbol or single/double symbol, an indication of a length of the scheduled resources (e.g., that indicates the actual DMRS symbols), an indication of whether front-load DMRS is single or double symbol (e.g., if single/double DMRS symbols are configured), or any combinations thereof. The parameters that identify spatial resources may include, for example, an indication of the scheduled DMRS ports, an indication of DMRS scrambling ID(s), an indication of an assumption on the presence (or lack thereof) of potential co-scheduled DMRS port IDs (e.g., for MU-MIMO), or any combinations thereof. As indicated, in some cases, the spatial resource pool may be partitioned into a number of sub-pools within each resource set, and one of the sub-pools of spatial resources may be indicated as available to a UE 115 for sidelink communications and one or more other sub-pools may be indicated as co-scheduled resources. Each resource pool is associated with one or multiple DMRS patterns as discussed in more detail with reference to FIG. 3.

In some cases, with respect to the DMRS patterns inside the resource pool, a UE 115 may assume that when a PSCCH transmission is received, which may include a payload referred to as sidelink control information (SCI), the SCI may schedule a physical sidelink shared channel (PSSCH) that picks a specific DMRS pattern. In some examples, if any co-scheduled ports are configured as potentially present on the same resource pool, the co-scheduled ports may follow the same DMRS pattern, and may be associated with one of the port IDs associated with the co-scheduled pool of ports of this resource pool which may be different from any port IDs associated with ports which may not be configured as potentially present on the resource pool. The UE also may assume that any co-scheduled port can be processed with the same timing advance (TA) assumption included in the decoded PSCCH. As indicated, each resource pool is associated with one or multiple DMRS patterns, some examples of which are described with respect to FIG. 3.

FIGS. 3A through 3C illustrate examples of reference signal patterns 300 that support spatial resource pool techniques for multiple concurrent transmissions in sidelink wireless communications in accordance with one or more aspects of the present disclosure. In some examples, the DMRS patterns 300-a through 300-c may be implemented in aspects of wireless communication systems 100 or 200, or may be implemented by a UE 115 such as a vehicle (or other wireless device using sidelink communication), as described herein.

As shown in FIG. 3A, the DMRS pattern 300-a (e.g., a DMRS pattern) may include a number of OFDM symbols 305, some of which may include DMRS 310, and some of which may not include DMRS 310. For example, symbol 315 may be an example of an OFDM symbol 305 without DMRS 310, and symbol 320 may be an example of an OFDM symbol 305 with DMRS 310. In some examples, a symbol 320 with DMRS 310 may be transmitted every seventh symbol, such that there are six symbols 315 without DMRS 310 between each symbol 320 with DMRS 310. In some cases, more symbols 315 without DMRS 310 may be present between each symbol 320 with DMRS 310 (e.g., as compared to other DMRS patterns 300).

As shown in FIG. 3B, the DMRS pattern 300-b may include OFDM symbols 305 with DMRS 310 or without DMRS 310. For example, symbol 315 may be an example of an OFDM symbol 305 without DMRS 310, and symbol 320 may be an example of an OFDM symbol 305 with DMRS 310. In some examples, a symbol 320 with DMRS 310 may be transmitted every third or fourth symbol such that there are two or three symbols 315 without DMRS 310 between each symbol 320 with DMRS 310, respectively. FIGS. 3A and 3B illustrate DMRS 310 REs for a single DMRS port of a DMRS Type 1 configuration. In some deployments, a single-symbol Type 1 DMRS configuration may provide orthogonal spatial resources for up to four ports, in which two antenna ports are mapped in even/odd numbered subcarriers in the frequency domain, and orthogonalized using a length-2 orthogonal cover code (OCC), with six REs per port included in an OFDM symbol 305.

In other cases, a double-symbol Type 1 DMRS configuration may provide orthogonal spatial resources for up to eight ports, such as illustrated in FIG. 3C, in which DMRS pattern 300-c includes four illustrations of a same set of OFDM symbols in which four antenna ports are mapped in even/odd numbered subcarriers in the frequency domain over two consecutive OFDM symbols 305, orthogonalized using a length-4 OCC, with six REs per port included in the OFDM symbols 305. Thus, in this example, the DMRS pattern 300-c includes DMRS 325 for port 0, DMRS 330 for port 1, DMRS 335 for port 2, DMRS 340 for port 3, DMRS 345 for port 4, DMRS 350 for port 5, DMRS 355 for port 6, and DMRS 360 for port 7.

In still further cases, Type 2 DMRS configurations may be employed, which may include a single-symbol Type 2 configuration where six ports may be provided in which two antenna ports are mapped in consecutive subcarriers in the frequency domain and orthogonalized using a length-2 OCC, with four REs per port. The Type-2 DMRS configurations may also include a double-symbol Type 2 configuration where 12 ports may be provided in which four antenna ports are mapped in consecutive numbered subcarriers in the frequency domain over two consecutive OFDM symbols and orthogonalized using a length-4 OCC, with four REs per port.

Such DMRS configurations may thus provide, in these examples, spatial resources with up to 12 orthogonal ports. Additionally, different scrambling IDs may be applied to the DMRS pattern for each port, which may provide spatial resources corresponding to non-orthogonal ports. For example, if two scrambling IDs are configured that are mapped to different unique scrambling patterns, up to 24 spatial resources may be provided (e.g., 12 orthogonal resources and 12 non-orthogonal resources). In cases where more than two scrambling IDs are configured, additional spatial resources may be provided. In some cases, as discussed herein, the entire pool of available spatial resources may be divided into multiple sub-pools of subsets of spatial resources that may be configured for different resource pools for sidelink communication. For example, for a rank 2 transmission, two antenna ports are selected and there may be different scrambling IDs, resulting in different DMRS scrambling patterns. For example, for a rank 1 transmission, one antenna port is selected and there may be a unique scrambling ID, resulting in a unique DMRS scrambling pattern. In some examples, available spatial resources may support up to rank 4 transmissions. For example, when the UE selects (e.g., autonomously) a rank for transmission (e.g., rank 2) it may correspond to transmitting via a specified subset of antenna ports (e.g., ports 0&1). The UE may select a rank and may implicitly select one or more antenna ports based on the selected rank. In another example, the UE may explicitly select one more antenna ports. The number of selected antenna ports may be associated with a transmission rank.

Figure 4:
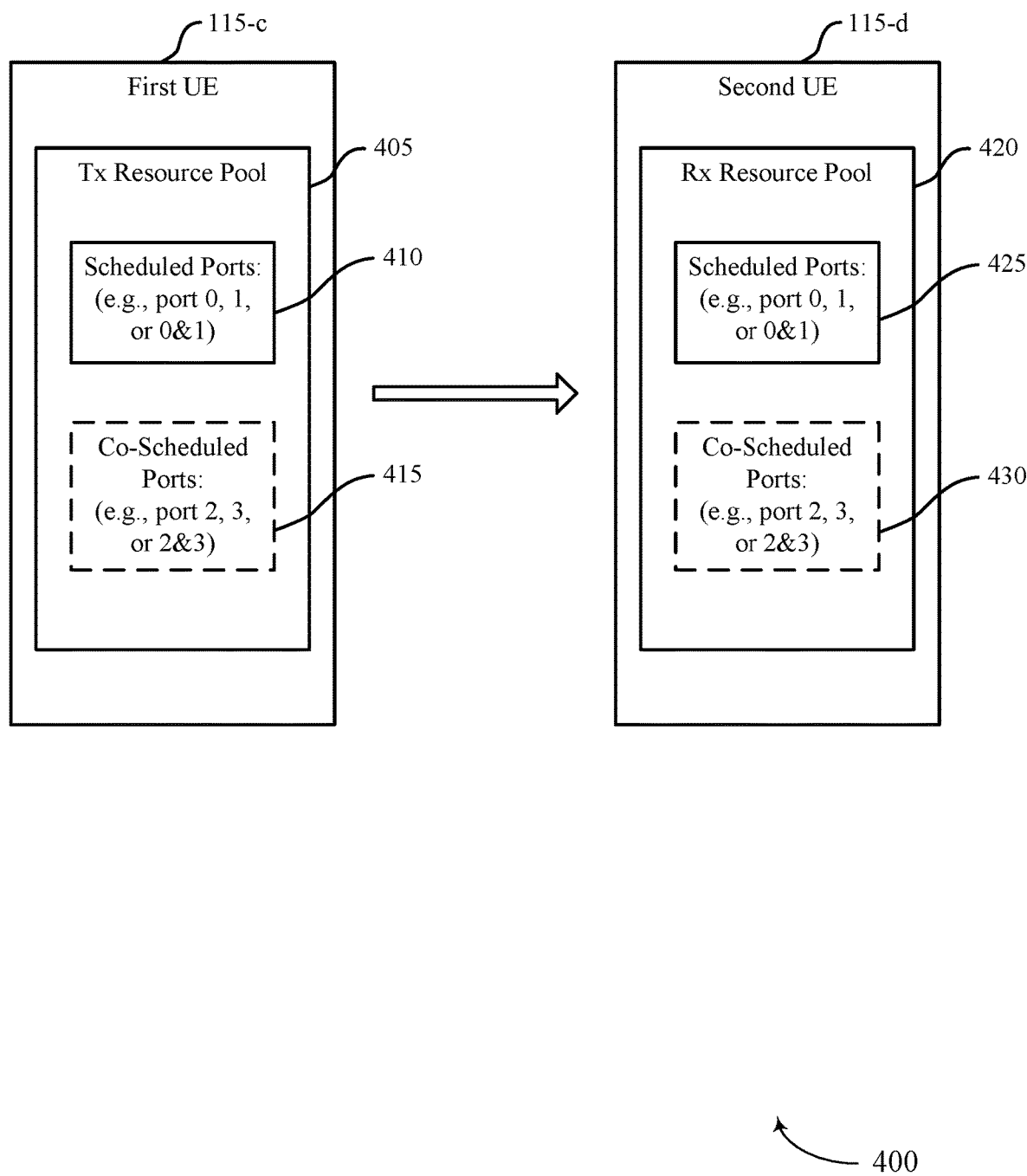
FIGS. 4 through 7 illustrate examples of sidelink resource pools that support spatial resource pool techniques for multiple concurrent transmissions in sidelink wireless communications in accordance with one or more aspects of the present disclosure.

FIG. 4 illustrates an example of sidelink resource pools 400 that support spatial resource pool techniques for multiple concurrent transmissions in sidelink wireless communications in accordance with aspects of the present disclosure. In some examples, sidelink resource pools 400 may be implemented in aspects of wireless communication system 100 or 200. In this example, a first UE 115-c may be a sidelink transmitter, and a second UE 115-d may be a sidelink receiver. In some cases, each of the first UE 115-c and the second UE 115-d may be in communication with a base station (e.g., a base station 105 as described FIG. 1 or 2) that may provide configuration information for sidelink communications.

In this example, the first UE 115-c may be configured with a transmission resource pool 405. The configuration of the transmission resource pool 405 may be provided by the base station, such as in RRC signaling, when the first UE 115-c is configured for sidelink communication. The transmission resource pool 405 may include a first sub-pool of spatial resources 410, and optionally a second sub-pool of spatial resources 415. The second UE 115-d may, in this example, be configured with a receive resource pool 420 that may correspond with the resources of the transmission resource pool 405. The receive resource pool 420 may thus include, in the configuration, a first sub-pool of spatial resources 425 and optionally a second sub-pool of spatial resources 430. In some cases, multiple different resource pools may be configured at UEs 115, that, in some cases, may include common time and frequency resources. In some cases, for each transmission resource pool 405 and receive resource pool 420, the base station may configure spatial sub-resources using up to two different subsets or sub-pools of ports. With respect to the transmission resource pool 405, the first sub-pool of spatial resources 410 may provide a pool of potentially co-scheduled ports (e.g., port 0, port 1, or port 0 and 1). Further, the second sub-pool of spatial resources 415 may provide a pool of potentially co-scheduled ports. The receive resource pool 420 may likewise be configured with the same sub-pools by the base station. In some cases, the transmission resource pools 405 and 420 may be configured based on a reported UE capability of the first UE 115-c, of the second UE 115-d, or of both. For example, the resource pools may be configured such that a summation of the above two pools is at or lower than a reported capability of the second UE 115-d for receiving communications (e.g., a maximum number of ports that may be monitored).

When initiating a sidelink communication, the first UE 115-c may autonomously select a spatial resource from the first sub-pool of spatial resources 410. In some cases, the selection may be based on the communication, such that for a rank 1 communication the first UE 115-c may select antenna port 1 or antenna port 2, and the UE 115-c may select both antenna ports 1 and 2 for a rank 2 communication. In such examples, the UE 115-d may perform demodulation and decoding of the transmitted data based on the selection. As a result, if the UE 115-c selects rank n, the UE 115-c may select n or more number of DMRS antenna ports. Also, if the UE 115-c selects m number of DMRS antenna ports, the UE 115-c may select a transmission rank less than or equal to m. It may be understood, however, that in some examples, the number of antenna ports may not be equal to the transmission rank. For instance, the UE 115-c may select a rank 1 sidelink data transmission with two DMRS antenna ports. In some cases, the first UE 115-a may transmit an indication to the second UE 115-d of the sidelink communication, and the second UE 115-d may monitor for the communication in the receive resource pool 420. In some cases, the second UE 115-d may blindly detect which spatial resource is used by testing different hypotheses for potential combinations of DMRS patterns and antenna ports of the first sub-pool of spatial resources 425 of the receive resource pool 420. In some cases, the second UE 115-d may determine the spatial resources based on successful PSCCH decoding of a PSCCH transmitted by the first UE 115-c. For example, if the second UE 115-d correctly decodes the PSCCH (e.g., if the CRC passes) then the second UE 115-d may know which ports are used. In cases where the PSCCH does not contain enough information to identify the ports, the second UE 115-d may identify the spatial resources by measuring the corresponding DMRS. In some cases, when the second sub-pool of spatial resources 415 and 430 are configured at the first UE 115-c and the second UE 115-d, this co-scheduling information may be used as well. For example, the first UE 115-c may perform rate-matching based on potential co-scheduled resources in order to avoid transmitting data on a symbol that may be used for a co-scheduled reference signal. The second UE 115-d, in such cases, may measure signals received at the co-scheduled resources and use the measurements to aid in the decoding of the sidelink transmission from the first UE 115-c.

Figure 5:
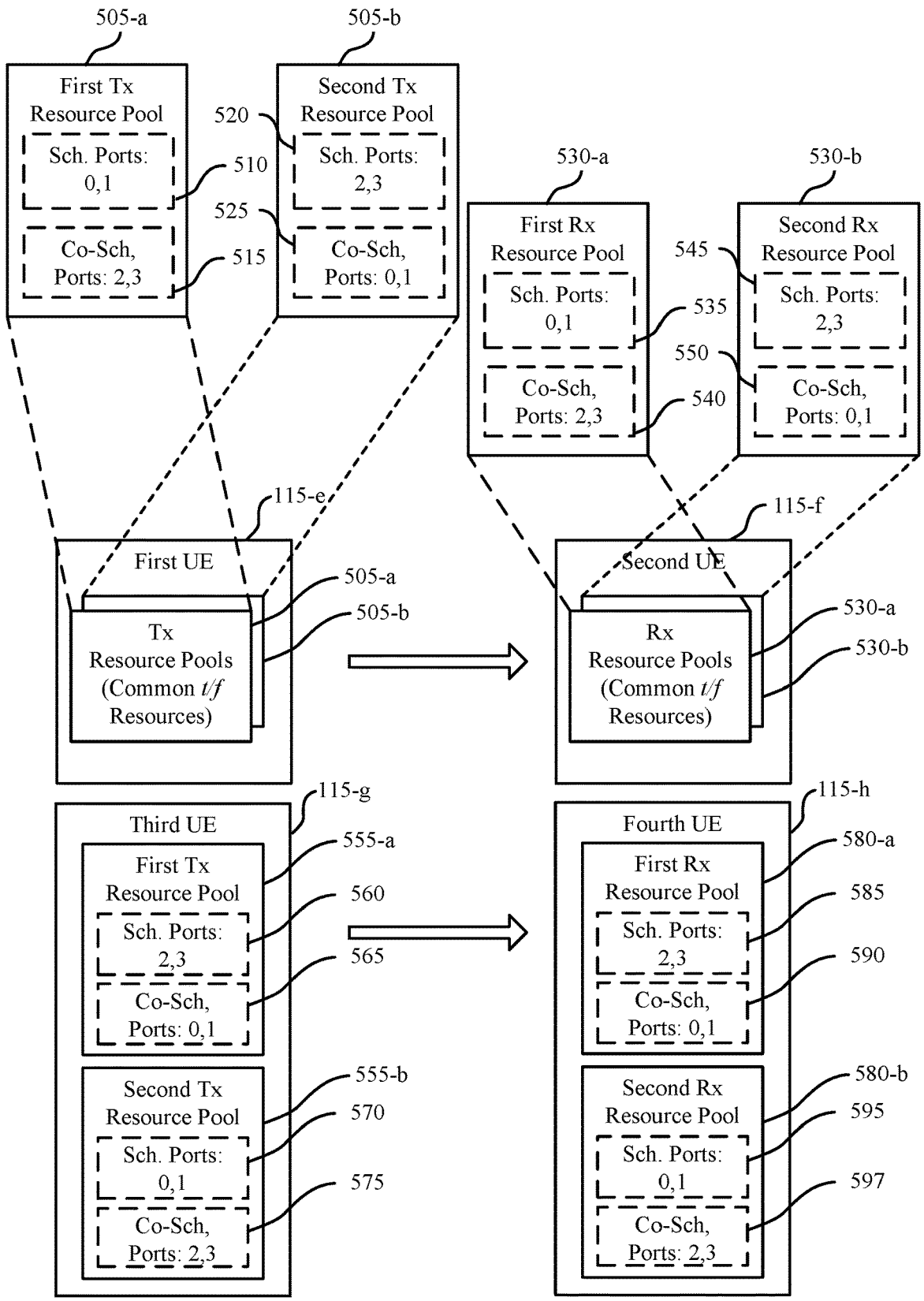

FIG. 5 illustrates another example of sidelink resources pools 500 that support spatial resource pool techniques for multiple concurrent transmissions in sidelink wireless communications in accordance with aspects of the present disclosure. In some examples, sidelink resources pools 500 may be implemented in aspects of wireless communication system 100 or 200. In this example, a first UE 115-e may be configured for sidelink communication with a second UE 115-f, and a third UE 115-g may be configured for sidelink communication with a fourth UE 115-h. In some cases, each of the first UE 115-d, the second UE 115-f, the third UE 115-g, and the fourth UE 115-h may be in communication with a base station (e.g., a base station 105 of FIG. 1 or 2) that may provide configuration information for sidelink communications.

In this example, the first UE 115-e may be configured with multiple transmission resource pools 505, including a first transmission resource pool 505-a and a second transmission resource pool 505-b. In the example illustrated in FIG. 5, the first transmission resource pool 505-*a* and the second transmission resource pool 505-*b* may use the same time and frequency resources (e.g., may both occupy common subframes and REs). The configuration of the transmission resource pools 505 may be provided by the base station, such as in RRC signaling, when the first UE 115-*e* is configured for sidelink communication. The first transmission resource pool 505-*a* may include a first sub-pool of spatial resources 510 (e.g., ports 0, 1, or 0&1), and a second sub-pool of spatial resources 515 that may indicate co-scheduled ports (e.g., ports 2, 3, or 2&3). Likewise, the second transmission resource pool 505-*b* may include a first sub-pool of spatial resources 520 (e.g., ports 2, 3, or 2&3), and a second sub-pool of spatial resources 525 that may indicate co-scheduled ports (e.g., ports 0, 1, or 0&1).

The second UE 115-*f* may, in this example, be configured with corresponding receive resource pools 530, including a first receive resource pool 530-*a* and a second receive resource pool 530-*b*. The first transmission resource pool 530-*a* may include a first sub-pool of spatial resources 535 (e.g., ports 0, 1, or 0&1), and a second sub-pool of spatial resources 540 that may indicate co-scheduled ports (e.g., ports 2, 3, or 2&3). Likewise, the second transmission resource pool 530-*b* may include a first sub-pool of spatial resources 545 (e.g., ports 2, 3, or 2&3), and a second sub-pool of spatial resources 550 that may indicate co-scheduled ports (e.g., ports 0, 1, or 0&1).

The third UE 115-*g* and fourth UE 115-*h* may also be configured with resource pools with spatial resource sub-pools. In this example, the resource pools of the third UE 115-*g* and fourth UE 115-*h* correspond to the co-scheduled resources configured at the first UE 115-*e* and second UE 115-*f*. Likewise, the third UE 115-*g* and fourth UE 115-*h* may have co-scheduled resources that correspond to the scheduled resource pools of the first UE 115-*e* and second UE 115-*f*. In this example, the third UE 115-*g* may be configured with transmission resource pools 555, including a first transmission resource pool 555-*a* and a second transmission resource pool 555-*b*. In the example illustrated in FIG. 5, the first transmission resource pool 555-*a* and the second transmission resource pool 555-*b* may also use the same time and frequency resources (e.g., both occupy common subframes and REs). The configuration of the transmission resource pools 555 may be provided by the base station, such as in RRC signaling. The first transmission resource pool 555-*a* may include a first sub-pool of spatial resources 560 (e.g., ports 2, 3, or 2&3), and a second sub-pool of spatial resources 565 that may indicate co-scheduled ports (e.g., ports 0, 1, or 0&1). Likewise, the second transmission resource pool 555-*b* may include a first sub-pool of spatial resources 570 (e.g., ports 0, 1, or 0&1), and a second sub-pool of spatial resources 575 that may indicate co-scheduled ports (e.g., ports 2, 3, or 2&3).

The fourth UE 115-*h* may, in this example, be configured with corresponding receive resource pools 580, including a first receive resource pool 580-*a* and a second receive resource pool 580-*b*. The first transmission resource pool 580-*a* may include a first sub-pool of spatial resources 585 (e.g., ports 2, 3, or 2&3), and a second sub-pool of spatial resources 590 that may indicate co-scheduled ports (e.g., ports 0, 1, or 0&1). Likewise, the second transmission resource pool 580-*b* may include a first sub-pool of spatial resources 595 (e.g., ports 0, 1, or 0&1), and a second sub-pool of spatial resources 597 that may indicate co-scheduled ports (e.g., ports 2, 3, or 2&3).

Thus, in this example, the base station may configure the first UE 115-*e* and the third UE 115-*g* with the same transmission resource pool with the same set of DMRS patterns regarding the time/frequency aspects (e.g., DMRS type, size of front loaded DMRS, maximum number of additional DMRS, and the like), and regarding the spatial aspects, may provide two groups of UE-specific orthogonal resources: one with potential ports that can be scheduled, and one with potential ports that a different UE can schedule. Accordingly, in this example, the first UE 115-*e* and third UE 115-*g* have first transmission resource pools 505 and 555 that have the same time/frequency resources and complimentary spatial resource sub-pools, and likewise for the second UE 115-*f* and fourth UE 115-*h*.

When initiating a sidelink transmission, the first UE 115-*e* may send PSCCH/PSSCH to the second UE 115-*f* with autonomous rank selection. If the first UE 115-*e* uses the first transmission resource pool 505-*a*, it is allowed to use port 0, or port 1, or port 0&1 (e.g., that may be autonomously selected). At the same time the first UE 115-*e* may identify, that since port 2 or 3 or 2&3 are potentially co-scheduled, not to include data in the corresponding REs to provide rate-matching. The second UE 115-*f*, when processing a received transmission in the first receive resource pool 530-*a*, may perform blind estimation to identify whether port 2, port 3, or both, are active to provide enhanced channel and noise estimation which may enhance the likelihood of successfully decoding the transmission. The second UE 115-*f* may also perform rate-matching for potentially co-scheduled transmissions.

In this example, since each of the first UE 115-*e* and the third UE 115-*g* may autonomously select which transmit resource pool to use, there may potentially be a collision in cases where the first UE 115-*e* selects the first transmission resource pool 505-*a* and the third UE 115-*g* selects the second transmission resource pool 555-*b*, and each of the UEs 115 also select a same port. In such cases, the second UE 115-*f* (and the fourth UE 115-*h*) may not be able to successfully decode the sidelink communication, and may transmit feedback to the first UE 115-*e* to initiate a retransmission of the communication. In some cases, the first UE 115-*e* may randomly select resources for the retransmission from two alternatives, where the new resource pool of potentially scheduled ports is the same as the previous one, or the new resource pool of potentially scheduled ports is the pool of potentially co-scheduled ports of the previous transmission. In the case of the second alternative of the co-scheduled ports being used for selection in the retransmission, the second UE 115-*f* may include, with the feedback, an indication of whether the co-scheduled ports pool was "empty" or "other ports" were detected. In some cases, to help avoid collisions in a retransmission, the first UE 115-*e* and the third UE 115-*g* may be configured with a different behavior. For example, if the feedback report from the second UE 115-*f* indicates that the co-scheduled ports in the previous sidelink transmission were determined to be present, then the first UE 115-*e* may be configured to use the same resource pool again, and if the feedback report from the fourth UE 115-*h* indicates that its configured co-scheduled ports in the previous sidelink transmission were determined to be present, the third UE 115-*g* may be configured to change its resource pool.

Figure 6:
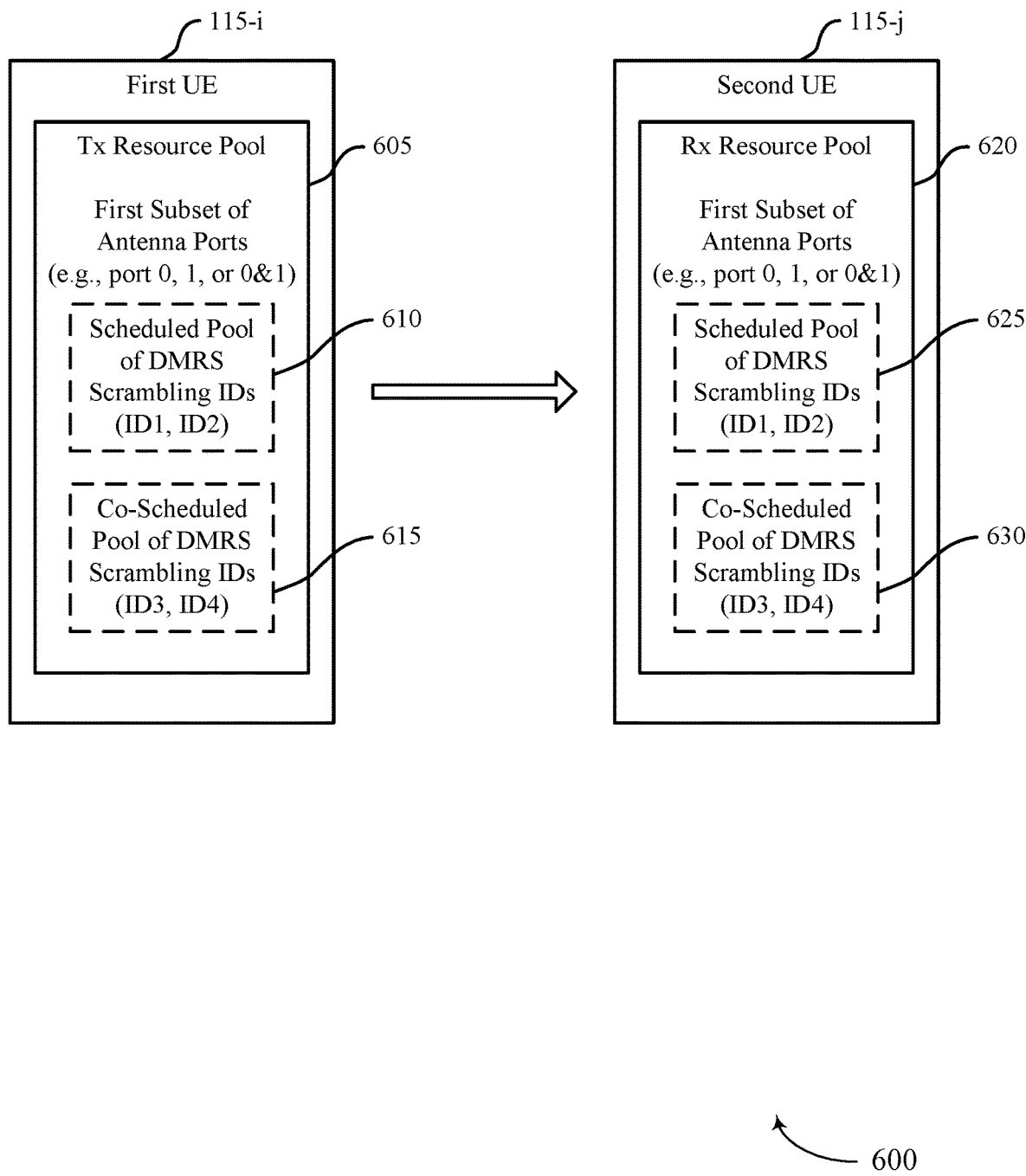

FIG. 6 illustrates another example of sidelink resource pools 600 that support spatial resource pool techniques for multiple concurrent transmissions in sidelink wireless communications in accordance with aspects of the present disclosure. In some examples, sidelink resource pools 600 may be implemented by aspects of wireless communication system 100 or 200. In this example, a first UE 115-*i* may be a sidelink transmitter, and a second UE 115-*j* may be a sidelink receiver. In some cases, each of the first UE 115-*i* and the second UE 115-*j* may be in communication with a base station (e.g., a base station 105 of FIG. 1 or 2) that may provide configuration information for sidelink communications.

In this example, the first UE 115-*i* may be configured with a transmission resource pool 605. The configuration of the transmission resource pool 605 may be provided by the base station, such as in RRC signaling, when the first UE 115-*i* is configured for sidelink communication. The transmission resource pool 605 may include a first subset of antenna ports (e.g., port 0, port 1, or port 0&1), and a first sub-pool of spatial resources 610 may provide a subset of DMRS scrambling IDs (e.g., ID1, ID2) that may be scheduled by the first UE 115-*i*. The transmission resource pool 605 may optionally include a second sub-pool of spatial resources 615 corresponding to potential co-scheduled DMRS scrambling IDs (e.g., ID3, ID4). The second UE 115-*j* may, in this example, be configured with a receive resource pool 620 that may correspond with the resources of the transmission resource pool 605. The receive resource pool 620 may thus include a first sub-pool of spatial resources 625 (e.g., indicating DMRS scrambling ID1 and ID2), and optionally a second sub-pool of spatial resources 630 (e.g., indicating potentially co-scheduled DMRS scrambling ID3 and ID4). Again, in some cases, multiple different resource pools may be configured at UEs 115, that in some cases include common time and frequency resources.

Thus, in this example, each resource pool may include non-orthogonal spatial sub-resources using up to two buckets or sub-pools/subsets of DMRS scrambling IDs that indicate a pool of potentially scheduled DMRS scrambling IDs and a pool of potentially co-scheduled DMRS scrambling IDs. In some cases, the summation of the two spatial resource sub-pools may correspond to a number of ports that is at or lower than a capability reported by the second UE 115-*j*. Thus, in this example, additionally or alternatively to orthogonal spatial resources, non-orthogonal spatial resources may be provided in different spatial resource sub-pools. Such techniques may allow for additional potential sidelink resources that may allow for additional devices to perform sidelink transmissions.

Figure 7:
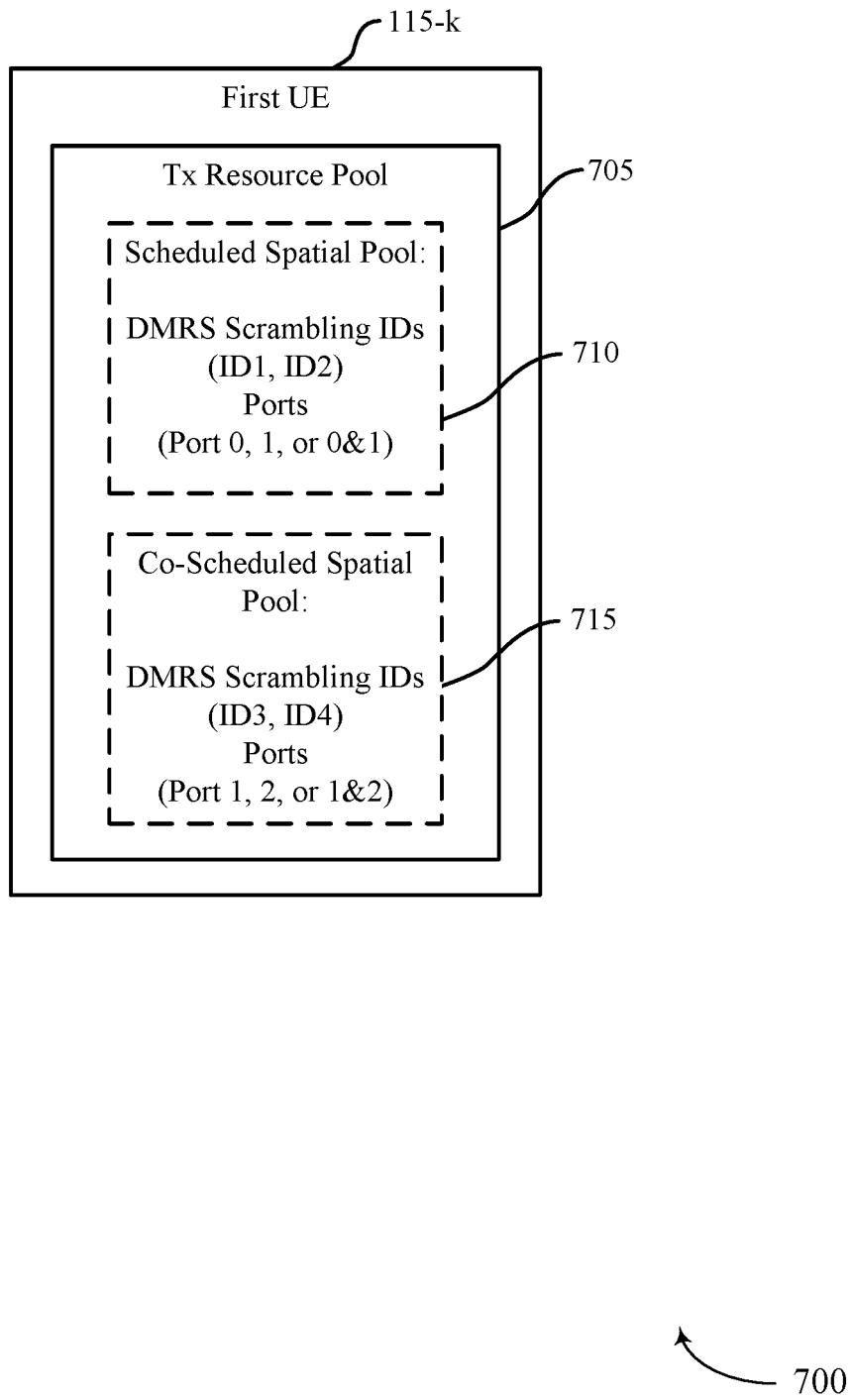

FIG. 7 illustrates another example of a sidelink resource pool 700 that supports spatial resource pool techniques for multiple concurrent transmissions in sidelink wireless communications in accordance with aspects of the present disclosure. In some examples, sidelink resource pool 700 may be implemented in aspects of wireless communication system 100 or 200. In this example, a first UE 115-*k* may be a sidelink transmitter, and may be in communication with a sidelink receiver that is configured with a corresponding sidelink resource pool 700. In some cases, the first UE 115-*k* may be in communication with a base station (e.g., a base station 105 of FIG. 1 or 2) that may provide configuration information for sidelink communications.

In this example, the first UE 115-*k* may be configured with a transmission resource pool 705. The configuration of the transmission resource pool 705 may be provided by the base station, such as in RRC signaling, when the first UE 115-*k* is configured for sidelink communication. The transmission resource pool 705 in this example may include a first sub-pool of spatial resources 710 that may provide a subset of DMRS scrambling IDs (e.g., ID1, ID2) and a subset of ports (e.g., port 0, 1, or 0&1) that may be scheduled by the first UE 115-*k*. The transmission resource pool 705 may optionally include a second sub-pool of spatial resources 715 corresponding to potential co-scheduled DMRS scrambling IDs (e.g., ID3, ID4) and ports (e.g., port 2, 3, or 2&3). Thus, in this example, for every resource pool the base station may configure non-orthogonal spatial sub-resources using up to two buckets of DMRS scrambling IDs as a pool of potentially scheduled DMRS scrambling IDs and ports, and a pool of potentially co-scheduled DMRS scrambling IDs and ports. Again, the summation of the two pools should be lower than a reported capability by the UE receiving the sidelink transmissions.

Figure 8:
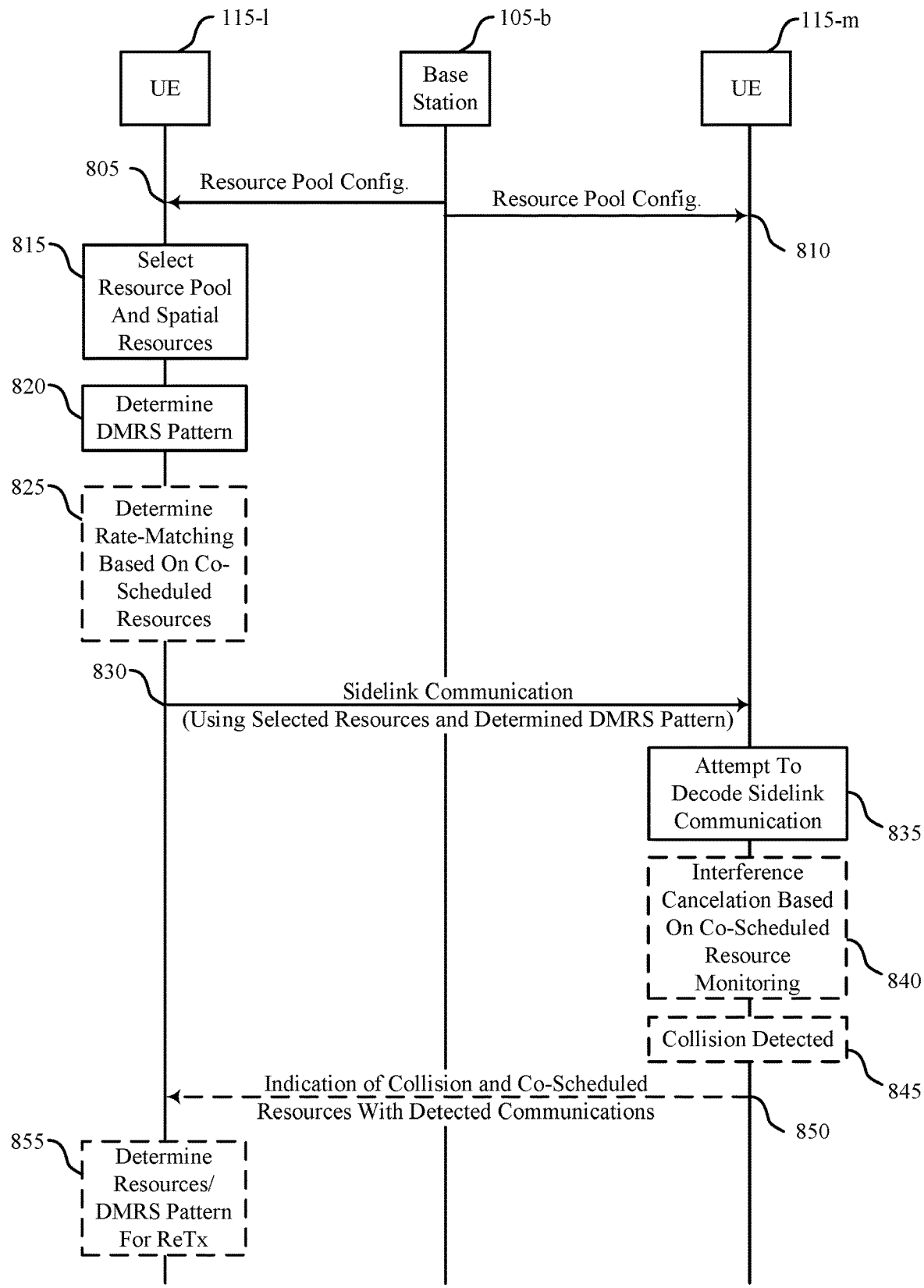
FIG. 8 illustrates an example of a process flow that supports spatial resource pools for multiple concurrent transmissions in sidelink wireless communications in accordance with one or more aspects of the present disclosure.

FIG. 8 illustrates an example of a process flow 800 that supports spatial resource pool techniques for multiple concurrent transmissions in sidelink wireless communications in accordance with aspects of the present disclosure. In some examples, process flow 800 may be implemented in aspects of wireless communication system 100 or 200. Process flow 800 may be implemented by first UE 115-*l*, second UE 115-*e*, base station 105-*b*, or any other examples of UEs 115 or base stations 105 as described herein. Alternative examples of the following may be implemented, where some steps are performed in a different order than described or are not performed at all. In some cases, steps may include additional features not mentioned below, or further steps may be added.

At 805, the base station 105-*b* may transmit a resource pool configuration to the first UE 115-*l*. At 810, the base station 105-*b* may transmit a resource pool configuration to the second UE 115-*m*. The resource pool configuration may be determined by the base station 105-*b* based on sidelink communications that are to be initiated between the first UE 115-*l* and the second UE 115-*m*. Such a resource pool configuration may a configuration such as discussed with reference to FIGS. 4 through 7, for example. The base station 105-*b* may transmit the resource pool configurations in, for example, RRC signaling, in one or more MAC control elements, in downlink control information (DCI), or any combinations thereof.

At 815, the first UE 115-*l* may select a resource pool and spatial resources for a sidelink communication with the second UE 115-*m*. In some cases, the first UE 115-*l* may autonomously select the resource pool if two or more resource pools are configured, and may select a spatial resource from a spatial resource sub-pool that is configured for each resource pool.

At 820, the first UE 115-*l* may determine a DMRS pattern for the sidelink communication. In some cases, the DMRS pattern may be determined based on the time, frequency, and spatial resources that are selected for the sidelink communication. In some cases, DMRS patterns may be mapped to each different combination of time, frequency, and spatial resources based on a set of parameters that are configured at the UEs 115. Optionally, at 825, the first UE 115-*l* may determine co-scheduled resources based on the selected resources, and may rate-match the sidelink communication based on the co-scheduled resources.

At 830, the first UE 115-*l* may transmit the sidelink communication to the second UE 115-*m* using the selected resources and the determined DMRS pattern. At 835, the second UE 115-*m* may monitor for the sidelink communication and attempt to decode the sidelink communication. In some cases, a PSCCH transmission from the first UE 115-*l* may indicate time, frequency, and spatial resources for the sidelink communication. In other cases, the second UE 115-*m* may identify the time, frequency, and spatial resources through testing multiple hypotheses of DMRS patterns for different possible combinations of resources in a blind detection.

Optionally, at 840, the second UE 115-*m* may perform interference cancelation for the received sidelink communication based on monitoring the co-scheduled resources. In such cases, if one or more other UEs are transmitting sidelink communications using the co-scheduled resources, the second UE 115-*m* may measure such resources and apply the measurement to enhance demodulation and decoding of the sidelink communication.

Optionally, at 845, the second UE 115-*m* may determine that there was a collision of the sidelink communication with a transmission of another UE. Such a determination may be based on unsuccessfully decoding the sidelink communication. In some such cases, the second UE 115-*m* may, at 850, transmit feedback to the first UE 115-*l* to initiate a retransmission. In some cases, the feedback information may include an indication of a collision and an indication that one or more co-scheduled resources are available (e.g., based on lack of detection of a transmission on the co-scheduled resources). In some cases, the detection of a transmission on the co-scheduled resources may be based on whether a DMRS pattern is present on the co-scheduled resources. Optionally, at 855, the first UE 115-*l* may determine resources and a DMRS pattern for retransmitting the sidelink communication.

Figure 9:
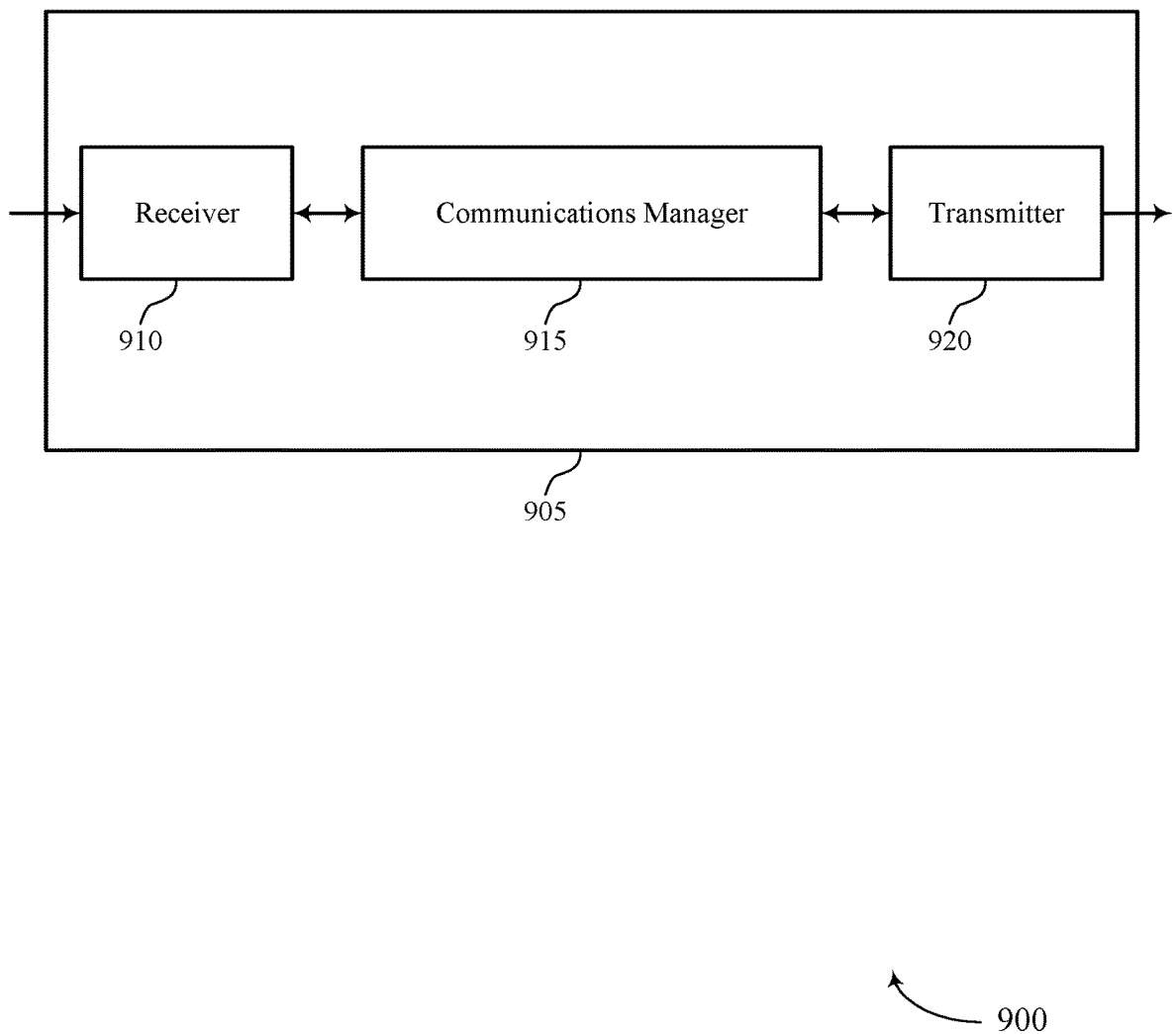
FIGS. 9 and 10 show block diagrams of devices that support spatial resource pool techniques for multiple concurrent transmissions in sidelink wireless communications in accordance with aspects of the present disclosure.

FIG. 9 shows a block diagram 900 of a device 905 that supports spatial resource pool techniques for multiple concurrent transmissions in sidelink wireless communications in accordance with aspects of the present disclosure. The device 905 may be an example of aspects of a UE 115 as described herein. The device 905 may include a receiver 910, a communications manager 915, and a transmitter 920. The device 905 may also include a processor. Each of these components may be in communication with one another (e.g., via one or more buses).

The receiver 910 may provide a means for receiving information such as packets, user data, or control information associated with various information channels (e.g., control channels, data channels, and information related to spatial resource pool techniques for multiple concurrent transmissions in sidelink wireless communications, etc.). Information may be passed on to other components of the device 905. The receiver 910 may be an example of aspects of the transceiver 1220 described with reference to FIG. 12. The receiver 910 may utilize a single antenna or a set of antennas.

The communications manager 915 may provide a means for receiving, at a first UE from a base station, two or more resource pools that provide wireless resources available for sidelink communication between the first UE and a second UE, each resource pool of the two or more resource pools including a set of frequency domain resources, a set of time domain resources, and a first subset of available spatial resources that are available for the sidelink communication. The communications manager 915 may also provide a means for selecting, at the first UE, a first resource pool including a first spatial resource of the first subset of available spatial resources for the sidelink communication, determine a DMRS pattern for the sidelink communication based on the selected first spatial resource of the first resource pool. The communications manager 915 may further provide a means for transmitting the sidelink communication and DMRS to the second UE using the first spatial resource of the first resource pool.

The communications manager 915 may provide a means for identifying, at a second UE, two or more resource pools that provide wireless resources available for sidelink communication between a first UE and the second UE, each resource pool of the two or more resource pools including a set of frequency domain resources, a set of time domain resources, and a first subset of available spatial resources that are available for the sidelink communication. The communications manager 915 may provide a means for receiving, from the first UE, an indication that a first resource pool of the two or more resource pools is to be used for the sidelink communication. In addition, the communications manager 915 may provide a means for monitoring the first subset of available spatial resources associated with the first resource pool, and means for determining that a DMRS pattern for the sidelink communication is present in a first spatial resource of the first resource pool. The communications manager 915 may provide a means for demodulating the sidelink communication based on the DMRS pattern. The communications manager 915 may be an example of aspects of the communications manager 1210 described herein.

The actions performed by the communications manager 915 as described herein may be implemented to realize one or more potential advantages. One implementation may allow a UE 115 to increase scheduling flexibility by transmitting concurrent sidelink communications. Another implementation may provide improved quality and reliability of service at the UE 115, as latency and the number of separate resources allocated to the UE 115 may be reduced.

The communications manager 915, or its sub-components, may be implemented in hardware, code (e.g., software or firmware) executed by a processor, or any combination thereof. If implemented in code executed by a processor, the functions of the communications manager 915, or its sub-components may be executed by a general-purpose processor, a digital signal processor (DSP), an application-specific integrated circuit (ASIC), a field-programmable gate array (FPGA) or other programmable logic device, discrete gate or transistor logic, discrete hardware components, or any combination thereof designed to perform the functions described in the present disclosure.

The communications manager 915 may be an example of means for performing various aspects of resource pool management techniques as described herein. The communications manager 915, or its sub-components, may be physically located at various positions, including being distributed such that portions of functions are implemented at different physical locations by one or more physical components. In some examples, the communications manager 915, or its sub-components, may be a separate and distinct component in accordance with various aspects of the present disclosure. In some examples, the communications manager 915, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

In another implementation, the communications manager 915, or its sub-components, may be implemented in code (e.g., as communications management software or firmware) executed by a processor, or any combination thereof. If implemented in code executed by a processor, the functions of the communications manager 915, or its sub-components may be executed by a general-purpose processor, a digital signal processor (DSP), an application-specific integrated circuit (ASIC), a field programmable gate array (FPGA) or other programmable logic device.

In some examples, the communication manager 915 may be configured to perform various operations (e.g., receiving, determining, transmitting, selecting, rate-matching, retransmitting) using or otherwise in cooperation with the receiver 510, the transmitter 520, or both.

The transmitter 920 may provide a means for transmitting signals generated by other components of the device 905. In some examples, the transmitter 920 may be collocated with a receiver 910 in a transceiver module. For example, the transmitter 920 may be an example of aspects of the transceiver 1220 described with reference to FIG. 12. The transmitter 920 may utilize a single antenna or a set of antennas.

Figure 10:
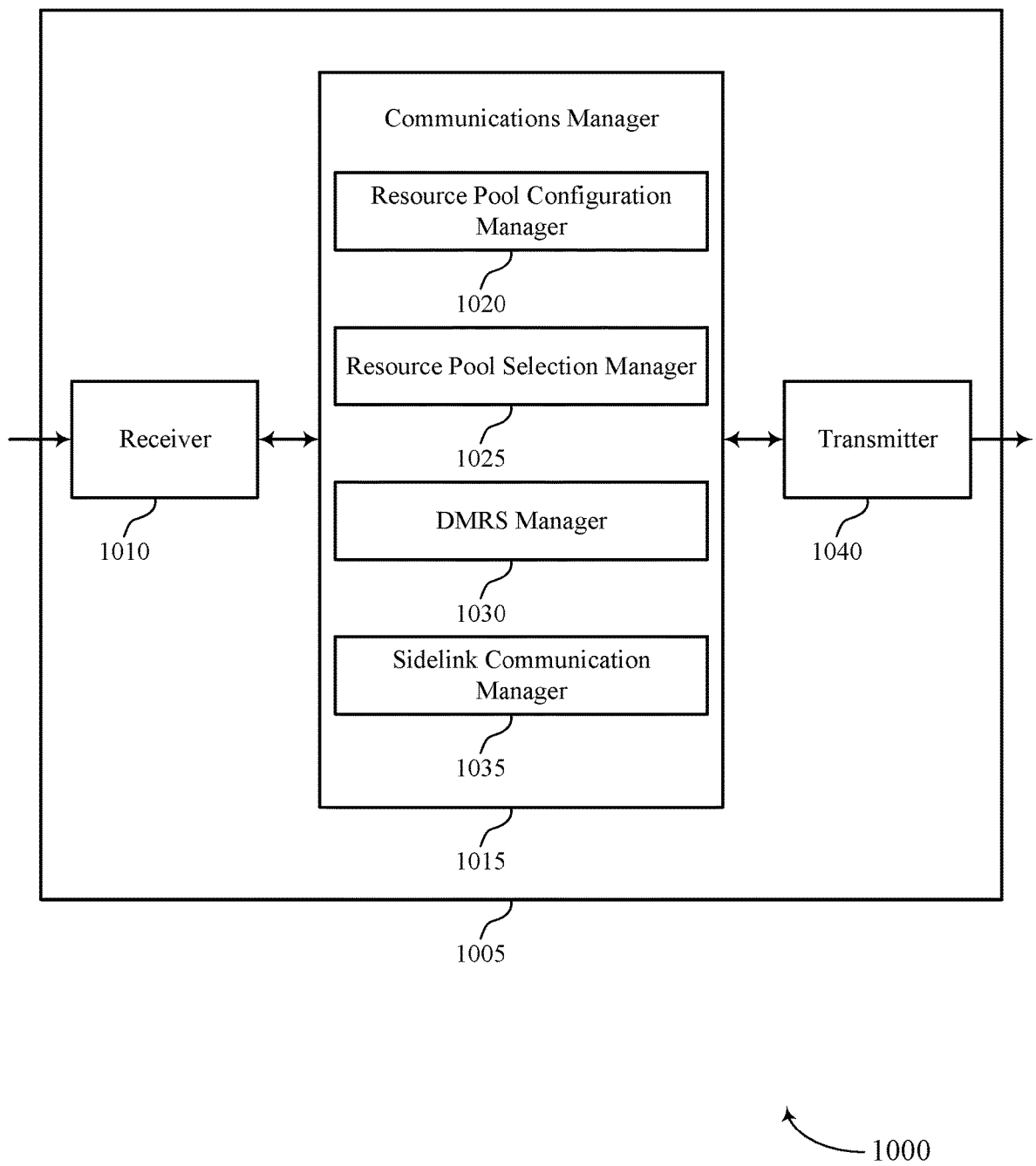

FIG. 10 shows a block diagram 1000 of a device 1005 that supports spatial resource pool techniques for multiple concurrent transmissions in sidelink wireless communications in accordance with aspects of the present disclosure. The device 1005 may be an example of aspects of a device 905, or a UE 115 as described herein. The device 1005 may include a receiver 1010, a communications manager 1015, and a transmitter 1040. The device 1005 may also include a processor. Each of these components may be in communication with one another (e.g., via one or more buses).

The receiver 1010 may provide a means for receiving information such as packets, user data, or control information associated with various information channels (e.g., control channels, data channels, and information related to spatial resource pool techniques for multiple concurrent transmissions in sidelink wireless communications, etc.). Information may be passed on to other components of the device 1005. The receiver 1010 may be an example of aspects of the transceiver 1220 described with reference to FIG. 12. The receiver 1010 may utilize a single antenna or a set of antennas.

The communications manager 1015 may be an example of aspects of the communications manager 915 as described herein. The communications manager 1015 may include a resource pool configuration manager 1020, a resource pool selection manager 1025, a DMRS manager 1030, and a sidelink communication manager 1035. The communications manager 1015 may be an example of aspects of the communications manager 1210 described herein.

In some cases, the resource pool configuration manager 1020 may provide a means for receiving, at a first UE from a base station, two or more resource pools that provide wireless resources available for sidelink communication between the first UE and a second UE, each resource pool of the two or more resource pools including a set of frequency domain resources, a set of time domain resources, and a first subset of available spatial resources that are available for the sidelink communication. The resource pool selection manager 1025 may provide a means for selecting, at the first UE, a first resource pool including a first spatial resource of the first subset of available spatial resources for the sidelink communication. The DMRS manager 1030 may provide a means for determining a DMRS pattern for the sidelink communication based on the selected first spatial resource of the first resource pool. The sidelink communication manager 1035 may provide a means for transmitting the sidelink communication and a DMRS to the second UE using the first spatial resource of the first resource pool.

In some cases, the resource pool configuration manager 1020 may provide a means for identifying, at a second UE, two or more resource pools that provide wireless resources available for sidelink communication between a first UE and the second UE, each resource pool of the two or more resource pools including a set of frequency domain resources, a set of time domain resources, and a first subset of available spatial resources that are available for the sidelink communication. The resource pool configuration manager 1020 may provide means for receiving, from the first UE, an indication that a first resource pool of the two or more resource pools is to be used for the sidelink communication. The DMRS manager 1030 may provide a means for monitoring the first subset of available spatial resources associated with the first resource pool and means for determining that a DMRS pattern for the sidelink communication is present in a first spatial resource of the first resource pool. The sidelink communication manager 1035 may provide a means for demodulating the sidelink communication based on the DMRS pattern.

The transmitter 1040 may provide a means for transmitting signals generated by other components of the device 1005. In some examples, the transmitter 1040 may be collocated with a receiver 1010 in a transceiver module. For example, the transmitter 1040 may be an example of aspects of the transceiver 1220 described with reference to FIG. 12. The transmitter 1040 may utilize a single antenna or a set of antennas.

Figure 11:
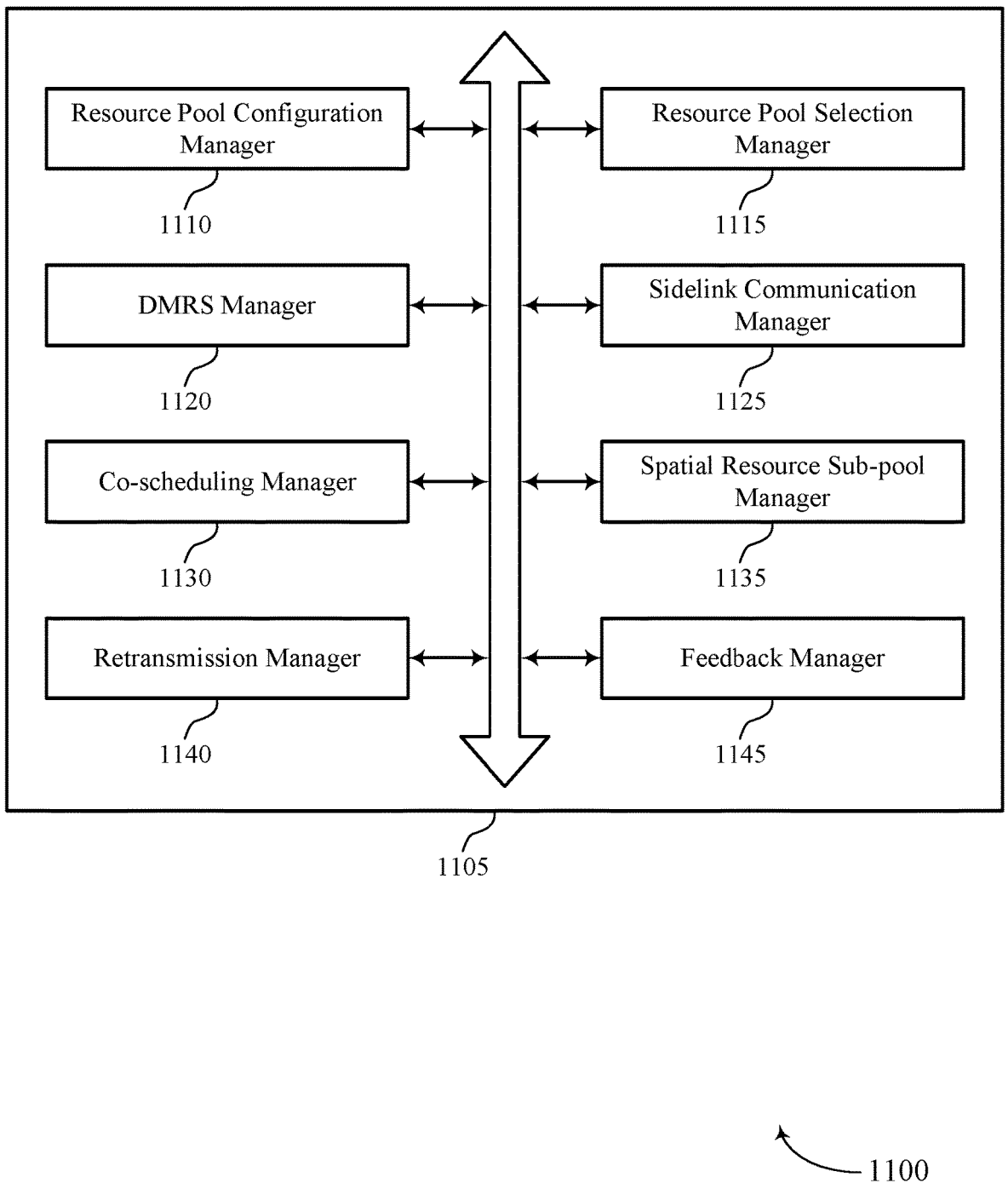
FIG. 11 shows a block diagram of a communications manager that supports spatial resource pool techniques for multiple concurrent transmissions in sidelink wireless communications in accordance with aspects of the present disclosure.

FIG. 11 shows a block diagram 1100 of a communications manager 1105 that supports spatial resource pool techniques for multiple concurrent transmissions in sidelink wireless communications in accordance with aspects of the present disclosure. The communications manager 1105 may be an example of aspects of a communications manager 915, a communications manager 1015, or a communications manager 1210 described herein. The communications manager 1105 may include a resource pool configuration manager 1110, a resource pool selection manager 1115, a DMRS manager 1120, a sidelink communication manager 1125, a co-scheduling manager 1130, a spatial resource sub-pool manager 1135, a retransmission manager 1140, and a feedback manager 1145. Each of these modules may communicate, directly or indirectly, with one another (e.g., via one or more buses).

The resource pool configuration manager 1110 may provide a means for receiving, at a first UE from a base station, two or more resource pools that provide wireless resources available for sidelink communication between the first UE and a second UE, each resource pool of the two or more resource pools including a set of frequency domain resources, a set of time domain resources, and a first subset of available spatial resources that are available for the sidelink communication.

In some examples, the resource pool configuration manager 1110 may provide a means for identifying, at a second UE, two or more resource pools that provide wireless resources available for sidelink communication between a first UE and the second UE, each resource pool of the two or more resource pools including a set of frequency domain resources, a set of time domain resources, and a first subset of available spatial resources that are available for the sidelink communication. In some examples, the resource pool configuration manager 1110 may provide a means for receiving, from the first UE, an indication that a first resource pool of the two or more resource pools is to be used for the sidelink communication.

In some cases, the two or more resource pools further include a second resource pool having a same set of frequency domain resources and a same set of time domain resources as the first resource pool, and a different subset of available spatial resources that is non-overlapping with the first subset of available spatial resources.

The resource pool selection manager 1115 may provide a means for selecting, at the first UE, a first resource pool including a first spatial resource of the first subset of available spatial resources for the sidelink communication.

The DMRS manager 1120 may provide a means for determining a DMRS pattern for the sidelink communication based on the selected first spatial resource of the first resource pool.

In some examples, the DMRS manager 1120 may provide a means for monitoring the first subset of available spatial resources associated with the first resource pool. In some examples, the DMRS manager 1120 may provide a means for determining that a DMRS pattern for the sidelink communication is present in a first spatial resource of the first resource pool.

The sidelink communication manager 1125 may provide a means for transmitting the sidelink communication and a DMRS to the second UE using the first spatial resource of the first resource pool.

In some examples, the sidelink communication manager 1125 may, at the second UE, provide a means for demodulating the sidelink communication based on the DMRS pattern.

The co-scheduling manager 1130 may provide a means for receiving, at the first UE from the base station, for each of the two or more resource pools, an indication of a second subset of available spatial resources that are available to one or more other UEs for sidelink communication using the resource pool, where the first subset of available spatial resources and the second subset of available spatial resources are non-overlapping for each resource pool of the two or more resource pools.

In some examples, the co-scheduling manager 1130 may provide a means for rate-matching the sidelink communication with the second UE around reference signal resources associated with the second subset of available spatial resources.

In some examples, the co-scheduling manager 1130 may provide a means for receiving, from the first UE or from a base station, for each of the two or more resource pools, an indication of a second subset of one or more available spatial resources that are available to one or more other UEs for sidelink communication using the associated resource pool, where the first subset of available spatial resources and the second subset of one or more available spatial resources are non-overlapping for each resource pool of the two or more resource pools. In some examples, the co-scheduling manager 1130 may provide a means for monitoring for a transmission in the second subset of one or more available spatial resources of the first resource pool. In some examples, the co-scheduling manager 1130 may provide a means for mitigating interference in the first subset of available spatial resources based on detecting the transmission in the second subset of available spatial resources.

In some cases, a summation of the first subset of available spatial resources and the second subset of available spatial resources is less than a total number of concurrent spatial transmissions that can be received at the second UE.

The spatial resource sub-pool manager 1135 may provide a means for identifying which of the two or more antenna ports are used for the sidelink communication based on the DMRS pattern associated with each spatial resource of the first subset of available spatial resources. In some cases, the first subset of available spatial resources include two or more orthogonal antenna ports, two or more different scrambling identifications of a same orthogonal antenna port, or any combinations thereof.

In some cases, the second UE identifies which of the two or more antenna ports are used for the sidelink communication based on the DMRS pattern used for the sidelink communication. In some cases, the spatial resources may include two or more antenna ports used for the sidelink communication. In some cases, the first subset of available spatial resources include a subset of antenna ports that are available for sidelink communication, a subset of DMRS scrambling identifications that are available for sidelink communication, or any combinations thereof. In some cases, the first resource pool includes a sub-pool of two or more available DMRS scrambling identifications, and where the first UE further receives an indication of at least one potential co-scheduled DMRS scrambling identification in the first resource pool. In some cases, the first subset of available spatial resources includes two or more antenna ports, and the first UE autonomously selects one or more of a number of antenna ports for the sidelink communication. In some cases, the first UE may autonomously select a transmission rank of the sidelink communication.

In some cases, the first resource pool includes a sub-pool of available DMRS scrambling identifications, and where the second UE further receives an indication of potential co-scheduled DMRS scrambling identifications in the first resource pool. In some cases, the first resource pool includes a sub-pool of available combinations of DMRS scrambling identifications and antenna ports, and where the second UE further receives an indication of potential co-scheduled combinations of DMRS scrambling identifications and antenna ports in the first resource pool.

The retransmission manager 1140 may provide a means for determining that the sidelink communication was not successfully received at the second UE.

In some examples, the retransmission manager 1140 may provide a means for retransmitting the sidelink communication using the first resource pool or a second resource pool that was configured for a potential co-scheduled transmission of one or more other UEs. In some examples, the retransmission manager 1140 may provide a means for receiving feedback from the second UE that indicates whether one or more resources of the potential co-scheduled transmission were detected as being unavailable for the sidelink communication, and where a retransmission resource is selected based on the feedback.

In some examples, retransmission resources are in the first resource pool when each of the potential co-scheduled transmission resources contain the transmission, and where the retransmission resources are in one of the first resource pool or a second resource pool when at least one of the potential co-scheduled transmission resources is empty. In some cases, the first UE selects the retransmission resource from the first resource pool when each of the potential co-scheduled transmissions are indicated as containing a transmission, and where the first UE selects the retransmission resource from the first resource pool and the second resource pool when one or more of the potential co-scheduled transmissions are indicated as being empty.

The feedback manager 1145 may provide a means for determining that the sidelink communication is not successfully received at the second UE. In some examples, the feedback manager 1145 may provide a means for transmitting feedback information to the first UE that indicates the sidelink communication was not successfully received. In some examples, the feedback manager 1145 may provide a means for determining whether one or more resources of one or more potential co-scheduled transmissions contain a transmission from one or more other UEs, and where the feedback information further indicates whether the one or more resources of the one or more potential co-scheduled transmissions were detected as being unavailable for sidelink communication.

Figure 12:
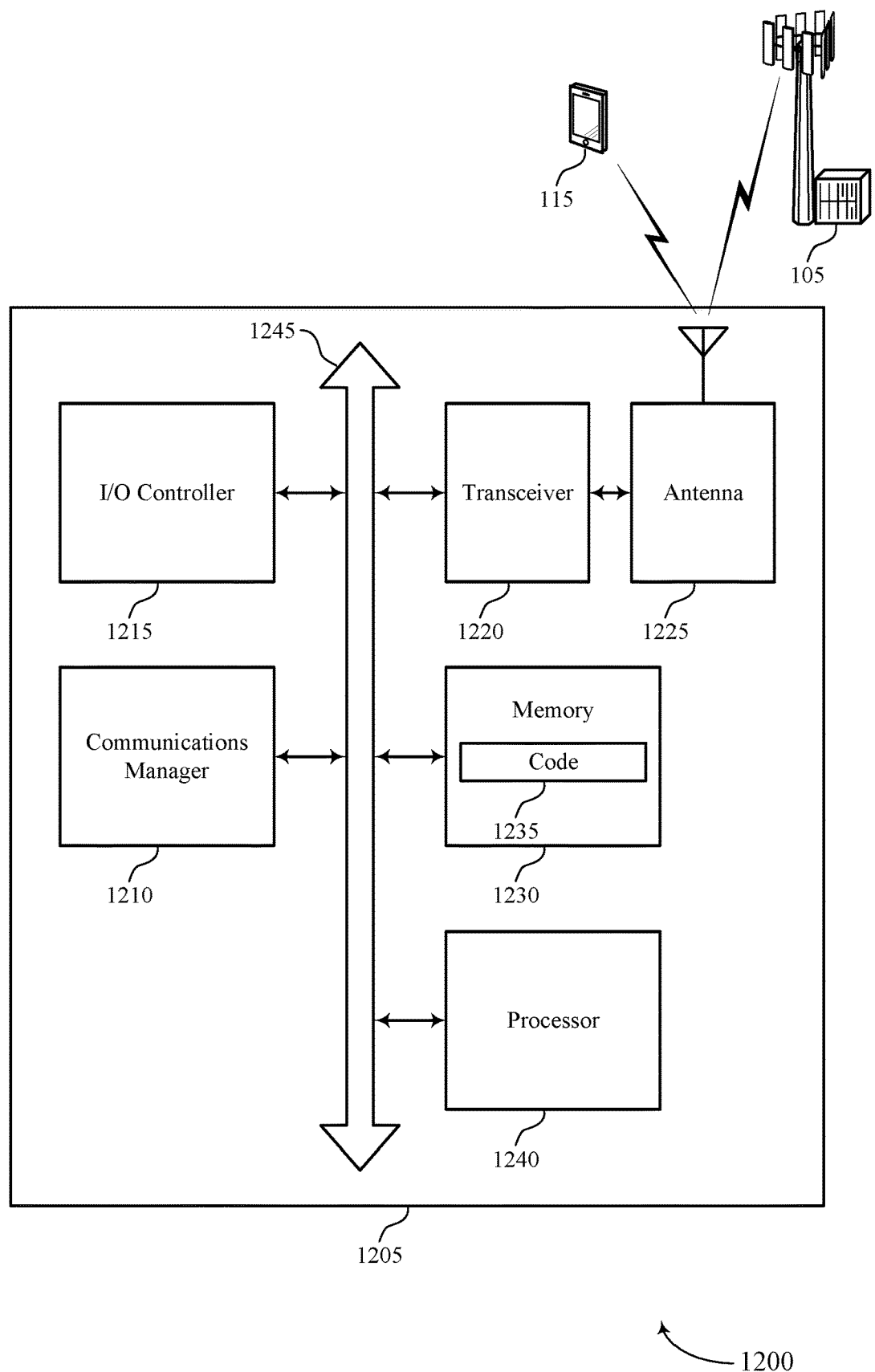
FIG. 12 shows a diagram of a system including a device that supports spatial resource pool techniques for multiple concurrent transmissions in sidelink wireless communications in accordance with aspects of the present disclosure.

FIG. 12 shows a diagram of a system 1200 including a device 1205 that supports spatial resource pool techniques for multiple concurrent transmissions in sidelink wireless communications in accordance with aspects of the present disclosure. The device 1205 may be an example of or include the components of device 905, device 1005, or a UE 115 as described herein. The device 1205 may include components for bi-directional voice and data communications including components for transmitting and receiving communications, including a communications manager 1210, an I/O controller 1215, a transceiver 1220, an antenna 1225, memory 1230, and a processor 1240. These components may be in electronic communication via one or more buses (e.g., bus 1245).

The communications manager 1210 may receive, at a first UE from a base station, two or more resource pools that provide wireless resources available for sidelink communication between the first UE and a second UE, each resource pool of the two or more resource pools including a set of frequency domain resources, a set of time domain resources, and a first subset of available spatial resources that are available for the sidelink communication, select, at the first UE, a first resource pool including a first spatial resource of the first subset of available spatial resources for the sidelink communication, determine a DMRS pattern for the sidelink communication based on the selected first spatial resource of the first resource pool, and transmit the sidelink communication and a DMRS to the second UE using the first spatial resources of the first resource pool.

The communications manager 1210 may also identify, at a second UE, two or more resource pools that provide wireless resources available for sidelink communication between a first UE and the second UE, each resource pool of the two or more resource pools including a set of frequency domain resources, a set of time domain resources, and a first subset of available spatial resources that are available for the sidelink communication, receive, from the first UE, an indication that a first resource pool of the two or more resource pools is to be used for the sidelink communication, monitor the first subset of available spatial resources associated with the first resource pool, determine that a DMRS pattern for the sidelink communication is present in a first spatial resource of the first resource pool, and demodulate the sidelink communication and DMRS.

The I/O controller 1215 may manage input and output signals for the device 1205. The I/O controller 1215 may also manage peripherals not integrated into the device 1205. In some cases, the I/O controller 1215 may represent a physical connection or port to an external peripheral. In some cases, the I/O controller 1215 may utilize an operating system such as iOS®, ANDROID®, MS-DOS®, MS-WINDOWS®, OS/2®, UNIX®, LINUX®, or another known operating system. In other cases, the I/O controller 1215 may represent or interact with a modem, a keyboard, a mouse, a touchscreen, or a similar device. In some cases, the I/O controller 1215 may be implemented as part of a processor. In some cases, a user may interact with the device 1205 via the I/O controller 1215 or via hardware components controlled by the I/O controller 1215.

The transceiver 1220 may communicate bi-directionally, via one or more antennas, wired, or wireless links as described herein. For example, the transceiver 1220 may represent a wireless transceiver and may communicate bi-directionally with another wireless transceiver. The transceiver 1220 may also include a modem to modulate the packets and provide the modulated packets to the antennas for transmission, and to demodulate packets received from the antennas.

In some cases, the wireless device may include a single antenna 1225. However, in some cases the device may have more than one antenna 1225, which may be capable of concurrently transmitting or receiving multiple wireless transmissions.

The memory 1230 may include random-access memory (RAM) and read-only memory (ROM). The memory 1230 may store computer-readable, computer-executable code 1235 including instructions that, when executed, cause the processor to perform various functions described herein. In some cases, the memory 1230 may contain, among other things, a basic I/O system (BIOS) which may control basic hardware or software operation such as the interaction with peripheral components or devices.

The processor 1240 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1240 may be configured to operate a memory array using a memory controller. In other cases, a memory controller may be integrated into the processor 1240. The processor 1240 may be configured to execute computer-readable instructions stored in a memory (e.g., the memory 1230) to cause the device 1205 to perform various functions (e.g., functions or tasks supporting spatial resource pool techniques for multiple concurrent transmissions in sidelink wireless communications).

The code 1235 may include instructions to implement aspects of the present disclosure, including instructions to support wireless communications. The code 1235 may be stored in a non-transitory computer-readable medium such as system memory or other type of memory. In some cases, the code 1235 may not be directly executable by the processor 1240 but may cause a computer (e.g., when compiled and executed) to perform functions described herein.

The actions performed by the processor 1240, memory 1230, I/O controller 1215, communications manager 1210, transceiver 1220, and antenna 1225 as described herein may be implemented to realize one or more potential advantages. One implementation may allow the device 1205 to increase scheduling flexibility by transmitting concurrent sidelink communications. Another implementation may provide improved data throughput and user experience at the device 1205 through the reduction of signaling overhead.

Figure 13:
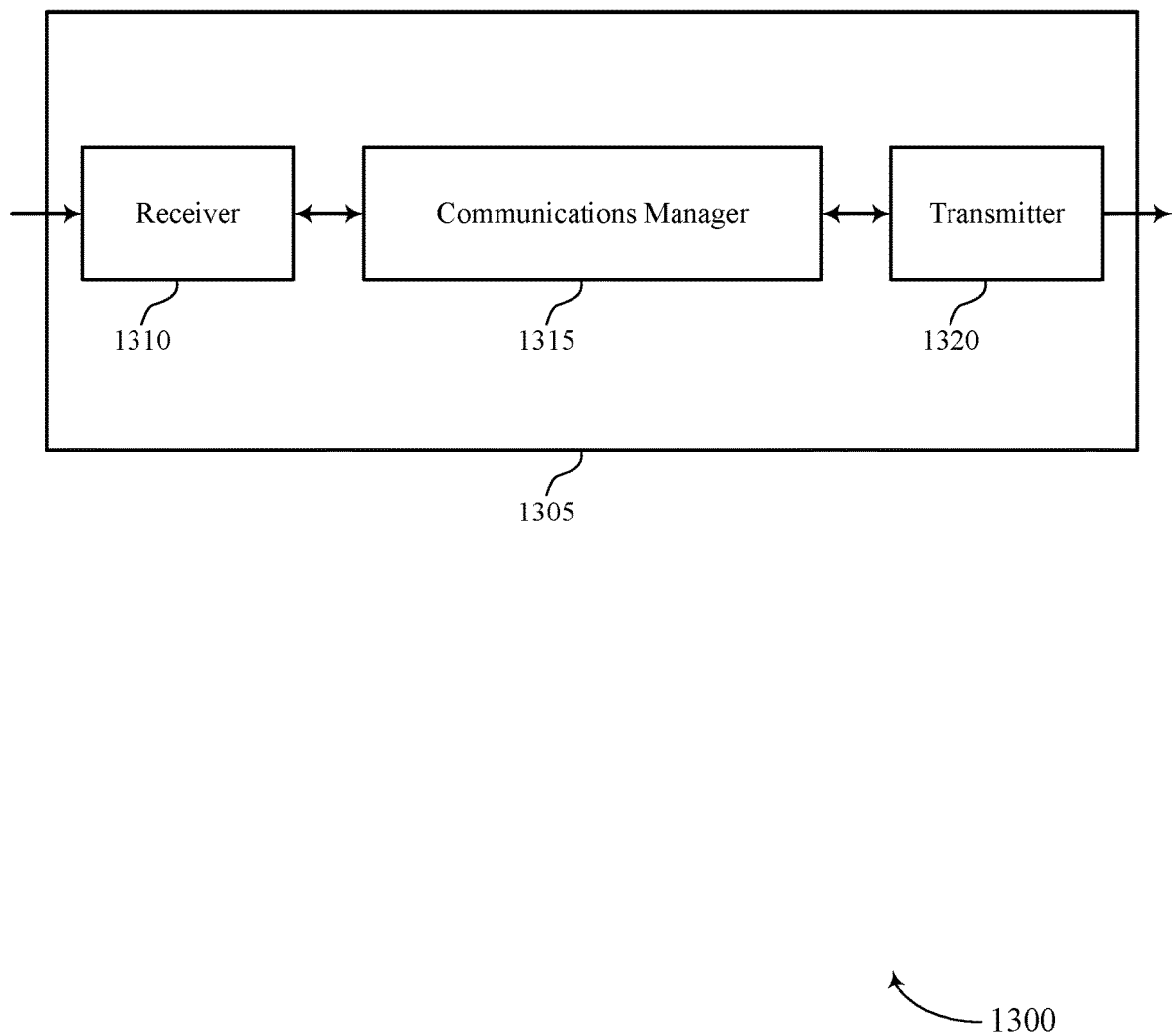
FIGS. 13 and 14 show block diagrams of devices that support spatial resource pool techniques for multiple concurrent transmissions in sidelink wireless communications in accordance with aspects of the present disclosure.

FIG. 13 shows a block diagram 1300 of a device 1305 that supports spatial resource pool techniques for multiple concurrent transmissions in sidelink wireless communications in accordance with aspects of the present disclosure. The device 1305 may be an example of aspects of a base station 105 as described herein. The device 1305 may include a receiver 1310, a communications manager 1315, and a transmitter 1320. The device 1305 may also include a processor. Each of these components may be in communication with one another (e.g., via one or more buses).

The receiver 1310 may provide a means for receiving information such as packets, user data, or control information associated with various information channels (e.g., control channels, data channels, and information related to spatial resource pool techniques for multiple concurrent transmissions in sidelink wireless communications, etc.). Information may be passed on to other components of the device 1305. The receiver 1310 may be an example of aspects of the transceiver 1620 described with reference to FIG. 16. The receiver 1310 may utilize a single antenna or a set of antennas.

The communications manager 1315 may provide a means for configuring two or more resource pools that provide wireless resources available for sidelink communication between a first UE and a second UE, each resource pool of the two or more resource pools including a set of frequency domain resources, a set of time domain resources, and two or more subsets of available spatial resources that are available for the sidelink communication and transmit configuration information to each of the first UE and the second UE that indicates the two or more resource pools. The communications manager 1315 may be an example of aspects of the communications manager 1610 described herein.

The actions performed by the communications manager 1315 as described herein may be implemented to realize one or more potential advantages. One implementation may allow a base station 105 to increase scheduling flexibility at a UE 115 by configuring resource pools that provide wireless resources available for sidelink communication between UEs 115. Another implementation may provide improved quality and reliability of service at the base station 105, as latency may be reduced.

The communications manager 1315, or its sub-components, may be implemented in hardware, code (e.g., software or firmware) executed by a processor, or any combination thereof. If implemented in code executed by a processor, the functions of the communications manager 1315, or its sub-components may be executed by a general-purpose processor, a DSP, an ASIC, a FPGA or other programmable logic device, discrete gate or transistor logic, discrete hardware components, or any combination thereof designed to perform the functions described in the present disclosure.

The communications manager 1315 may be an example of means for performing various aspects of resource pool management techniques as described herein. The communications manager 1315, or its sub-components, may be physically located at various positions, including being distributed such that portions of functions are implemented at different physical locations by one or more physical components. In some examples, the communications manager 1315, or its sub-components, may be a separate and distinct component in accordance with various aspects of the present disclosure. In some examples, the communications manager 1315, or its sub-components, may be combined with one or more other hardware components, including but not limited to an I/O component, a transceiver, a network server, another computing device, one or more other components described in the present disclosure, or a combination thereof in accordance with various aspects of the present disclosure.

In another implementation, the communications manager 1315, or its sub-components, may be implemented in code (e.g., as communications management software or firmware) executed by a processor, or any combination thereof. If implemented in code executed by a processor, the functions of the communications manager 1315, or its sub-components may be executed by a general-purpose processor, a digital signal processor (DSP), an application-specific integrated circuit (ASIC), a field programmable gate array (FPGA) or other programmable logic device.

In some examples, the communication manager 1315 may be configured to perform various operations (e.g., receiving, determining, transmitting, identifying, monitoring, demodulating, mitigating) using or otherwise in cooperation with the receiver 1310, the transmitter 1320, or both.

The transmitter 1320 may provide a means for transmitting signals generated by other components of the device 1305. In some examples, the transmitter 1320 may be collocated with a receiver 1310 in a transceiver module. For example, the transmitter 1320 may be an example of aspects of the transceiver 1620 described with reference to FIG. 16. The transmitter 1320 may utilize a single antenna or a set of antennas.

Figure 14:
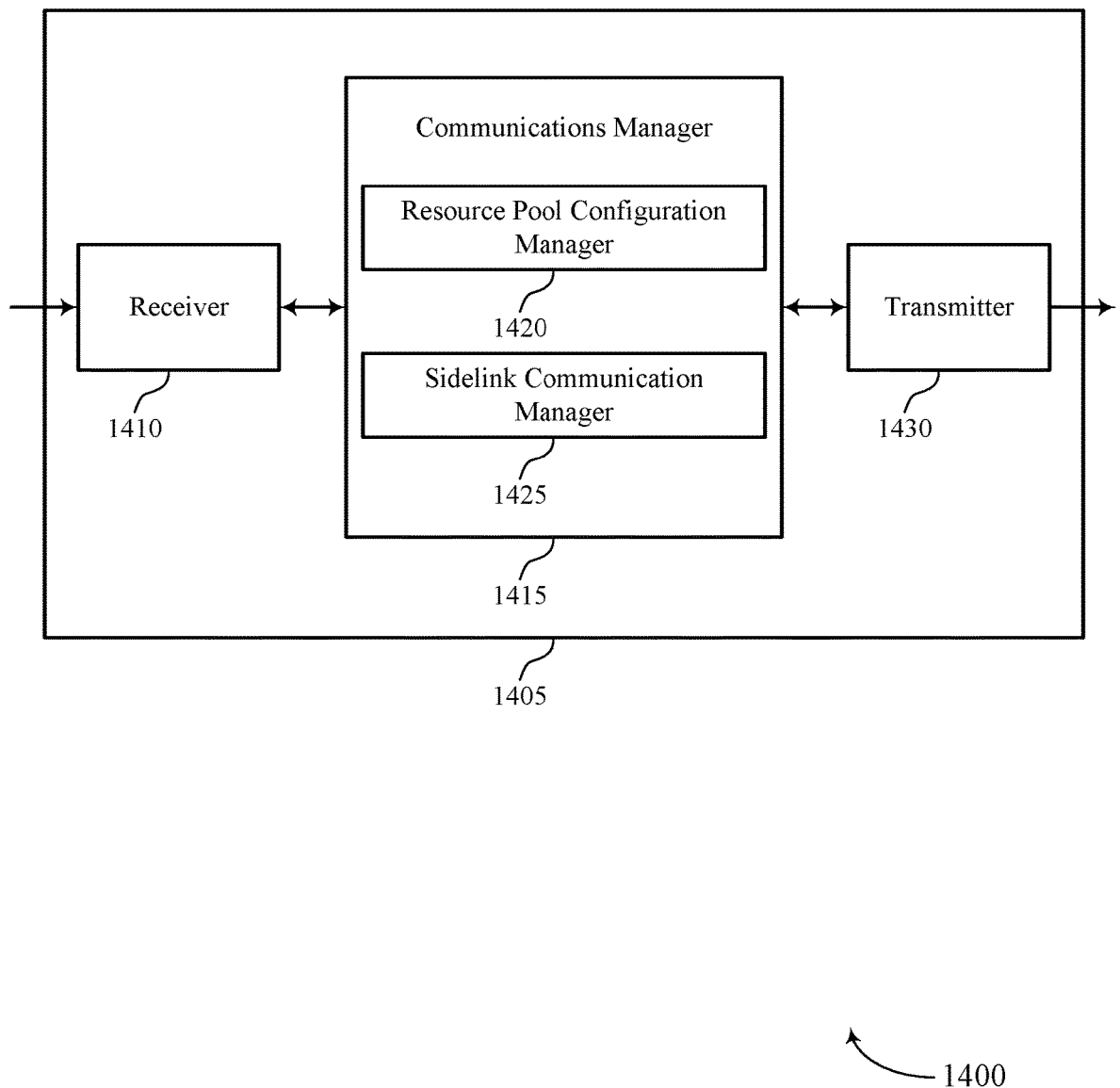

FIG. 14 shows a block diagram 1400 of a device 1405 that supports spatial resource pool techniques for multiple concurrent transmissions in sidelink wireless communications in accordance with aspects of the present disclosure. The device 1405 may be an example of aspects of a device 1305, or a base station 105 as described herein. The device 1405 may include a receiver 1410, a communications manager 1415, and a transmitter 1430. The device 1405 may also include a processor. Each of these components may be in communication with one another (e.g., via one or more buses).

The receiver 1410 may provide a means for receiving information such as packets, user data, or control information associated with various information channels (e.g., control channels, data channels, and information related to spatial resource pool techniques for multiple concurrent transmissions in sidelink wireless communications, etc.). Information may be passed on to other components of the device 1405. The receiver 1410 may be an example of aspects of the transceiver 1620 described with reference to FIG. 16. The receiver 1410 may utilize a single antenna or a set of antennas.

The communications manager 1415 may be an example of aspects of the communications manager 1315 as described herein. The communications manager 1415 may include a resource pool configuration manager 1420 and a sidelink communication manager 1425. The communications manager 1415 may be an example of aspects of the communications manager 1610 described herein.

The resource pool configuration manager 1420 may provide a means for configuring two or more resource pools that provide wireless resources available for sidelink communication between a first UE and a second UE, each resource pool of the two or more resource pools including a set of frequency domain resources, a set of time domain resources, and two or more subsets of available spatial resources that are available for the sidelink communication.

The sidelink communication manager 1425 may provide a means for transmitting configuration information to each of the first UE and the second UE that indicates the two or more resource pools.

The transmitter 1430 may provide a means for transmitting signals generated by other components of the device 1405. In some examples, the transmitter 1430 may be collocated with a receiver 1410 in a transceiver module. For example, the transmitter 1430 may be an example of aspects of the transceiver 1620 described with reference to FIG. 16. The transmitter 1430 may utilize a single antenna or a set of antennas.

Figure 15:
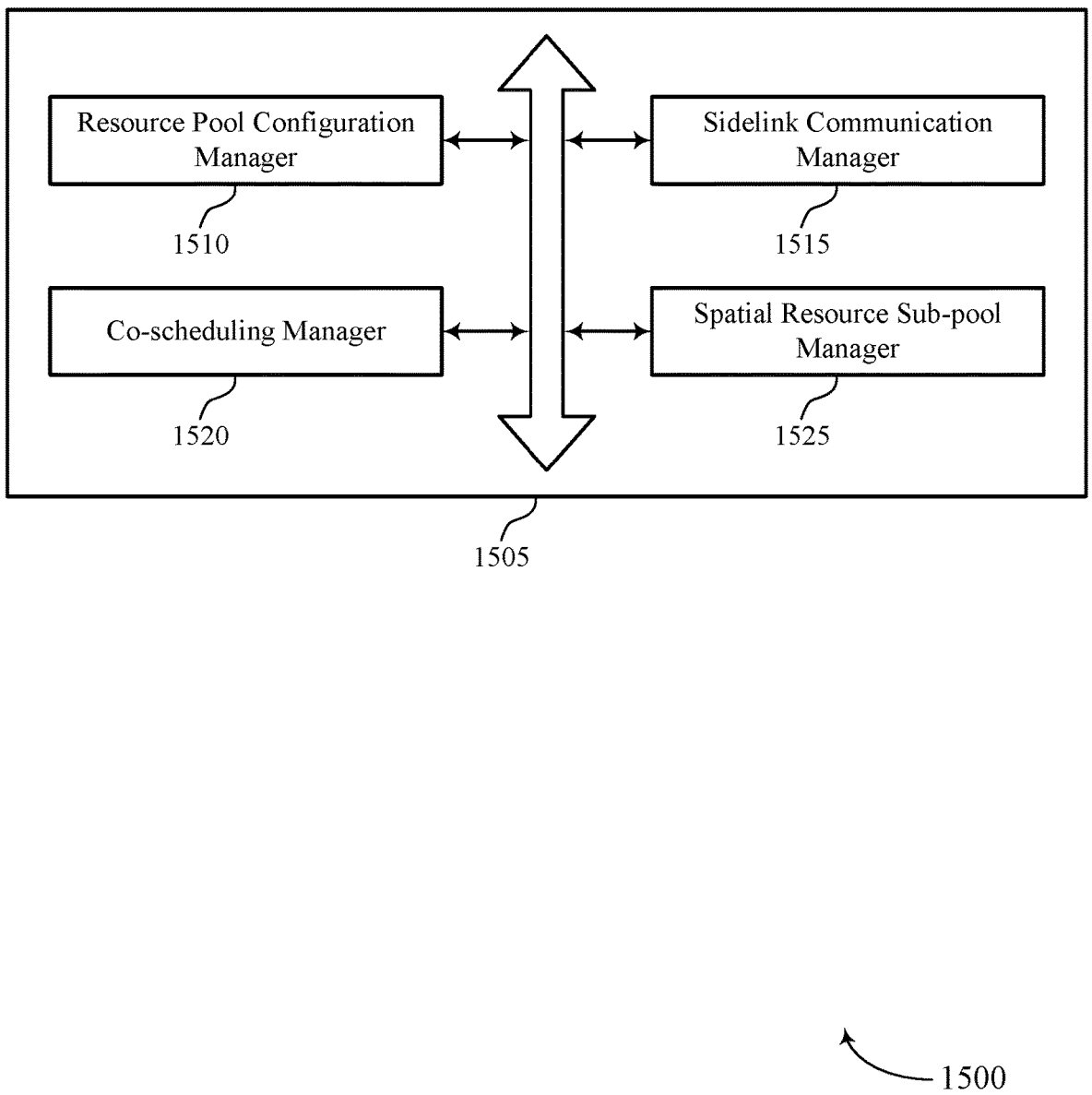
FIG. 15 shows a block diagram of a communications manager that supports spatial resource pool techniques for multiple concurrent transmissions in sidelink wireless communications in accordance with aspects of the present disclosure.

FIG. 15 shows a block diagram 1500 of a communications manager 1505 that supports spatial resource pool techniques for multiple concurrent transmissions in sidelink wireless communications in accordance with aspects of the present disclosure. The communications manager 1505 may be an example of aspects of a communications manager 1315, a communications manager 1415, or a communications manager 1610 described herein. The communications manager 1505 may include a resource pool configuration manager 1510, a sidelink communication manager 1515, a co-scheduling manager 1520, and a spatial resource sub-pool manager 1525. Each of these modules may communicate, directly or indirectly, with one another (e.g., via one or more buses).

The resource pool configuration manager 1510 may provide a means for configuring two or more resource pools that provide wireless resources available for sidelink communication between a first UE and a second UE, each resource pool of the two or more resource pools including a set of frequency domain resources, a set of time domain resources, and two or more subsets of available spatial resources that are available for the sidelink communication.

The sidelink communication manager 1515 may provide a means for transmitting configuration information to each of the first UE and the second UE that indicates the two or more resource pools. In some examples, the sidelink communication manager 1515 may provide a means for transmitting configuration information to each of the first UE and the second UE that indicates the co-scheduled spatial resources.

The co-scheduling manager 1520 may provide a means for configuring, for each of the two or more resource pools, a second subset of co-scheduled spatial resources that are available to one or more UEs other than the first UE or the second UE for sidelink communication using the resource pool, where the first subset of available spatial resources and the second subset of available spatial resources are non-overlapping for each resource pool of the two or more resource pools.

The spatial resource sub-pool manager 1525 may provide a means for configuring spatial sub-resource pools at sidelink UEs. In some cases, the first subset of available spatial resources include two or more orthogonal antenna ports, two or more different scrambling identifications of a same orthogonal antenna port, or any combinations thereof.

Figure 16:
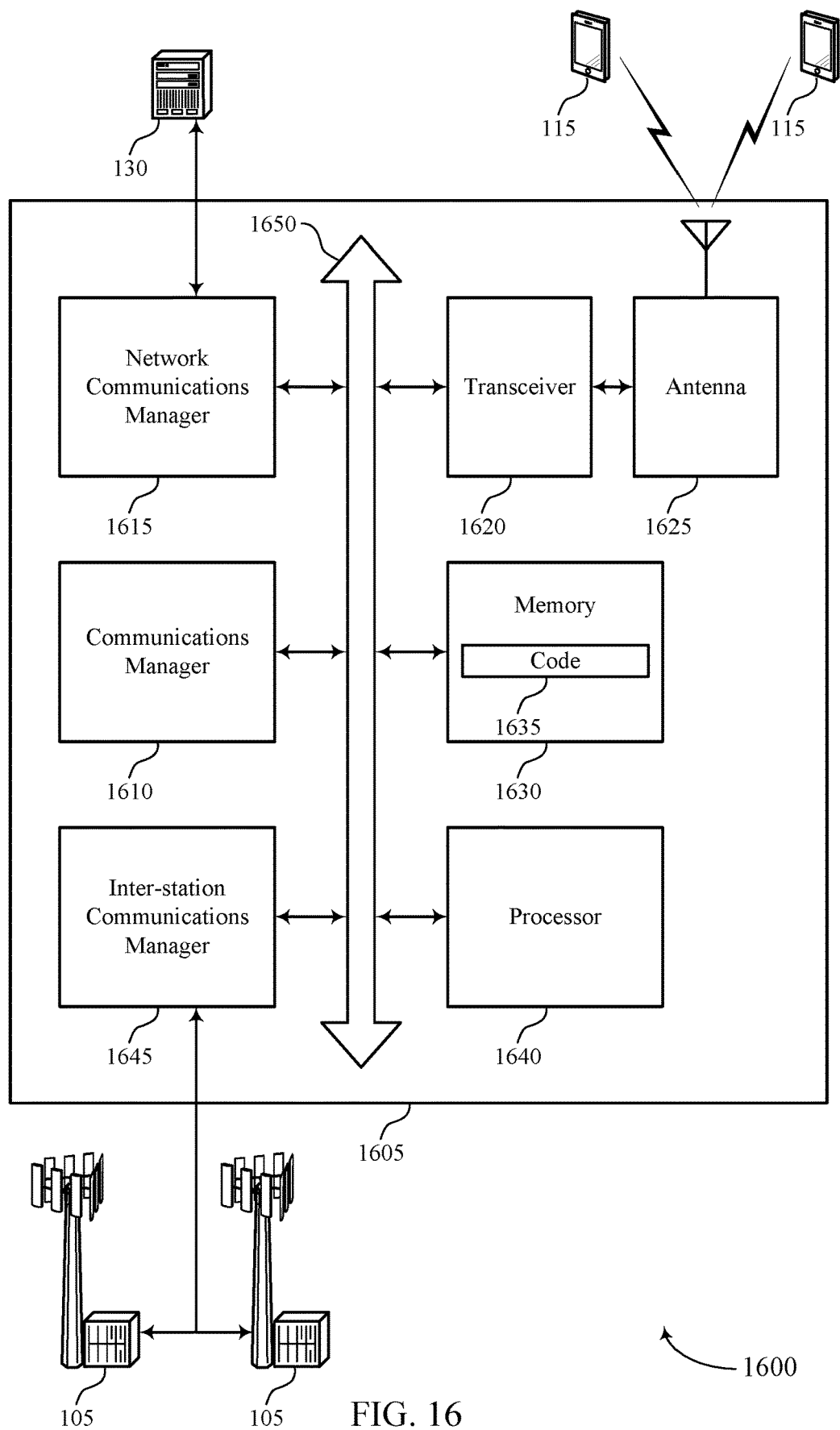
FIG. 16 shows a diagram of a system including a device that supports spatial resource pool techniques for multiple concurrent transmissions in sidelink wireless communications in accordance with aspects of the present disclosure.

FIG. 16 shows a diagram of a system 1600 including a device 1605 that supports spatial resource pool techniques for multiple concurrent transmissions in sidelink wireless communications in accordance with aspects of the present disclosure. The device 1605 may be an example of or include the components of device 1305, device 1405, or a base station 105 as described herein. The device 1605 may include components for bi-directional voice and data communications including components for transmitting and receiving communications, including a communications manager 1610, a network communications manager 1615, a transceiver 1620, an antenna 1625, memory 1630, a processor 1640, and an inter-station communications manager 1645. These components may be in electronic communication via one or more buses (e.g., bus 1650).

The communications manager 1610 may configure two or more resource pools that provide wireless resources available for sidelink communication between a first UE and a second UE, each resource pool of the two or more resource pools including a set of frequency domain resources, a set of time domain resources, and two or more subsets of available spatial resources that are available for the sidelink communication and transmit configuration information to each of the first UE and the second UE that indicates the two or more resource pools.

The network communications manager 1615 may manage communications with the core network (e.g., via one or more wired backhaul links). For example, the network communications manager 1615 may manage the transfer of data communications for client devices, such as one or more UEs 115.

The transceiver 1620 may communicate bi-directionally, via one or more antennas, wired, or wireless links as described herein. For example, the transceiver 1620 may represent a wireless transceiver and may communicate bi-directionally with another wireless transceiver. The transceiver 1620 may also include a modem to modulate the packets and provide the modulated packets to the antennas for transmission, and to demodulate packets received from the antennas.

In some cases, the wireless device may include a single antenna 1625. However, in some cases the device may have more than one antenna 1625, which may be capable of concurrently transmitting or receiving multiple wireless transmissions.

The memory 1630 may include RAM, ROM, or a combination thereof. The memory 1630 may store computer-readable code 1635 including instructions that, when executed by a processor (e.g., the processor 1640) cause the device to perform various functions described herein. In some cases, the memory 1630 may contain, among other things, a BIOS which may control basic hardware or software operation such as the interaction with peripheral components or devices.

The processor 1640 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1640 may be configured to operate a memory array using a memory controller. In some cases, a memory controller may be integrated into processor 1640. The processor 1640 may be configured to execute computer-readable instructions stored in a memory (e.g., the memory 1630) to cause the device 1605 to perform various functions (e.g., functions or tasks supporting spatial resource pool techniques for multiple concurrent transmissions in sidelink wireless communications).

The inter-station communications manager 1645 may manage communications with other base station 105, and may include a controller or scheduler for controlling communications with UEs 115 in cooperation with other base stations 105. For example, the inter-station communications manager 1645 may coordinate scheduling for transmissions to UEs 115 for various interference mitigation techniques such as beamforming or joint transmission. In some examples, the inter-station communications manager 1645 may provide an X2 interface within an LTE/LTE-A wireless communication network technology to provide communication between base stations 105.

The code 1635 may include instructions to implement aspects of the present disclosure, including instructions to support wireless communications. The code 1635 may be stored in a non-transitory computer-readable medium such as system memory or other type of memory. In some cases, the code 1635 may not be directly executable by the processor 1640 but may cause a computer (e.g., when compiled and executed) to perform functions described herein.

The actions performed by the processor 1640, memory 1630, I/O controller 1615, communications manager 1610, transceiver 1620, and antenna 1625 as described herein may be implemented to realize one or more potential advantages. One implementation may allow the device 1505 to increase scheduling flexibility at a UE 115 by configuring resource pools that provide wireless resources available for sidelink communication between UEs 115. Another implementation may provide improved data throughput and user experience through the reduction of signaling overhead.

Figure 17:
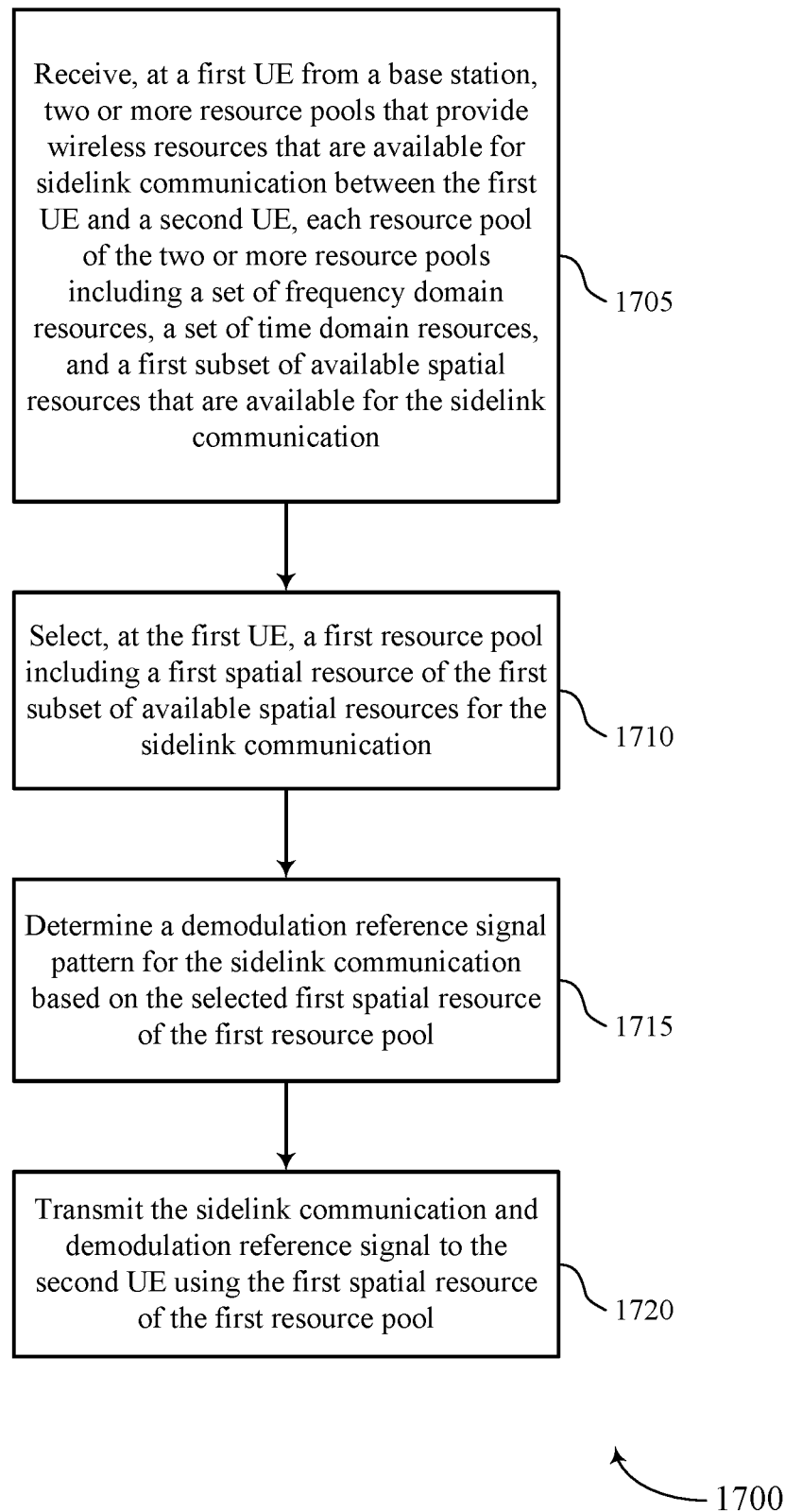
FIGS. 17 through 24 show flowcharts illustrating methods that support spatial resource pool techniques for multiple concurrent transmissions in sidelink wireless communications in accordance with aspects of the present disclosure.

FIG. 17 shows a flowchart illustrating a method 1700 that supports spatial resource pool techniques for multiple concurrent transmissions in sidelink wireless communications in accordance with aspects of the present disclosure. The operations of method 1700 may be implemented by a UE 115 or its components as described herein. For example, the operations of method 1700 may be performed by a communications manager as described with reference to FIGS. 9 through 12. In some examples, a UE may execute a set of instructions to control the functional elements of the UE to perform the functions described herein. Additionally or alternatively, a UE may perform aspects of the functions described herein using special-purpose hardware.

At 1705, the UE, which may be a first UE that transmits a sidelink communication, may receive, from a base station, two or more resource pools that provide wireless resources available for sidelink communication between the first UE and a second UE, each resource pool of the two or more resource pools including a set of frequency domain resources, a set of time domain resources, and a first subset of available spatial resources that are available for the sidelink communication. The operations of 1705 may be performed according to the methods described herein. In some examples, aspects of the operations of 1705 may be performed by a resource pool configuration manager as described with reference to FIGS. 9 through 12.

At 1710, the UE may select a first resource pool including a first spatial resource of the first subset of available spatial resources for the sidelink communication. The operations of 1710 may be performed according to the methods described herein. In some examples, aspects of the operations of 1710 may be performed by a resource pool selection manager as described with reference to FIGS. 9 through 12.

At 1715, the UE may determine a DMRS pattern for the sidelink communication based on the selected first spatial resource of the first resource pool. The operations of 1715 may be performed according to the methods described herein. In some examples, aspects of the operations of 1715 may be performed by a DMRS manager as described with reference to FIGS. 9 through 12.

At 1720, the UE may transmit the sidelink communication and a DMRS to the second UE using the first spatial resource of the first resource pool. The operations of 1720 may be performed according to the methods described herein. In some examples, aspects of the operations of 1720 may be performed by a sidelink communication manager as described with reference to FIGS. 9 through 12.

Figure 18:
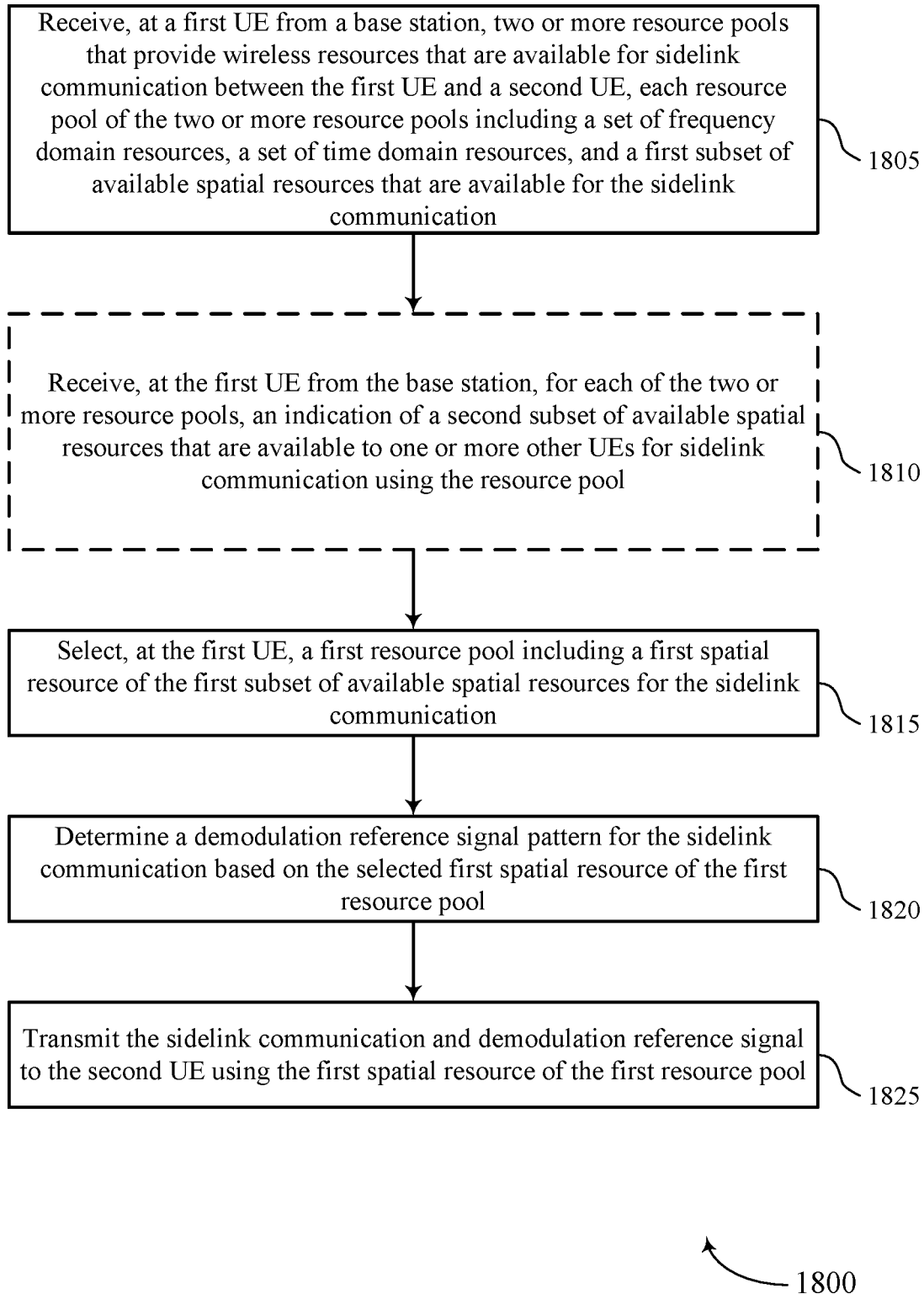

FIG. 18 shows a flowchart illustrating a method 1800 that supports spatial resource pool techniques for multiple concurrent transmissions in sidelink wireless communications in accordance with aspects of the present disclosure. The operations of method 1800 may be implemented by a UE 115 or its components as described herein. For example, the operations of method 1800 may be performed by a communications manager as described with reference to FIGS. 9 through 12. In some examples, a UE may execute a set of instructions to control the functional elements of the UE to perform the functions described herein. Additionally or alternatively, a UE may perform aspects of the functions described herein using special-purpose hardware.

At 1805, the UE, which may be a first UE that transmits a sidelink communication, may receive, from a base station, two or more resource pools that provide wireless resources available for sidelink communication between the first UE and a second UE, each resource pool of the two or more resource pools including a set of frequency domain resources, a set of time domain resources, and a first subset of available spatial resources that are available for the sidelink communication. The operations of 1805 may be performed according to the methods described herein. In some examples, aspects of the operations of 1805 may be performed by a resource pool configuration manager as described with reference to FIGS. 9 through 12.

At 1810, the UE may receive, from the base station, for each of the two or more resource pools, an indication of a second subset of available spatial resources that are available to one or more other UEs for sidelink communication using the resource pool, where the first subset of available spatial resources and the second subset of available spatial resources are non-overlapping for each resource pool of the two or more resource pools. The operations of 1810 may be performed according to the methods described herein. In some examples, aspects of the operations of 1810 may be performed by a co-scheduling manager as described with reference to FIGS. 9 through 12.

At 1815, the UE may select a first resource pool including a first spatial resource of the first subset of available spatial resources for the sidelink communication. The operations of 1815 may be performed according to the methods described herein. In some examples, aspects of the operations of 1815 may be performed by a resource pool selection manager as described with reference to FIGS. 9 through 12.

At 1820, the UE may determine a DMRS pattern for the sidelink communication based on the selected first spatial resource of the first resource pool. The operations of 1820 may be performed according to the methods described herein. In some examples, aspects of the operations of 1820 may be performed by a DMRS manager as described with reference to FIGS. 9 through 12.

At 1825, the UE may transmit the sidelink communication and a DMRS to the second UE using the first spatial resource of the first resource pool. The operations of 1825 may be performed according to the methods described herein. In some examples, aspects of the operations of 1825 may be performed by a sidelink communication manager as described with reference to FIGS. 9 through 12.

Figure 19:
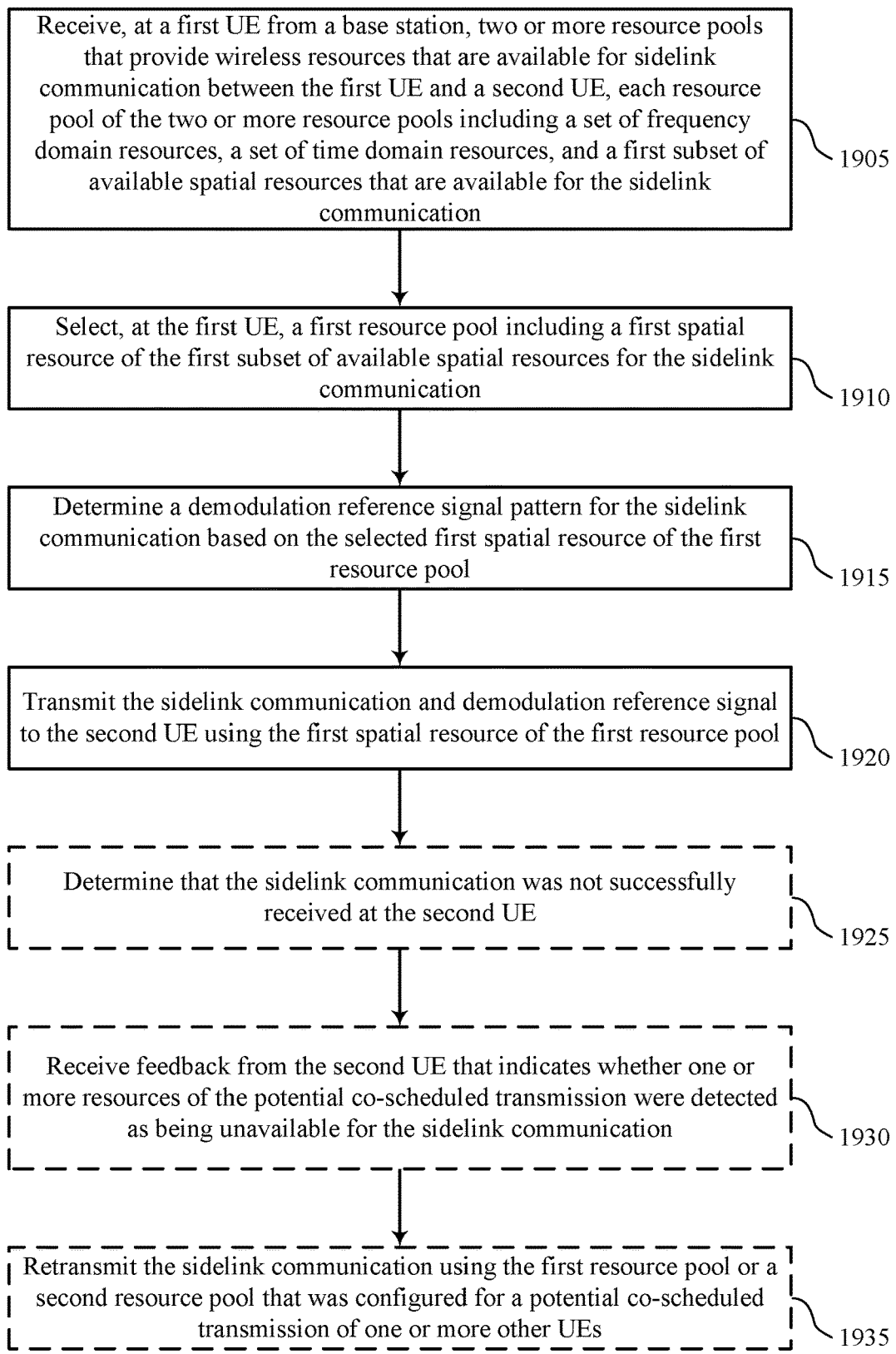

FIG. 19 shows a flowchart illustrating a method 1900 that supports spatial resource pool techniques for multiple concurrent transmissions in sidelink wireless communications in accordance with aspects of the present disclosure. The operations of method 1900 may be implemented by a UE 115 or its components as described herein. For example, the operations of method 1900 may be performed by a communications manager as described with reference to FIGS. 9 through 12. In some examples, a UE may execute a set of instructions to control the functional elements of the UE to perform the functions described herein. Additionally or alternatively, a UE may perform aspects of the functions described herein using special-purpose hardware.

At 1905, the UE, which may be a first UE that transmits a sidelink communication, may receive, from a base station, two or more resource pools that provide wireless resources available for sidelink communication between the first UE and a second UE, each resource pool of the two or more resource pools including a set of frequency domain resources, a set of time domain resources, and a first subset of available spatial resources that are available for the sidelink communication. The operations of 1905 may be performed according to the methods described herein. In some examples, aspects of the operations of 1905 may be performed by a resource pool configuration manager as described with reference to FIGS. 9 through 12.

At 1910, the UE may select a first resource pool including a first spatial resource of the first subset of available spatial resources for the sidelink communication. The operations of 1910 may be performed according to the methods described herein. In some examples, aspects of the operations of 1910 may be performed by a resource pool selection manager as described with reference to FIGS. 9 through 12.

At 1915, the UE may determine a DMRS pattern for the sidelink communication based on the selected first spatial resource of the first resource pool. The operations of 1915 may be performed according to the methods described herein. In some examples, aspects of the operations of 1915 may be performed by a DMRS manager as described with reference to FIGS. 9 through 12.

At 1920, the UE may transmit the sidelink communication and DMRS to the second UE using the first spatial resource of the first resource pool. The operations of 1920 may be performed according to the methods described herein. In some examples, aspects of the operations of 1920 may be performed by a sidelink communication manager as described with reference to FIGS. 9 through 12.

At 1925, the UE may determine that the sidelink communication was not successfully received at the second UE. The operations of 1925 may be performed according to the methods described herein. In some examples, aspects of the operations of 1925 may be performed by a retransmission manager as described with reference to FIGS. 9 through 12.

At 1930, the UE may receive feedback from the second UE that indicates whether one or more resources of the potential co-scheduled transmission were detected as being unavailable for the sidelink communication, and where a retransmission resource is selected based on the feedback. The operations of 1930 may be performed according to the methods described herein. In some examples, aspects of the operations of 1930 may be performed by a retransmission manager as described with reference to FIGS. 9 through 12.

At 1935, the UE may retransmit the sidelink communication using the first resource pool or a second resource pool that was configured for a potential co-scheduled transmission of one or more other UEs. The operations of 1935 may be performed according to the methods described herein. In some examples, aspects of the operations of 1935 may be performed by a retransmission manager as described with reference to FIGS. 9 through 12.

Figure 20:
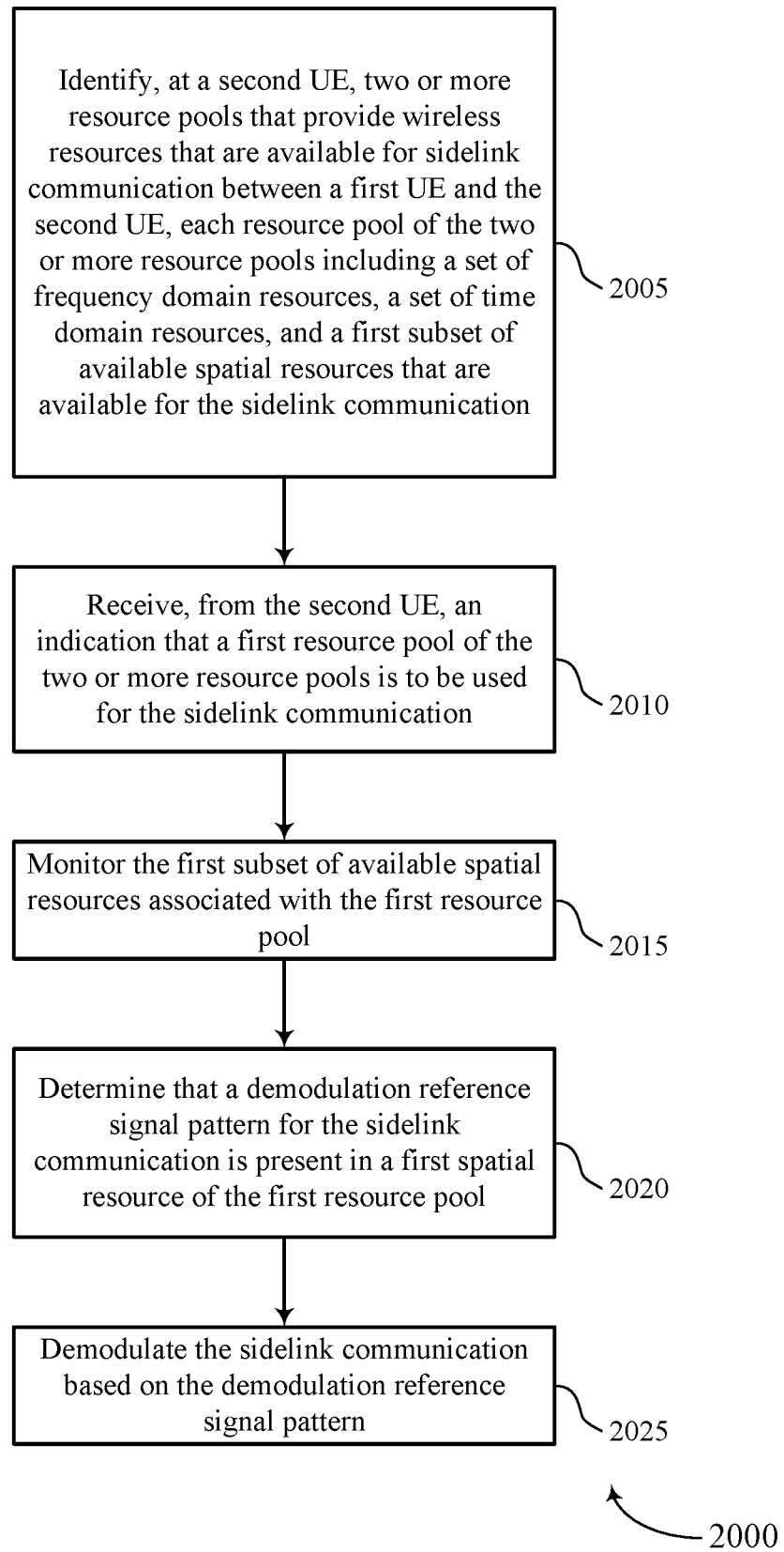

FIG. 20 shows a flowchart illustrating a method 2000 that supports spatial resource pool techniques for multiple concurrent transmissions in sidelink wireless communications in accordance with aspects of the present disclosure. The operations of method 2000 may be implemented by a UE 115 or its components as described herein. For example, the operations of method 2000 may be performed by a communications manager as described with reference to FIGS. 9 through 12. In some examples, a UE may execute a set of instructions to control the functional elements of the UE to perform the functions described herein. Additionally or alternatively, a UE may perform aspects of the functions described herein using special-purpose hardware.

At 2005, the UE, which may be a second UE that receives a sidelink communication, may identify two or more resource pools that provide wireless resources available for sidelink communication between a first UE and the second UE, each resource pool of the two or more resource pools including a set of frequency domain resources, a set of time domain resources, and a first subset of available spatial resources that are available for the sidelink communication. The operations of 2005 may be performed according to the methods described herein. In some examples, aspects of the operations of 2005 may be performed by a resource pool configuration manager as described with reference to FIGS. 9 through 12.

At 2010, the UE may receive, from the first UE, an indication that a first resource pool of the two or more resource pools is to be used for the sidelink communication. The operations of 2010 may be performed according to the methods described herein. In some examples, aspects of the operations of 2010 may be performed by a resource pool configuration manager as described with reference to FIGS. 9 through 12.

At 2015, the UE may monitor the first subset of available spatial resources associated with the first resource pool. The operations of 2015 may be performed according to the methods described herein. In some examples, aspects of the operations of 2015 may be performed by a DMRS manager as described with reference to FIGS. 9 through 12.

At 2020, the UE may determine that a DMRS pattern for the sidelink communication is present in a first spatial resource of the first resource pool. The operations of 2020 may be performed according to the methods described herein. In some examples, aspects of the operations of 2020 may be performed by a DMRS manager as described with reference to FIGS. 9 through 12.

At 2025, the UE may demodulate the sidelink communication based on the DMRS pattern. The operations of 2025 may be performed according to the methods described herein. In some examples, aspects of the operations of 2025 may be performed by a sidelink communication manager as described with reference to FIGS. 9 through 12.

Figure 21:
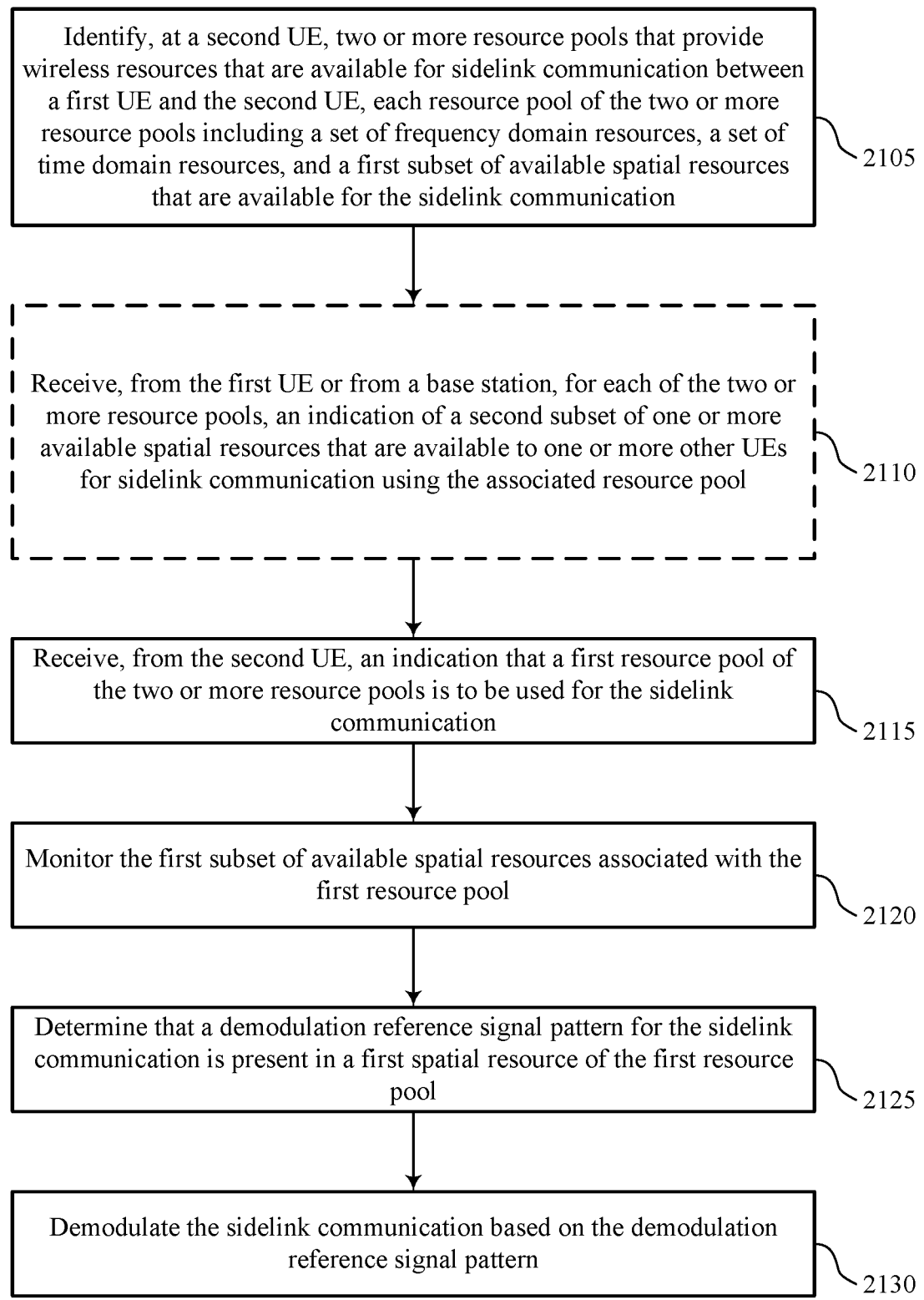

FIG. 21 shows a flowchart illustrating a method 2100 that supports spatial resource pool techniques for multiple concurrent transmissions in sidelink wireless communications in accordance with aspects of the present disclosure. The operations of method 2100 may be implemented by a UE 115 or its components as described herein. For example, the operations of method 2100 may be performed by a communications manager as described with reference to FIGS. 9 through 12. In some examples, a UE may execute a set of instructions to control the functional elements of the UE to perform the functions described herein. Additionally or alternatively, a UE may perform aspects of the functions described herein using special-purpose hardware.

At 2105, the UE, which may be a second UE that receives a sidelink communication, may identify two or more resource pools that provide wireless resources available for sidelink communication between a first UE and the second UE, each resource pool of the two or more resource pools including a set of frequency domain resources, a set of time domain resources, and a first subset of available spatial resources that are available for the sidelink communication. The operations of 2105 may be performed according to the methods described herein. In some examples, aspects of the operations of 2105 may be performed by a resource pool configuration manager as described with reference to FIGS. 9 through 12.

At 2110, the UE may receive, from the first UE or from a base station, for each of the two or more resource pools, an indication of a second subset of one or more available spatial resources that are available to one or more other UEs for sidelink communication using the associated resource pool, where the first subset of available spatial resources and the second subset of one or more available spatial resources are non-overlapping for each resource pool of the two or more resource pools. The operations of 2110 may be performed according to the methods described herein. In some examples, aspects of the operations of 2110 may be performed by a co-scheduling manager as described with reference to FIGS. 9 through 12.

At 2115, the UE may receive, from the first UE, an indication that a first resource pool of the two or more resource pools is to be used for the sidelink communication. The operations of 2115 may be performed according to the methods described herein. In some examples, aspects of the operations of 2115 may be performed by a resource pool configuration manager as described with reference to FIGS. 9 through 12.

At 2120, the UE may monitor the first subset of available spatial resources associated with the first resource pool. The operations of 2120 may be performed according to the methods described herein. In some examples, aspects of the operations of 2120 may be performed by a DMRS manager as described with reference to FIGS. 9 through 12.

At 2125, the UE may determine that a DMRS pattern for the sidelink communication is present in a first spatial resource of the first resource pool. The operations of 2125 may be performed according to the methods described herein. In some examples, aspects of the operations of 2125 may be performed by a DMRS manager as described with reference to FIGS. 9 through 12.

At 2130, the UE may demodulate the sidelink communication based on the DMRS pattern. The operations of 2130 may be performed according to the methods described herein. In some examples, aspects of the operations of 2130 may be performed by a sidelink communication manager as described with reference to FIGS. 9 through 12.

Figure 22:
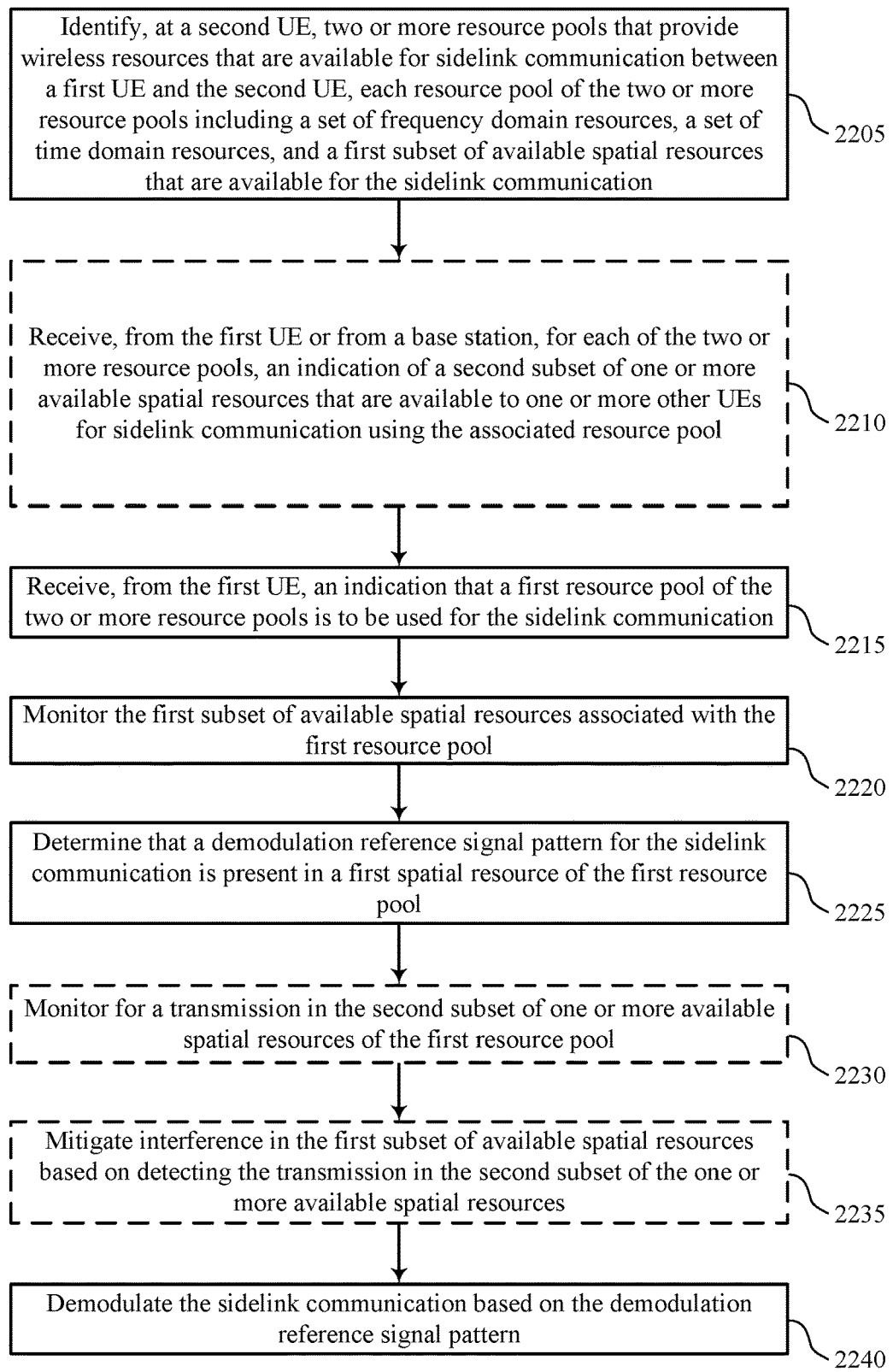

FIG. 22 shows a flowchart illustrating a method 2200 that supports spatial resource pool techniques for multiple concurrent transmissions in sidelink wireless communications in accordance with aspects of the present disclosure. The operations of method 2200 may be implemented by a UE 115 or its components as described herein. For example, the operations of method 2200 may be performed by a communications manager as described with reference to FIGS. 9 through 12. In some examples, a UE may execute a set of instructions to control the functional elements of the UE to perform the functions described herein. Additionally or alternatively, a UE may perform aspects of the functions described herein using special-purpose hardware.

At 2205, the UE, which may be a second UE that receives a sidelink communication, may identify two or more resource pools that provide wireless resources available for sidelink communication between a first UE and the second UE, each resource pool of the two or more resource pools including a set of frequency domain resources, a set of time domain resources, and a first subset of available spatial resources that are available for the sidelink communication. The operations of 2205 may be performed according to the methods described herein. In some examples, aspects of the operations of 2205 may be performed by a resource pool configuration manager as described with reference to FIGS. 9 through 12.

At 2210, the UE may receive, from the first UE or from a base station, for each of the two or more resource pools, an indication of a second subset of one or more available spatial resources that are available to one or more other UEs for sidelink communication using the associated resource pool, where the first subset of available spatial resources and the second subset of one or more available spatial resources are non-overlapping for each resource pool of the two or more resource pools. The operations of 2210 may be performed according to the methods described herein. In some examples, aspects of the operations of 2210 may be performed by a co-scheduling manager as described with reference to FIGS. 9 through 12.

At 2215, the UE may receive, from the first UE, an indication that a first resource pool of the two or more resource pools is to be used for the sidelink communication. The operations of 2215 may be performed according to the methods described herein. In some examples, aspects of the operations of 2215 may be performed by a resource pool configuration manager as described with reference to FIGS. 9 through 12.

At 2220, the UE may monitor the first subset of available spatial resources associated with the first resource pool. The operations of 2220 may be performed according to the methods described herein. In some examples, aspects of the operations of 2220 may be performed by a DMRS manager as described with reference to FIGS. 9 through 12.

At 2225, the UE may determine that a DMRS pattern for the sidelink communication is present in a first spatial resource of the first resource pool. The operations of 2225 may be performed according to the methods described herein. In some examples, aspects of the operations of 2225 may be performed by a DMRS manager as described with reference to FIGS. 9 through 12.

At 2230, the UE may monitor for a transmission in the second subset of one or more available spatial resources of the first resource pool. The operations of 2230 may be performed according to the methods described herein. In some examples, aspects of the operations of 2230 may be performed by a co-scheduling manager as described with reference to FIGS. 9 through 12.

At 2235, the UE may mitigate interference in the first subset of available spatial resources based on detecting the transmission in the second subset of the one or more available spatial resources. The operations of 2235 may be performed according to the methods described herein. In some examples, aspects of the operations of 2235 may be performed by a co-scheduling manager as described with reference to FIGS. 9 through 12.

At 2240, the UE may demodulate the sidelink communication based on the DMRS pattern. The operations of 2240 may be performed according to the methods described herein. In some examples, aspects of the operations of 2240 may be performed by a sidelink communication manager as described with reference to FIGS. 9 through 12.

Figure 23:
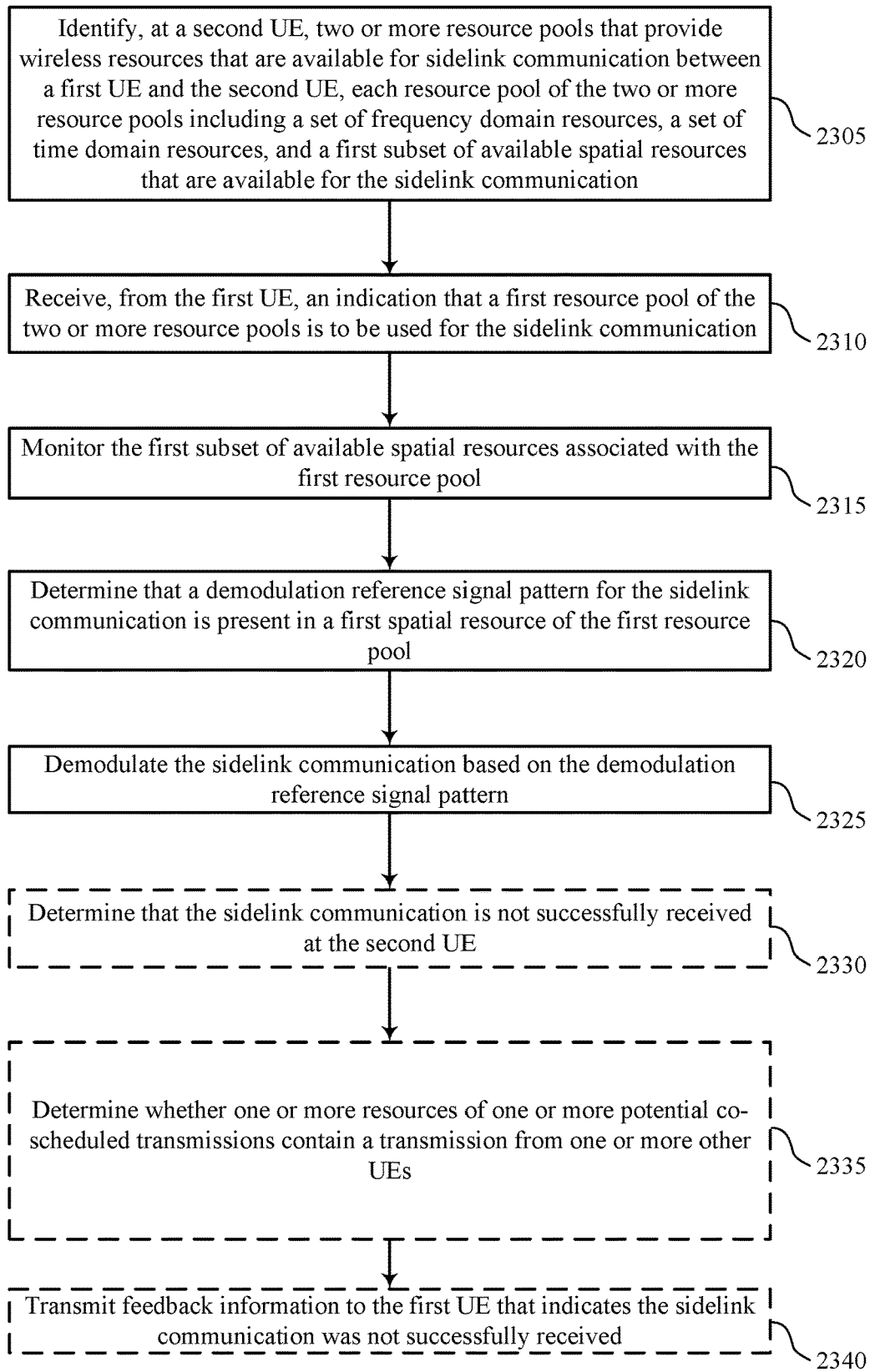

FIG. 23 shows a flowchart illustrating a method 2300 that supports spatial resource pool techniques for multiple concurrent transmissions in sidelink wireless communications in accordance with aspects of the present disclosure. The operations of method 2300 may be implemented by a UE 115 or its components as described herein. For example, the operations of method 2300 may be performed by a communications manager as described with reference to FIGS. 9 through 12. In some examples, a UE may execute a set of instructions to control the functional elements of the UE to perform the functions described herein. Additionally or alternatively, a UE may perform aspects of the functions described herein using special-purpose hardware.

At 2305, the UE, which may be a second UE that receives a sidelink communication, may identify two or more resource pools that provide wireless resources available for sidelink communication between a first UE and the second UE, each resource pool of the two or more resource pools including a set of frequency domain resources, a set of time domain resources, and a first subset of available spatial resources that are available for the sidelink communication. The operations of 2305 may be performed according to the methods described herein. In some examples, aspects of the operations of 2305 may be performed by a resource pool configuration manager as described with reference to FIGS. 9 through 12.

At 2310, the UE may receive, from the first UE, an indication that a first resource pool of the two or more resource pools is to be used for the sidelink communication. The operations of 2310 may be performed according to the methods described herein. In some examples, aspects of the operations of 2310 may be performed by a resource pool configuration manager as described with reference to FIGS. 9 through 12.

At 2315, the UE may monitor the first subset of available spatial resources associated with the first resource pool. The operations of 2315 may be performed according to the methods described herein. In some examples, aspects of the operations of 2315 may be performed by a DMRS manager as described with reference to FIGS. 9 through 12.

At 2320, the UE may determine that a DMRS pattern for the sidelink communication is present in a first spatial resource of the first resource pool. The operations of 2320 may be performed according to the methods described herein. In some examples, aspects of the operations of 2320 may be performed by a DMRS manager as described with reference to FIGS. 9 through 12.

At 2325, the UE may demodulate the sidelink communication based on the DMRS pattern. The operations of 2325 may be performed according to the methods described herein. In some examples, aspects of the operations of 2325 may be performed by a sidelink communication manager as described with reference to FIGS. 9 through 12.

At 2330, the UE may determine that the sidelink communication is not successfully received at the second UE. The operations of 2330 may be performed according to the methods described herein. In some examples, aspects of the operations of 2330 may be performed by a feedback manager as described with reference to FIGS. 9 through 12.

At 2335, the UE may determine whether one or more resources of one or more potential co-scheduled transmissions contain a transmission from one or more other UEs, and where the feedback information further indicates whether the one or more resources of the one or more potential co-scheduled transmissions were detected as being unavailable for sidelink communication. The operations of 2335 may be performed according to the methods described herein. In some examples, aspects of the operations of 2335 may be performed by a feedback manager as described with reference to FIGS. 9 through 12.

At 2340, the UE may transmit feedback information to the first UE that indicates the sidelink communication was not successfully received. The operations of 2340 may be performed according to the methods described herein. In some examples, aspects of the operations of 2340 may be performed by a feedback manager as described with reference to FIGS. 9 through 12.

Figure 24:
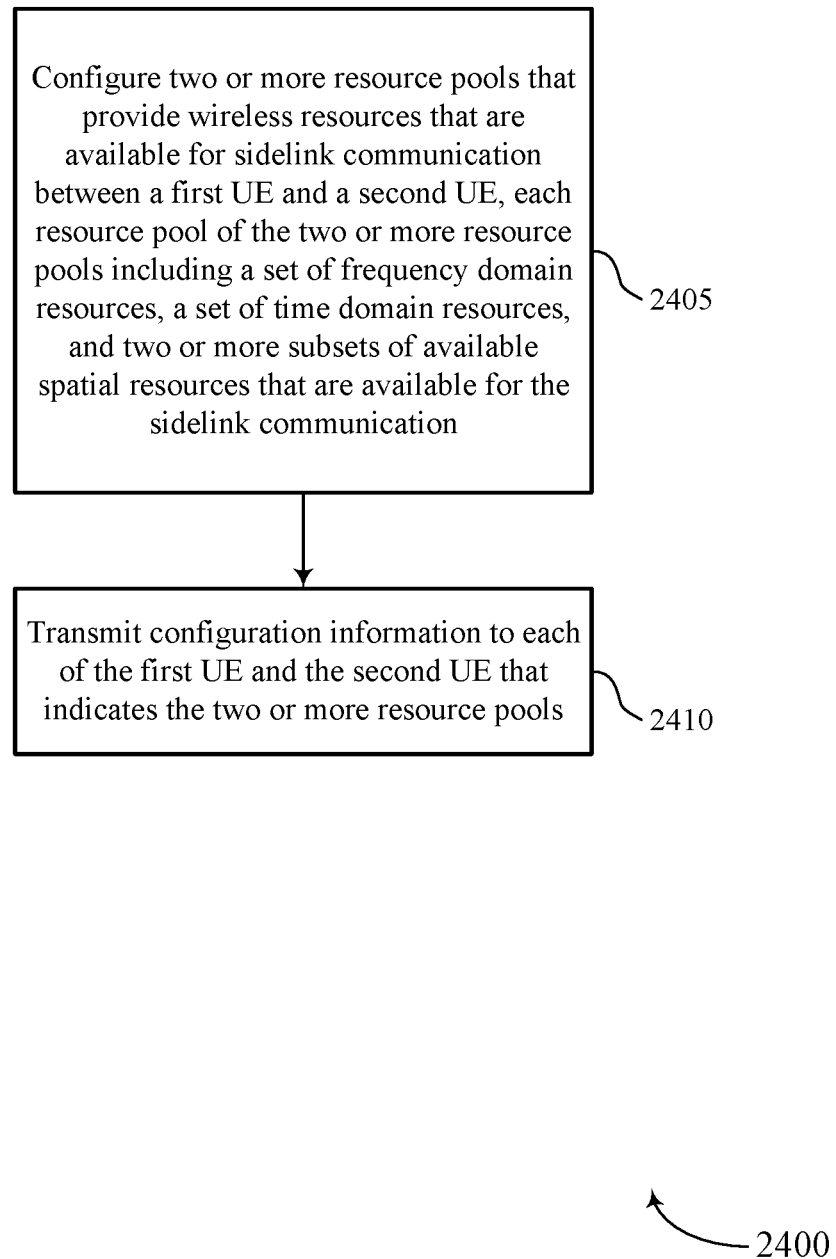

FIG. 24 shows a flowchart illustrating a method 2400 that supports spatial resource pool techniques for multiple concurrent transmissions in sidelink wireless communications in accordance with aspects of the present disclosure. The operations of method 2400 may be implemented by a base station 105 or its components as described herein. For example, the operations of method 2400 may be performed by a communications manager as described with reference to FIGS. 13 through 16. In some examples, a base station may execute a set of instructions to control the functional elements of the base station to perform the functions described herein. Additionally or alternatively, a base station may perform aspects of the functions described herein using special-purpose hardware.

At 2405, the base station may configure two or more resource pools that provide wireless resources available for sidelink communication between a first UE and a second UE, each resource pool of the two or more resource pools including a set of frequency domain resources, a set of time domain resources, and two or more subsets of available spatial resources that are available for the sidelink communication. The operations of 2405 may be performed according to the methods described herein. In some examples, aspects of the operations of 2405 may be performed by a resource pool configuration manager as described with reference to FIGS. 13 through 16.

At 2410, the base station may transmit configuration information to each of the first UE and the second UE that indicates the two or more resource pools. The operations of 2410 may be performed according to the methods described herein. In some examples, aspects of the operations of 2410 may be performed by a sidelink communication manager as described with reference to FIGS. 13 through 16.

The following provides an overview of examples of the present disclosure:

Example 1: A method for wireless communication at a first UE, comprising: receiving, at the first UE from a base station, two or more resource pools that provide wireless resources available for sidelink communication between the first UE and a second UE, each resource pool of the two or more resource pools comprising a set of frequency domain resources, a set of time domain resources, and a first subset of available spatial resources that are available for the sidelink communication, selecting, at the first UE, a first resource pool comprising a first spatial resource of the first subset of available spatial resources for the sidelink communication, determining a demodulation reference signal pattern for the sidelink communication based at least in part on the selected first spatial resource of the first resource pool, and transmitting the sidelink communication and the demodulation reference signal pattern to the second UE using the first spatial resource of the first resource pool.

Example 2: The method of example 1, wherein the first subset of available spatial resources comprises two or more orthogonal antenna ports, two or more different scrambling identifications of a same orthogonal antenna port, or any combinations thereof.

Example 3: The method of any of examples 1 and 2, wherein the two or more resource pools further comprise a second resource pool having a same set of frequency domain resources and a same set of time domain resources as the first resource pool, and a different subset of available spatial resources that is non-overlapping with the first subset of available spatial resources.

Example 4: The method of any of examples 1 through 3, wherein the first subset of available spatial resources comprises two or more antenna ports, and the first UE autonomously selects one or more of a number of antenna ports or a subset of the two or more antenna ports, for the sidelink communication.

Example 5: The method of any of examples 1 through 4, further comprising: the first UE autonomously selecting a transmission rank of the sidelink communication.

Example 6: The method of any of examples 1 through 5, wherein the second UE identifies which spatial resources are used for the sidelink communication based at least in part on the demodulation reference signal pattern used for the sidelink communication.

Example 7: The method of example 6, wherein the spatial resources comprise two or more antenna ports used for the sidelink communication.

Example 8: The method of any of claims 1 through 7 further comprising: receiving, at the first UE from the base station, for each of the two or more resource pools, an indication of a second subset of available spatial resources that are available to one or more other UEs for sidelink communication using the resource pool, wherein the first subset of available spatial resources and the second subset of available spatial resources are non-overlapping for each resource pool of the two or more resource pools.

Example 9: The method of example 8 wherein a summation of the first subset of available spatial resources and the second subset of available spatial resources is less than a total number of concurrent spatial transmissions that can be received at the second UE.

Example 10: The method of example 8, rate-matching the sidelink communication with the second UE around reference signal resources associated with the second subset of available spatial resources.

Example 11: The method of any of examples 1 through 9, further comprising: determining that the sidelink communication was not successfully received at the second UE, and retransmitting the sidelink communication using the first resource pool or a second resource pool that was configured for a potential co-scheduled transmission of one or more other UEs.

Example 12: The method of example 11, further comprising: receiving feedback from the second UE that indicates whether one or more resources of the potential co-scheduled transmission were detected as being unavailable for the sidelink communication, and wherein a retransmission resource is selected based at least in part on the feedback.

Example 13: The method of example 12, wherein the first UE selects the retransmission resource from the first resource pool when each of the potential co-scheduled transmissions are indicated as containing a transmission, and wherein the first UE selects the retransmission resource from the first resource pool and the second resource pool when one or more of the potential co-scheduled transmissions are indicated as being empty.

Example 14: The method of any of claims 1 through 13 wherein the first subset of available spatial resources comprise a subset of antenna ports or a transmission rank that are available for sidelink communication, a subset of demodulation reference signal scrambling identifications that are available for sidelink communication, or any combinations thereof.

Example 15: The method of example 14, wherein the first resource pool comprises a sub-pool of two or more available demodulation reference signal scrambling identifications, and wherein the first UE further receives an indication of at least one potential co-scheduled demodulation reference signal scrambling identification in the first resource pool.

Example 16: The method of example 14, wherein the first resource pool comprises a sub-pool of two or more available combinations of demodulation reference signal scrambling identifications and antenna ports, and wherein the first UE further receives an indication of two or more potential co-scheduled combinations of demodulation reference signal scrambling identifications and antenna ports in the first resource pool.

Example 17: An apparatus for wireless communication comprising at least one means for performing a method of any one of examples 1 through 16.

Example 18: An apparatus for wireless communication comprising a processor and memory coupled to the processor, the processor and memory configured to perform a method of any one of examples 1 through 16.

Example 19: A non-transitory computer-readable medium storing code for wireless communication, the code comprising instructions executable by a processor to perform a method of any one of examples 1 through 16.

Example 20: A method for wireless communication at a second UE, comprising: identifying, at the second UE, two or more resource pools that provide wireless resources available for sidelink communication between a first UE and the second UE, each resource pool of the two or more resource pools comprising a set of frequency domain resources, a set of time domain resources, and a first subset of available spatial resources that are available for the sidelink communication, receiving, from the first UE, an indication that a first resource pool of the two or more resource pools is to be used for the sidelink communication, monitoring the first subset of available spatial resources associated with the first resource pool, determining that a demodulation reference signal pattern for the sidelink communication is present in a first spatial resource of the first resource pool, and demodulating the sidelink communication based at least in part on the demodulation reference signal pattern.

Example 21: The method of example 20, further comprising: receiving, from the first UE or from a base station, for each of the two or more resource pools, an indication of a second subset of one or more available spatial resources that are available to one or more other UEs for sidelink communication using the associated resource pool, wherein the first subset of available spatial resources and the second subset of one or more available spatial resources are non-overlapping for each resource pool of the two or more resource pools.

Example 22: The method of example 21, wherein a summation of the first subset of available spatial resources and the second subset of one or more available spatial resources is less than a total number of concurrent spatial transmissions that can be received at the second UE.

Example 23: The method of example 21, further comprising: monitoring for a transmission in the second subset of one or more available spatial resources of the first resource pool, and mitigating interference in the first subset of available spatial resources based at least in part on detecting the transmission in the second subset of the one or more available spatial resources.

Example 24: The method of any of examples 20 through 23, wherein the first subset of available spatial resources comprises two or more orthogonal antenna ports, two or more different scrambling identifications of a same orthogonal antenna port, or any combinations thereof.

Example 25: The method of any of claims 20 through 24 wherein the two or more resource pools further comprise a second resource pool having a same set of frequency domain resources and a same set of time domain resources as the first resource pool, and a different subset of available spatial resources that is non-overlapping with the first subset of available spatial resources.

Example 26: The method of any of claims 20 through 25, wherein the first subset of available spatial resources comprises two or more antenna ports, and the first UE autonomously selects one or more of a number of antenna ports or a subset of the two or more antenna ports, for the sidelink communication.

Example 27: The method of claim 26, further comprising: identifying which of the two or more antenna ports are used for the sidelink communication based at least in part on the demodulation reference signal pattern associated with each spatial resource of the first subset of available spatial resources.

Example 28: The method of any of examples 20 through 27, further comprising: determining that the sidelink communication is not successfully received at the second UE, and transmitting feedback information to the first UE that indicates the sidelink communication was not successfully received.

Example 29: The method of example 28, further comprising: determining whether one or more resources of one or more potential co-scheduled transmissions contain a transmission from one or more other UEs, and wherein the feedback information further indicates whether the one or more resources of the one or more potential co-scheduled transmissions were detected as being unavailable for the sidelink communication.

Example 30: The method of example 29, wherein retransmission resources are in the first resource pool when each of the potential co-scheduled transmission resources contain the transmission, and wherein the retransmission resources are in one of the first resource pool or a second resource pool when at least one of the potential co-scheduled transmission resources is available for sidelink communication.

Example 31: The method of any of examples 20 through 30, wherein the first subset of available spatial resources comprise a subset of antenna ports that are available for sidelink communication, a subset of demodulation reference signal scrambling identifications that are available for sidelink communication, or any combinations thereof.

Example 32: The method of example 31, wherein the first resource pool includes a sub-pool of available demodulation reference signal scrambling identifications, and wherein the second UE further receives an indication of potential co-scheduled demodulation reference signal scrambling identifications in the first resource pool.

Example 33: The method of example 31, wherein the first resource pool includes a sub-pool of available combinations of demodulation reference signal scrambling identifications and antenna ports, and wherein the second UE further receives an indication of potential co-scheduled combinations of demodulation reference signal scrambling identifications and antenna ports in the first resource pool.

Example 34: An apparatus for wireless communication comprising at least one means for performing a method of any one of examples 20 through 33.

Example 35: An apparatus for wireless communication comprising a processor and memory coupled to the processor, the processor and memory configured to perform a method of any one of examples 20 through 33.

Example 36: A non-transitory computer-readable medium storing code for wireless communication, the code comprising instructions executable by a processor to perform a method of any one of examples 20 through 33.

It should be noted that the methods described herein describe possible implementations, and that the operations and the steps may be rearranged or otherwise modified and that other implementations are possible. Further, aspects from two or more of the methods may be combined.

Techniques described herein may be used for various wireless communications systems such as CDMA, TDMA, FDMA, OFDMA, single carrier frequency division multiple access (SC-FDMA), and other systems. A CDMA system may implement a radio technology such as CDMA2000, Universal Terrestrial Radio Access (UTRA), etc. CDMA2000 covers IS-2000, IS-95, and IS-856 standards. IS-2000 Releases may be commonly referred to as CDMA2000 1x, 1x, etc. IS-856 (TIA-856) is commonly referred to as CDMA2000 1xEV-DO, High Rate Packet Data (HRPD), etc. UTRA includes Wideband CDMA (WCDMA) and other variants of CDMA. A TDMA system may implement a radio technology such as Global System for Mobile Communications (GSM).

An OFDMA system may implement a radio technology such as Ultra Mobile Broadband (UMB), Evolved UTRA (E-UTRA), Institute of Electrical and Electronics Engineers (IEEE) 802.11 (Wi-Fi), IEEE 802.16 (WiMAX), IEEE 802.20, Flash-OFDM, etc. UTRA and E-UTRA are part of Universal Mobile Telecommunications System (UMTS). LTE, LTE-A, and LTE-A Pro are releases of UMTS that use E-UTRA. UTRA, E-UTRA, UMTS, LTE, LTE-A, LTE-A Pro, NR, and GSM are described in documents from the organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned herein as well as other systems and radio technologies. While aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR applications.

A macro cell generally covers a relatively large geographic area (e.g., several kilometers in radius) and may allow unrestricted access by UEs with service subscriptions with the network provider. A small cell may be associated with a lower-powered base station, as compared with a macro cell, and a small cell may operate in the same or different (e.g., licensed, unlicensed, etc.) frequency bands as macro cells. Small cells may include pico cells, femto cells, and micro cells according to various examples. A pico cell, for example, may cover a small geographic area and may allow unrestricted access by UEs with service subscriptions with the network provider. A femto cell may also cover a small geographic area (e.g., a home) and may provide restricted access by UEs having an association with the femto cell (e.g., UEs in a closed subscriber group (CSG), UEs for users in the home, and the like). An eNB for a macro cell may be referred to as a macro eNB. An eNB for a small cell may be referred to as a small cell eNB, a pico eNB, a femto eNB, or a home eNB. An eNB may support one or multiple (e.g., two, three, four, and the like) cells, and may also support communications using one or multiple component carriers.

The wireless communications systems described herein may support synchronous or asynchronous operation. For synchronous operation, the base stations may have similar frame timing, and transmissions from different base stations may be approximately aligned in time. For asynchronous operation, the base stations may have different frame timing, and transmissions from different base stations may not be aligned in time. The techniques described herein may be used for either synchronous or asynchronous operations.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a DSP, an ASIC, an FPGA, or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein can be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method for wireless communication at a first user equipment (UE), comprising:
receiving, at the first UE from a base station, two or more resource pools that provide wireless resources available for sidelink communication between the first UE and a second UE, each resource pool of the two or more resource pools comprising a set of frequency domain resources, a set of time domain resources, and a first subset of available spatial resources that are available for the sidelink communication;
selecting, at the first UE, a first resource pool of the two or more resource pools comprising a first spatial resource of the first subset of available spatial resources for the sidelink communication, wherein the two or more resource pools further comprise a second resource pool having a same set of frequency domain resources and a same set of time domain resources as the first resource pool, and a different subset of available spatial resources that is non-overlapping with the first subset of available spatial resource;
determining a demodulation reference signal pattern for the sidelink communication based at least in part on the selected first spatial resource of the first resource pool; and
transmitting the sidelink communication and the demodulation reference signal pattern to the second UE using the first spatial resource of the first resource pool.

2. The method of claim 1, wherein the first subset of available spatial resources comprises two or more orthogonal antenna ports, two or more different scrambling identifications of a same orthogonal antenna port, or any combinations thereof.

3. The method of claim 1, wherein the first subset of available spatial resources comprises two or more antenna ports, and the first UE autonomously selects one or more of a number of antenna ports or a subset of the two or more antenna ports, for the sidelink communication.

4. The method of claim 1, further comprising:
the first UE autonomously selecting a transmission rank of the sidelink communication.

5. The method of claim 1, wherein the second UE identifies which spatial resources are used for the sidelink communication based at least in part on the demodulation reference signal pattern used for the sidelink communication.

6. The method of claim 5, wherein the spatial resources comprise two or more antenna ports used for the sidelink communication.

7. The method of claim 1, further comprising:
receiving, at the first UE from the base station, for each of the two or more resource pools, an indication of a second subset of available spatial resources that are available to one or more other UEs for sidelink communication using the two or more resource pools, wherein the first subset of available spatial resources and the second subset of available spatial resources are non-overlapping for each resource pool of the two or more resource pools.

8. The method of claim 7, wherein a summation of the first subset of available spatial resources and the second subset of available spatial resources is less than a total number of concurrent spatial transmissions that can be received at the second UE.

9. The method of claim 7, further comprising:
rate-matching the sidelink communication with the second UE around reference signal resources associated with the second subset of available spatial resources.

10. The method of claim 1, further comprising:
determining that the sidelink communication was not successfully received at the second UE; and
retransmitting the sidelink communication using the first resource pool or a second resource pool that was configured for a potential co-scheduled transmission of one or more other UEs.

11. The method of claim 10, further comprising:
receiving feedback from the second UE that indicates whether one or more resources of the potential co-scheduled transmission were detected as being unavailable for the sidelink communication, and wherein a retransmission resource is selected based at least in part on the feedback.

12. The method of claim 11, wherein the first UE selects the retransmission resource from the first resource pool when each of the potential co-scheduled transmissions are indicated as containing a transmission, and wherein the first UE selects the retransmission resource from the first resource pool and the second resource pool when one or more of the potential co-scheduled transmissions are indicated as being empty.

13. The method of claim 1, wherein the first subset of available spatial resources comprise a subset of antenna ports or a transmission rank that are available for sidelink communication, a subset of demodulation reference signal scrambling identifications that are available for sidelink communication, or any combinations thereof.

14. The method of claim 13, wherein the first resource pool comprises a sub-pool of two or more available demodulation reference signal scrambling identifications, and wherein the first UE further receives an indication of at least one potential co-scheduled demodulation reference signal scrambling identification in the first resource pool.

15. The method of claim 13, wherein the first resource pool comprises a sub-pool of two or more available combinations of demodulation reference signal scrambling identifications and antenna ports, and wherein the first UE further receives an indication of two or more potential co-scheduled combinations of demodulation reference signal scrambling identifications and antenna ports in the first resource pool.

16. A method for wireless communication at a second user equipment (UE), comprising:
identifying, at the second UE, two or more resource pools that provide wireless resources available for sidelink communication between a first UE and the second UE, each resource pool of the two or more resource pools comprising a set of frequency domain resources, a set of time domain resources, and a first subset of available spatial resources that are available for the sidelink communication;
receiving, from the first UE, an indication that a first resource pool of the two or more resource pools is to be used for the sidelink communication, wherein the two or more resource pools further comprise a second resource pool having a same set of frequency domain resources and a same set of time domain resources as the first resource pool, and a different subset of available spatial resources that is non-overlapping with the first subset of available spatial resources;
monitoring the first subset of available spatial resources associated with the first resource pool;
determining that a demodulation reference signal pattern for the sidelink communication is present in a first spatial resource of the first resource pool; and
demodulating the sidelink communication based at least in part on the demodulation reference signal pattern.

17. The method of claim 16, further comprising:
receiving, from the first UE or from a base station, for each of the two or more resource pools, an indication of a second subset of one or more available spatial resources that are available to one or more other UEs for sidelink communication using the associated resource pool, wherein the first subset of available spatial resources and the second subset of one or more available spatial resources are non-overlapping for each resource pool of the two or more resource pools.

18. The method of claim 17, wherein a summation of the first subset of available spatial resources and the second subset of one or more available spatial resources is less than a total number of concurrent spatial transmissions that can be received at the second UE.

19. The method of claim 17, further comprising:
monitoring for a transmission in the second subset of one or more available spatial resources of the first resource pool; and
mitigating interference in the first subset of available spatial resources based at least in part on detecting the transmission in the second subset of the one or more available spatial resources.

20. The method of claim 16, wherein the first subset of available spatial resources comprises two or more orthogonal antenna ports, two or more different scrambling identifications of a same orthogonal antenna port, or any combinations thereof.

21. The method of claim 16, wherein the first subset of available spatial resources comprises two or more antenna ports, and the first UE autonomously selects one or more of a number of antenna ports or a subset of the two or more antenna ports, for the sidelink communication.

22. The method of claim 21, further comprising:
identifying which of the two or more antenna ports are used for the sidelink communication based at least in part on the demodulation reference signal pattern associated with each spatial resource of the first subset of available spatial resources.

23. The method of claim 16, further comprising:
determining that the sidelink communication is not successfully received at the second UE; and
transmitting feedback information to the first UE that indicates the sidelink communication was not successfully received.

24. The method of claim 23, further comprising:
determining whether one or more resources of one or more potential co-scheduled transmissions contain a transmission from one or more other UEs, and wherein the feedback information further indicates whether the one or more resources of the one or more potential co-scheduled transmissions were detected as being unavailable for the sidelink communication.

25. The method of claim 24, wherein:
retransmission resources are in the first resource pool when each of the potential co-scheduled transmission resources contain the transmission, and wherein the retransmission resources are in one of the first resource pool or a second resource pool when at least one of the potential co-scheduled transmission resources is available for sidelink communication.

26. An apparatus for wireless communication at a first UE, comprising:
a processor; and
memory coupled to the processor, the processor and memory configured to:
receive, at the first UE from a base station, two or more resource pools that provide wireless resources available for sidelink communication between the first UE and a second UE, each resource pool of the two or more resource pools comprising a set of frequency domain resources, a set of time domain resources, and a first subset of available spatial resources that are available for the sidelink communication;
select, at the first UE, a first resource pool of the two or more resource pools comprising a first spatial resource of the first subset of available spatial resources for the sidelink communication, wherein the two or more resource pools further comprise a second resource pool having a same set of frequency domain resources and a same set of time domain resources as the first resource pool, and a different subset of available spatial resources that is non-overlapping with the first subset of available spatial resource;
determine a demodulation reference signal pattern for the sidelink communication based at least in part on the selected first spatial resource of the first resource pool; and
transmit the sidelink communication and the demodulation reference signal pattern to the second UE using the first spatial resource of the first resource pool.

27. The apparatus of claim 26, wherein the apparatus further comprises:
one or more antennas configured to receive, at the first UE from the base station, for each of the two or more resource pools, an indication of a second subset of available spatial resources that are available to one or more other UEs for sidelink communication using the two or more resource pools ['pooh], wherein the first subset of available spatial resources and the second subset of available spatial resources are non-overlapping for each resource pool of the two or more resource pools.

28. An apparatus for wireless communication at a second UE, comprising:
a processor; and
memory coupled to the processor, the processor and memory configured to:
identifying, at the second UE, two or more resource pools that provide wireless resources available for sidelink communication between a first UE and the second UE, each resource pool of the two or more resource pools comprising a set of frequency domain resources, a set of time domain resources, and a first subset of available spatial resources that are available for the sidelink communication;
receiving, from the first UE, an indication that a first resource pool of the two or more resource pools is to be used for the sidelink communication, wherein the two or more resource pools further comprise a second resource pool having a same set of frequency domain resources and a same set of time domain resources as the first resource pool, and a different subset of available spatial resources that is non-overlapping with the first subset of available spatial resources;
monitoring the first subset of available spatial resources associated with the first resource pool;
determining that a demodulation reference signal pattern for the sidelink communication is present in a first spatial resource of the first resource pool; and
demodulating the sidelink communication based at least in part on the demodulation reference signal pattern.

* * * * *